(12) United States Patent
Steinke

(10) Patent No.: US 7,707,009 B2
(45) Date of Patent: *Apr. 27, 2010

(54) DRILL BIT PERFORMANCE ANALYSIS TOOL

(75) Inventor: Stephen C. Steinke, The Woodlands, TX (US)

(73) Assignee: Smith International, Inc., Houston, TX (US)

(*) Notice: Subject to any disclaimer, the term of this patent is extended or adjusted under 35 U.S.C. 154(b) by 218 days.

This patent is subject to a terminal disclaimer.

(21) Appl. No.: 11/877,430

(22) Filed: Oct. 23, 2007

(65) Prior Publication Data

US 2008/0125981 A1    May 29, 2008

(51) Int. Cl.
G06F 11/30 (2006.01)
E21B 12/02 (2006.01)
G06F 19/00 (2006.01)

(52) U.S. Cl. .................... 702/182; 175/39; 700/175

(58) Field of Classification Search ......... 702/182–184, 702/9, 33–36, 42–43, 81, 84, 179, 181; 705/7, 705/11, 22, 28; 700/174–175, 179; 175/39, 175/327, 331; 715/200, 212, 904
See application file for complete search history.

(56) References Cited

U.S. PATENT DOCUMENTS 7,286,959 B2 * 10/2007 Steinke ...................... 702/182

OTHER PUBLICATIONS

Lu et al., Real-Time Performance Reliability Prediction, Dec. 2001, IEEE Transactions on Reliability, vol. 50, No. 4, pp. 353-357.*

* cited by examiner

*Primary Examiner*—Michael P. Nghiem
*Assistant Examiner*—Toan M Le
(74) *Attorney, Agent, or Firm*—Osha • Liang LLP

(57) ABSTRACT

A method and system for automatically calculating and generating performance analysis charts, including a reliability curve. The method and system are used to selectively convert performance records data from a database into graphs and charts reflective of a performance analysis. A tool and method is provided for predicting the effective life or run time of a component, such as a drill bit, based on calculated reliabilities for similar components.

7 Claims, 38 Drawing Sheets

| OPERATOR | | | CONTRACTOR | | RIG | |
|---|---|---|---|---|---|---|
| COUNTRY | STATE/PROVINCE | | COUNTY/DISTRICT | | QQSEC | QSEC-LSD |
| LEGAL | | | RIG TYPE     O SUBMERS<br>O LAND O BARGE O PLATFRM<br>O SHIP O SEMI O JACKUP | | DRILL PIPE | |
| CONTRACT<br>O DAYWORK<br>O FOOTAGE<br>O TURNKEY | RIG ELEVATION<br>WATER DEPTH | | WELL TYPE<br>O VERTICAL O HORIZONTAL<br>O DIRECTIONAL | | TOOL JOINT | |
| | O ONSHORE<br>O OFFSHORE | O TIGHT HOLE | WELL TARGET<br>O OIL O GEOTH O DISPOSAL<br>O GAS O STOR O INJECTN | | DRILL COLLAR | NO |
| FOOTAGE CONTRACT<br>TO _____ FEET | O PARTIAL WELL | O REENTRY WELL | O EXPLORATION O APPRAISAL<br>O DEVELOPMENT | | DRILL COLLAR | NO |

| BIT # | BIT SIZE<br>O IN<br>O NM | BIT MFR | BIT TYPE | IADC CODE | SERIAL NUMBER | JETS<br>O 32ND<br>O MM | DEPTH OUT<br>O FEET<br>O METER | DRILLED<br>O FEET<br>O METER | HOURS | ROP<br>O F/H<br>O M/H | CUM HRS |
|---|---|---|---|---|---|---|---|---|---|---|---|
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

EXPLANATION OF THE IADC DULL BIT GRADING SYSTEM

| TOOTH CONDITION | DULL CHARACTERISTICS | | DULL CODE LOCATION | BEARING DULL CODE | GAGE DULL CODE |
|---|---|---|---|---|---|
| I= ALL INNER ROWS, NOT CUTTING GAGE. FOR FIXED CUTTER BITS, THIS REPRESENTS THE INNER 2/3 OF TH BIT.<br><br>O= ALL ROWS CUTTING GAGE OF HOLE. FOR FIXED CUTTER BITS, THIS REPRESENTS THE OUTER 1/3 FIX OF THE BIT.<br><br>MEASURE OF TOTAL CUTTING STRUCTURE REDUCTION DUE TO LOSS, BREAKAGE AND WEAR.<br>0= NO LOSS, BREAKAGE WEAR<br>8= ALL LOST, WORN OR BROKEN | D= MAJOR<br>BC= BROKEN CONE<br>BF= BOND FAILURE<br>BT= BROKEN TEETH/CUT.<br>BU= BALLED UP<br>CC= CRACKED CONE<br>CD= CONE DRAGGED<br>CI= CONE INTERFERENCE<br>CR= CORED<br>CT= CHIPPED TEETH<br>ER= EROSION<br>FC= FLAT CRESTED WEAR<br>HC= HEAT CHECKING<br>JD= JUNK DAMAGE<br>LC= LOST CODES | O= OTHER<br>LN= LOST NOZZLE<br>LT= LOST TEETH/CUTTER<br>NO= NO MAJOR/OTHER DULL<br>OC= OFF CENTER WEAR<br>PB= PINCHED BIT<br>RG= ROUNDED GAGE<br>RO= RING OUT<br>SD= SHIRTFALL DAMAGE<br>SS= SELF SHARPENING<br>TR= TRACKING<br>WO= WASHOUT ON BIT<br>WT= WORN TEETH/CUTTERS | L= LOCATION<br>ROLLER CONE<br>N= NOSE ROWS<br>M= MIDDLE ROWS<br>G= GAGE ROWS<br>A= ALL ROWS<br>FIXED CUTTER<br>C= CONE<br>N= NOSE<br>T= TAPER<br>S= SHOULDER<br>G= GAGE<br>A= ALL AREAS<br>*SHOW CONE # UNDER LOCATION | B= BEARING<br>GRADE NON-SEALED BEARINGS BASED ON ESTIMATE OF REMAINING LIFE<br>NON-SEALED BEARING<br>0= NO BIT USED<br>8= ALL BIT USED<br>SEALED BEARING<br>E= SEALS EFFECTIVE<br>F= SEALS FAILED<br>N= NOT ABLE TO GRADE<br>FIXED CUTTER BITS<br>X= FIXED CUTTER BIT | G= GAGE<br>I= IN GAGE<br>MEASURE GAGE-WEAR IN 1/16" AMOUNTS UNDERGAGE. FOR EXAMPLE:<br>1= 1/16" OUT OF GAGE<br>2= 2/16" OUT OF GAGE |

*FIG. 12A*

| | | | | | | DOCUMENT NUMBER | |
|---|---|---|---|---|---|---|---|
| BLOCK | SUBBLOCK | | LEASE/WELL NAME | | | WELL # | |
| SECTION | TOWNSHIP | RANGE | FIELD | | | WELL DEPTH | |
| SIZE | | WT | | API WELL # | | SPUD DATE | |
| SIZE | | TYPE | | UTM | LAT/LONG | UNDER SURF | |
| O.D. | I.D. | | LENGTH | PUMP NO. 1 | MAKE     MODEL     LINEAR | INT. DATE | |
| O.D. | I.D. | | LENGTH | PUMP NO. 2 | MAKE     MODEL     LINEAR | T.D. DATE | |

| WOB ○KLBS ○MTON ○DAN | MTR RPM | TOTAL RPM | ROT TYP | DEV | PRES ○PSI ○BAR ○KPA | VOL ○SPM ○GPM ○LPM | WT ○PPG ○SG ○YP | PV/ YP | CUTTING STR | | | | BRGS | | REMARKS | | DATES/ FORMATION |
|---|---|---|---|---|---|---|---|---|---|---|---|---|---|---|---|---|---|
| | | | | | | | | | I | O | D | L | 1 | 2 | 3 | G | O | R | |

R = REASON PULLED OR RUN TERMINATED
BHA = CHG BOTTOM HOLE ASSY    PR = PENETRATION RATE
DMF = DOWNHOLE MOTOR FAILURE    RIG = RIG REPAIRS
DSF = DRILLING STRING FAILURE    TD = TOTAL/CASING DEPTH
DST = DRILL STEM TEST    TW = TWIST OFF
DTF = DOWNHOLE TOOL FAILURE    TQ = TORQUE
CM = CONDITION MUD    WC = WEATHER CONDITIONS
CP = CONE PAINT    WO = WASHOUT DRILL STRING
DP = DRILL PLUG
FM = FORMATION CHANGE
HP = HOLE PROBLEMS
HR = HOURS ON BIT
LIH = LEFT IN HOLE
LOG = RUN LOGS
PP = PUMP PRESSURE

ROTARY TYPE
R = ROTARY
M = MOTOR
T = TURBINE
S = STEERABLE
D = TOP DRIVE
J = JETTING

CUTTING STRUCTURE | BRGS | GAGE | REMARKS
LINEAR ROWS (I) | OUTER ROWS (O) | DRILL CHAR (D) | LOCATION (L) | BEARING SEAL (B) | GAGE (G) | OTHER DRILL (O) | REASON PULLED (R)

FORMATION CODES
AN = ANHYDRITE    EV = EVAPORATES    PY = PYRITE
CG = CONGLOMARATS    GR = GRANITE    QT - QUARTZITE
CH = CHERT    GU = GUMBO    RB = REDBED
CK = CHALK    GW = GRANITE WASH    SA = SALT
CL = CLAY    GY = GYPSUM    SD = SAND
CO = COAL    LS = LIMESTONE    SH = SHALE
CT = CEMENT    MA = MARL    SS = SANDSTONE
DO = DOLOMITE    MU = MUDSTONE    ST = SILTSTONE

| BIT RECORD BHA AND FORMATION INFORMATION | | | | | | | | DOCUMENT NUMBER |
|---|---|---|---|---|---|---|---|---|
| | MUD DATA | | HOURS SUMMARY | | | BOTTOMHOLE ASSEMBLY DATA CODES AND CRITICAL DIMENSIONS | | COMMENTS ON BIT RUNS |
| BIT # | MUD TYPE | % SOLID H2O LOSS | REAM | STEER | ROTATE | | | |
| | | | | | | BIT | | |
| | | | | | | BIT | | |
| | | | | | | BIT | | |
| | | | | | | BIT | | |
| | | | | | | BIT | | |
| | | | | | | BIT | | |
| | | | | | | BIT | | |
| | | | | | | BIT | | |
| | | | | | | BIT | | |
| | | | | | | BIT | | |

BOTTOM HOLE ASSEMBLY LEGEND - ENTER CODES AND CRITICAL DIMENSIONS STARTING AT BIT:
DC= DRILL COLLAR    JR= JARS           RR= ROLLER REAMER       ST= STABILIZER        TS= STEERING TOOL
HW= HEVI WATE       MD= MWD TOOL       SS= SHOCK SUB           SX= SIX POINT RR
JD= JUNK BASKET     PD= POSITIVE MOTOR SC= SQUARE DRILL COLLER TM= TURBINE

| FORMATION TOPS AND CASING POINTS | | TOP BOTTOM | TVD-TOP | TVD-BOT | CASING | FORMATION CODES AND PROPERTIES | | |
|---|---|---|---|---|---|---|---|---|
| FORMATION AGE | FORMATION NAME | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |

FILETERING CRITERIA FOR PERFORMANCE STUDY — 302

| | A | B | C | D | E | F | G | H | I | J | K | L | M |
|---|---|---|---|---|---|---|---|---|---|---|---|---|---|
| 1 | BIT GROUP1: | MNFR1 | GROUP2: | MNFR2 | GROUP3: | MNFR3 | GROUP4: | MNFR4 | GROUP5: | MNFR5 | GROUP6: | OTHER | |
| 4 | CTRY | | CTRY | | (INPUT COUNTRY CODE, USA=UNITED STATES, CAN=CANADA, UK=UNITED KINGDOM ETC.) | | | | | | | API UNITS | |
| 5 | STATE | | STAT | | (INPUT STATE CODE, FOR USA AND CANADA USE 2-LETTER ABBREVIATION) | | | | | | | | |
| 7 | COUNTY | | COUNTY | | COUNTY | | COUNTY | | COUNTY | | COUNTY | | |
| 9 | BLOCK 304 | | BLOCK 304 | | INPUT BLOCK | | | | | | | | |
| 11 | SPUD-DT-FROM | 7/1/2000 | SPUD-DT-TO | 12/31/2004 | TD-DT-FROM | | TD-DT-TO | | (SPUD AND TD DATE RANGE, FORMAT MM/DD/YYYY) | | | | |
| 12 | OPERATOR | | | | CONTRACTOR | | | | RIG | | | | |
| 13 | TOWNSHIP | | RANGE | | (INPUT TOWNSHIP AND RANGE, NO, N-S) | | | | MILES SEARCH RADIUS FROM THIS LAT-LONG | | | | |
| 14 | SIZE(DECIMAL INCHES) | | SIZE | | (INPUT ONE OR TWO BIT SIZE-S) | | | | LAT (S "="-") | | LONG (W "="-") | | |
| 15 | REASON PULL CODE INCLUDE IF: | | | | | | | | DULL CODE, EXCLUDE IF: | | | | |
| 16 | RERUN(NB=NEW BIT) | | (TWO LETTER CODE, NB=NEW BIT, RR=RERUN, RT=RETIP, RB=REBUILD) | | | | | | DATE-BREAK FOR TIMED PERFORMANCE STUDY | | | | 01/01/2001 |
| 17 | IADC-ROOT-TO | | IADC ROOT-TO | | (INPUT 1ST 3 CHARACTERS OF IADC CODE) | | | | INCLUDE ONLY BITS W/SEALS GRADED? Y OR N | | | | N |
| 18 | PRODCD | | PRODCD | | TWO TO THREE CHARACTER CODE TO DEFINE PRODUCT. | | | | ASSUME LONGEST RUN "FAILED" FOR RELIABILITY CURVES? | | | | N |
| 19 | DPTH-IN-FROM | | DPTH-IN-TO | | (INPUT DEPTH-IN RANGE TO FILTER BIT RUNS, YOU CAN ENTER JUST THE "FROM" OR "TO" VALUE) | | | | | | | | |
| 21 | DPTH-OUT-FROM | | DPTH-OUT-TO | | (INPUT DEPTH-OUT RANGE TO FILTER BIT RUNS, YOU CAN ENTER FROM "FROM" OR "TO" VALUE) | | | | | | | | |
| 23 | | 0 | DI-RNG2 | 3000 | | 3000 | DI-RNG3 | 6000 | | 6000 | DI-RNG4 | 9000 | — 305 |
| 25 | H-WT-FROM 305 | | H-WT-TO | | (INPUT WEIGHT RANGE TO FILTER BIT RUNS) | | | 6000 | | 9000 | DI-RNG5 | 1200 | 12000 |
| | | | | | | | | | | | | 30800 | |
| 27 | H-RPM-FROM | | H-RPM-TO | | RPM RANGE TO FILTER BIT RUNS | | | | | | | | |
| 28 | DEV OUT FROM | | DEV OUT TO | | (ENTER DEVIATION OUT RANGE) | | | | | | | | |
| 29 | RPM-OK (OK=VALID) | | (DROP MOTOR RUN W/BAD RPM, "OK" ROT CODE) | | | | | | EX. SHRT-GM? Y/N | | FILTER BITS PULLED GREEN SHORT HRS? | | |
| 30 | H-LORPM(HI OR LO) | | (FILTER HI OR LOW RPM, "H" RPM = RUN ON MOTOR, STEER, TURBINE RPM >= 150) | | | | | | % DULL HRS CUTOFF | 100 | % OF HRS, BITS PULLED DULL | | |
| 31 | MUDWT-FROM | | MUDWT-TO | | INPUT MUD WEIGHT RANGE | | | | (MED HRS, ALL BITS UNFILTERED SF ONLY Y/N? | 97.9 | MED DULL HR % CUT | 92.0 | |
| 33 | ER# | | ER# | | INPUT ER NUMBERS, FILTERS SI BITS ONLY | | | | | N | (INCLUDES ONLY BITS W/SEAL FAILED) | | |
| 35 | PLNT-(PONCE, I=ITALY) | | MFR DATE FROM | | MFR DATE TO | | | | FILTERING CRITERIA NOTE ON CHARTS (Y OR N)? | | Y | | |
| 37 | GEOPROV# | | GEOPROV# | | ENTER GEO PROVIDED CODE, SEE LIST BELOW | | | | OPER. PARAMETERS BOX=WT, RPM, MW, HSI, BHP, WR | | WT | | |
| 38 | UNFILTERED SAMPLE # | 392 | CUR SAMPLE # | 310 | % INCLUDED | 79.1 | | | RELIABILITY CHART ON KREV, FEET, HRS, TE? | | KREV | | |
| 39 | SHORT KREV/S %CAL | 300 | SHORT RUN IN 1000 REV | | CALC RELIABILITY TO PULL BIT | 0.750 | | | % RUNS W/LAT-LONG | 99.0% | SERIAL # | RF-2D-1133 | |

FIG. 14A

| | | | | | | | | { 314 |
|---|---|---|---|---|---|---|---|---|
| 42 | BIT GROUP AND SAMPLE SIZE | MNFR1 | 32 | MNFR2 | 83 | MNFR3 | 75 | MNFR4 | 109 | 110 | MNFR5 | 7 | OTHER | 3 |
| 43 | # RUNS, BRG GRAFED, # FAILED | 29 | 3 | 79 | 19 | 72 | 25 | 109 | 17 | 6 | 3 | 3 | 1 |
| 44 | % SEAL FAILURE, % EARLY SF | 10.3% | 3.4% | 24.1% | 2.5% | 34.7% | 6.9% | 15.6% | 0.9% | 50.0% | 0.0% | 33.3% | 0.0% |
| 45 | MEDIAN KREVS, KREVS TO SF | 444 | 389 | 462 | 433 | 552 | 537 | 477 | 571 | 515 | 390 | 467 | 467 |
| 46 | MEDIAN DEPTH-IN, DRILLED | 6237 | 1543 | 5422 | 2053 | 1580 | 3157 | 6048 | 1729 | 1511 | 3483 | 4176 | 1101 |
| 47 | CALCULATED TIME TO PULL BIT | 525 | KREV | 510 | KREV | 607 | KREV | 677 | KREV | 346 | KREV | 234 | KREV |
| 48 | | 312 | 312 | | | | | | | | | | |
| 49 | BIT PRICES AND RIG RATE FOR COST PER FOOT CALCULATIONS: | | | | | RIG RATE $/HOUR | | $400 | | INCLUDED MOTOR COST FOR TRIP TIME? Y OR N | | | Y |
| 51 | MFR | MNFR1 | | MNFR2 | | MNFR3 | | MNFR4 | | MNFR5 | | OTHER | |
| 52 | BIT PRICE | $6,000 | | $6,000 | | $6,000 | | $6,000 | | $6,000 | | $6,000 | |
| 53 | MOTOR/TOOL COST PER HR. | $ - | CPF | $ - | CPF | $ - | CPF | $ - | CPF | $ - | CPF | $ - | CPF |
| | | $26.20 | | $23.77 | | $16.79 | | $27.76 | | $14.99 | | $27.17 | |
| 55 | UNITS OF MEASURE | API UNITS | | (FT OR MTR) | | | CONVERSION FACTORS | | | | CONVERSION FACTORS | | |
| 56 | DEPTH | FT | | (FT OR MTR) | | 0.3046 | | | | FEET | | METERS | |
| 58 | WEIGHT ON BIT | LBS | | (LBS, KDN, KN, TONNE) | | 0.4448 | 4.4482 | 0.4539 | | KLBS | | K-DEGA NEWTON | KILO NEWTON | TONNES |
| 59 | | PPG | | (PPG, KG/M3, SPG, KPA/M, | | 119.829 | 0.1198 | 1.1753 | | PPG | | KG/M3 | SPGRAY |
| 60 | MUD WEIGHT | | 7.4805 | LB/F3, PSI/FT, PSI/1K) | | 51.948 | 0.0519 | | | LB/F3 | | PSI/FT | PSI/1KFT |

311 — 309 — 309

© 2003 SMITH INTERNATIONAL, INC.

| MAX | ## | CTRY | STAT | COUNTY | BLK | SPUD-DT | OPERATOR | CONTRACTOR | RIG | TD-DT | TWIN-RNG | SIZE | REASON PULL | DULL COND | RERUN | IADC | PRODCD | TD | OD | HI-WT | HI-RPM | DEV-OUT | RPM-OK | HI LOW RPM | SEAL GRADED | ROT CODE | MUDWT | ER | PLANT | MFR-DATE | GEOPROV-TAB | FLT-SF-ONLY | SHORT-GREEN | LL RADIAL | IADC-LEFT-3 | DULL? | DULL-HRS |
|---|---|---|---|---|---|---|---|---|---|---|---|---|---|---|---|---|---|---|---|---|---|---|---|---|---|---|---|---|---|---|---|---|---|---|---|---|---|
| 0 | 1031 | 1 | | 1 | 1 | 1999 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | XX | 0 | XX |
| 1 | 33 | 1 | | 1 | 1 | 1999 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 527 | 0 | XX |
| 1 | 33 | 1 | | 1 | 1 | 1999 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 527 | 0 | XX |
| 0 | 1031 | 1 | | 1 | 1 | 1999 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 427 | 0 | XX |
| 0 | 1031 | 1 | | 1 | 1 | 1999 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 437 | 0 | XX |
| 1 | 33 | 1 | | 1 | 1 | 1999 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 437 | 1 | 72 |
| 1 | 33 | 1 | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 447 | 1 | 72 |
| 0 | 1031 | 1 | | 1 | 1 | 1999 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 447 | 0 | XX |
| 1 | 33 | 1 | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 517 | 1 | 76 |
| 1 | 33 | 1 | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 517 | 1 | 66 |
| 1 | 33 | 1 | | 1 | 1 | 1999 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 517 | 1 | 60 |
| 1 | 33 | 1 | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 517 | 0 | XX |
| 1 | 33 | 1 | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 517 | 0 | XX |
| 1 | 33 | 1 | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 517 | 1 | 65 |
| 1 | 33 | 1 | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 517 | 1 | 85 |
| 1 | 33 | 1 | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 517 | 1 | 103 |
| 1 | 33 | 1 | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 517 | 0 | XX |
| 1 | 33 | 1 | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 517 | 1 | 113 |
| 0 | 1031 | 1 | | 1 | 1 | 1999 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 517 | 0 | XX |

| MNFR1 | | | | | | | | | MNFR2 | | | | | | | | | | MNFR3 | | | |
|---|---|---|---|---|---|---|---|---|---|---|---|---|---|---|---|---|---|---|---|---|---|---|
| SPUD-DT | MNFR-1 DPTH | MNFR-1 FOOTAGE | MNFR-1 HOURS | MNFR-1 ROP | MNFR-1 KREV | MNFR-1 KREV-F | WT | CPF | MNFR-1 CNT | MNFR-2 DPTH | MNFR-2 FOOTAGE | MNFR-2 HOURS | MNFR-2 ROP | MNFR-2 KREV | MNFR-2 KREV-F | WT | CPF | MNFR-2 CNT | MNFR-3 DPTH | MNFR-3 FOOTAGE | MNFR-3 HOURS | MNFR-3 ROP |
| 11/13/01 | xx | xx | xx | xx | xx | xx | xx | xx | | | | | | | | | | | xx | xx | xx | xx |
| 11/6/00 | xx | xx | xx | xx | xx | xx | xx | xx | | 7855 | 635 | 43 | 14.7674 | 196 | xx | 45.0 | $41.88 | | 1145 | 4698 | 114.25 | 41.120350... |
| 1/29/00 | xx | xx | xx | xx | xx | xx | xx | xx | | | | | | | | xx | xx | | xx | xx | xx | xx |
| 1/5/00 | xx | xx | xx | xx | xx | xx | xx | xx | | | | | | | | xx | xx | | xx | xx | xx | xx |
| 2/6/00 | xx | xx | xx | xx | xx | xx | xx | xx | | | | | | | | xx | xx | | xx | xx | xx | xx |
| 1/26/00 | xx | xx | xx | xx | xx | xx | xx | xx | | | | | | | | xx | xx | | xx | xx | xx | xx |
| 11/27/00 | 1513 | 4383 | 144.5 | 30.3322 | 555 | xx | 42 | $15.09 | 1 | | | | | | | xx | xx | 0 | xx | xx | xx | xx |
| 4/17/01 | xx | xx | xx | xx | xx | xx | xx | xx | 0 | 1011 | 2249 | 75.5 | 29.7881 | 344 | 344 | 40.0 | $16.68 | 1 | xx | xx | xx | xx |
| 1/18/01 | xx | xx | xx | xx | xx | xx | xx | xx | 0 | 940 | 3301 | 65.5 | 50.3969 | 354 | 354 | 48.0 | $10.27 | 0 | xx | xx | xx | xx |
| 1/4/00 | xx | xx | xx | xx | xx | xx | xx | xx | 0 | | | | | | | xx | xx | 0 | xx | xx | xx | xx |
| 2/22/01 | xx | xx | xx | xx | xx | xx | xx | xx | 0 | 1530 | 3770 | 101.5 | 36.5517 | 390 | xx | 40.0 | $13.13 | 1 | xx | xx | xx | xx |
| 4/14/01 | xx | xx | xx | xx | xx | xx | xx | xx | 0 | 1531 | 3191 | 83.75 | 38.1015 | 402 | xx | 40.0 | $12.97 | 1 | xx | xx | xx | xx |
| 2/22/01 | xx | xx | xx | xx | xx | xx | xx | xx | 0 | | | | | | | xx | xx | 0 | xx | xx | xx | xx |
| 12/28/01 | xx | xx | xx | xx | xx | xx | xx | xx | 0 | 1527 | 3568 | 88 | 40.5455 | 454 | 454 | 45.0 | $12.12 | 1 | xx | xx | xx | xx |
| 1/4/01 | xx | xx | xx | xx | xx | xx | xx | xx | 0 | 511 | 4106 | 103 | 39.8641 | 494 | xx | 38.0 | $11.95 | 1 | xx | xx | xx | xx |
| 9/28/00 | xx | xx | xx | xx | xx | xx | xx | xx | 0 | | | | | | | xx | xx | 0 | xx | xx | xx | xx |
| 12/6/00 | xx | xx | xx | xx | xx | xx | xx | xx | 0 | 1528 | 4761 | 99.5 | 47.8492 | 513 | xx | 42.0 | $10.15 | 1 | xx | xx | xx | xx |
| 1/1/01 | 1500 | 3356 | 100 | 33.56 | 516 | xx | 40 | $14.29 | 1 | | | | | | | xx | xx | 0 | xx | xx | xx | xx |
| 9/4/01 | xx | xx | xx | xx | xx | xx | xx | xx | | xx | xx | xx | xx | xx | xx | xx | xx | | xx | xx | xx | xx |
| 5/2/00 | xx | xx | xx | xx | xx | xx | xx | xx | | xx | xx | xx | xx | xx | xx | xx | xx | | xx | xx | xx | xx |
| 9/17/01 | xx | xx | xx | xx | xx | xx | xx | xx | | xx | xx | xx | xx | xx | xx | xx | xx | | xx | xx | xx | xx |
| 3/31/01 | xx | xx | xx | xx | xx | xx | xx | xx | | 748 | 4216 | 105.5 | 39.9621 | 570 | xx | 40.0 | $11.90 | 1 | xx | xx | xx | xx |
| 11/18/00 | xx | xx | xx | xx | xx | xx | xx | xx | | xx | xx | xx | xx | xx | xx | xx | xx | | xx | xx | xx | xx |
| 6/29/01 | xx | xx | xx | xx | xx | xx | xx | xx | | xx | xx | xx | xx | xx | xx | xx | xx | | xx | xx | xx | xx |

| 10/19/01 | xx | xx | xx | xx | xx | xx | 0 | xx | 1530 | xx | 4248 | 119.8 | 35.4739 | xx | 575 | xx | xx | 420 | xx | $13.23 | xx | 0 | xx | xx | xx | xx |
|---|---|---|---|---|---|---|---|---|---|---|---|---|---|---|---|---|---|---|---|---|---|---|---|---|---|---|
| 7/21/01 | xx | xx | xx | xx | xx | xx | 0 | xx | | | | | | xx | | xx | xx | | xx | | xx | 1 | xx | xx | xx | xx |
| 4/15/01 | xx | xx | xx | xx | xx | xx | 0 | xx | | | | | | xx | | xx | xx | | xx | | xx | 0 | xx | xx | xx | xx |
| 4/16/00 | xx | xx | xx | xx | xx | xx | 0 | xx | | | | | | xx | | xx | xx | | xx | | xx | 0 | xx | xx | xx | xx |
| 4/25/00 | xx | xx | xx | xx | xx | xx | 0 | xx | | | | | | xx | | xx | xx | | xx | | xx | 0 | xx | xx | xx | xx |
| 11/2/01 | xx | xx | xx | xx | xx | xx | 0 | xx | | | | | | xx | | xx | xx | | xx | | xx | 0 | xx | xx | xx | xx |
| 8/20/01 | xx | xx | xx | xx | xx | xx | 0 | xx | | | | | | xx | | xx | xx | | xx | | xx | 0 | xx | xx | xx | xx |
| 9/1/01 | xx | xx | xx | xx | xx | xx | 0 | xx | | | | | | xx | | xx | xx | | xx | | xx | 0 | xx | xx | xx | xx |
| 10/3/01 | xx | xx | xx | xx | xx | xx | 0 | xx | | | | | | xx | | xx | xx | | xx | | xx | 0 | xx | xx | xx | xx |
| 5/12/01 | xx | xx | xx | xx | xx | xx | 0 | xx | | | | | | xx | | xx | xx | | xx | | xx | 0 | xx | xx | xx | xx |
| 6/16/01 | xx | xx | xx | xx | xx | xx | 0 | xx | | | | | | xx | | xx | xx | | xx | | xx | 0 | xx | xx | xx | xx |

*FIG. 16B*

| | A | B | C | D | E | F | G | H | I | J | K | L | M | N | O | P | Q | R | S | T | U | V | W |
|---|---|---|---|---|---|---|---|---|---|---|---|---|---|---|---|---|---|---|---|---|---|---|---|
| 1005 | <300 | MNFR1 DPTH-I | MNFR1 FOOT-AGE | MNFR1 HOURS | MNFR1 ROP | CNT-REV | CNT-REV-F | CNT-PARM | CPF | CNT-F-<300K | MNFR2 DEPTH-I | MNFR2 FOOT-AGE | MNFR2 HOURS | MNFR2 ROP | CNT-REV | CNT-REV-F | CNT-PARM | CPF | CNT-F-<300K | MNFR3 DEPTH-I | MNFR3 FOOT-AGE | MNFR3 HOURS | MNFR3 ROP |
| 1006 | | | | | | | | | | | | | | | | | | | | | | | |
| 1007 | COUNT | 32 | 32 | 32 | 32 | 32 | 3 | 32 | 32 | 1 | 83 | 83 | 83 | 83 | 83 | 19 | 83 | 83 | 2 | 75 | 75 | 75 | 75 |
| 1008 | MEDIAN | 6237 | 1543 | 78.3 | 20.7 | 444 | 389 | 42 | $25.49 | | 5422 | 2053 | 99.5 | 21.7 | 462 | 19 | 42 | $23.81 | | 1580 | 3157 | 112.8 | 29.5 |
| 1009 | MIN | 1057 | 33 | 2 | 13 | 8 | 168 | 5 | $12.11 | | 445 | 184 | 11 | 9 | 47 | 433 | 20 | $8.86 | | 608 | 135 | 6 | 13 |
| 1010 | 5% | 1507 | 271 | 11.3 | 12.8 | 63 | 190 | 35 | $14.41 | | 741 | 551 | 25.8 | 14.1 | 135 | 47 | 36 | $11.01 | | 816 | 573 | 34.5 | 14.3 |
| 1011 | 1ST QUART | 4780 | 936 | 39.1 | 15.9 | 197 | 278 | 40 | $23.56 | | 2642 | 1343 | 64.8 | 17.0 | 328 | 212 | 40 | $15.51 | | 1028 | 1673 | 72.0 | 19.2 |
| 1012 | 2ND QUART | 6237 | 1543 | 78.3 | 20.7 | 444 | 389 | 42 | $25.49 | | 5422 | 2053 | 99.5 | 21.7 | 492 | 349 | 42 | $23.81 | | 1580 | 3157 | 112.8 | 29.5 |
| 1013 | 3RD QUART | 7061 | 2021 | 111.1 | 23.6 | 574 | 525 | 43 | $31.71 | | 6608 | 3176 | 117.6 | 32.7 | 569 | 433 | 45 | $30.75 | | 5924 | 4476 | 131.9 | 35.9 |
| 1014 | 95% | 8188 | 3023 | 151.5 | 38.9 | 717 | 634 | 45 | $101.43 | | 8612 | 4793 | 148.0 | 45.4 | 790 | 549 | 48 | $42.83 | | 8802 | 5109 | 155.4 | 42.3 |
| 1015 | MAX | 9946 | 4383 | 168 | 54 | 982 | 662 | 45 | $291.82 | | 9832 | 5845 | 184.0 | 73.3 | 1184 | 1001 | 48 | $74.06 | | 9817 | 5405 | 207.5 | 47.4 |
| 1016 | AVERAGE | 5734 | 1575 | 76.4 | 20.6 | 408 | 406 | 40 | $3.40 | | 4805 | 2312 | 91.4 | 25.3 | 458 | 1057 | 42 | $24.83 | | 3415 | 3095 | 103.8 | 28.7 |
| 1017 | | | | | | | | | | | | | | | | | 489 | | | | | | |
| 1018 | | D-I | FT | HR | ROP | KREV/S | KREV/S-F | WT | CPF | | D-I | FT | HR | ROP | KREV/S | KREV/S-F | WT | CPF | | D-I | FT | HR | ROP |
| 1019 | BOT WISK | 3273 | 665 | 27.9 | 3.1 | 134 | 88 | 5 | $9.15 | | 1901 | 792 | 39.0 | 2.9 | 193 | 137 | 4 | $4.50 | | 212 | 1099 | 37.5 | 4.9 |
| 1020 | MIN | 1507 | 271 | 11.3 | 12.8 | 63 | 190 | 35 | $14.41 | | 741 | 551 | 25.8 | 14.1 | 135 | 212 | 36 | $11.01 | | 816 | 573 | 34.5 | 10.3 |
| 1021 | 25TH | 3273 | 665 | 27.9 | 3.1 | 134 | 88 | 5 | $9.15 | | 1901 | 792 | 39.0 | 2.9 | 193 | 137 | 4 | $4.50 | | 212 | 1099 | 37.5 | 4.9 |
| 1022 | 50TH | 1457 | 607 | 38.1 | 4.6 | 247 | 110 | 2 | $1.93 | | 2781 | 711 | 34.8 | 4.7 | 134 | 84 | 2 | $8.30 | | 552 | 1485 | 40.8 | 10.3 |
| 1023 | 75TH | 824 | 479 | 32.8 | 2.9 | 130 | 136 | 1 | $6.22 | | 1186 | 1123 | 18.1 | 11.0 | 107 | 115 | 3 | $6.94 | | 4344 | 1319 | 19.1 | 6.5 |
| 1024 | MAX | 2886 | 2362 | 46.8 | 30.5 | 288 | 136 | 3 | $260.11 | | 3224 | 2670 | 66.4 | 40.6 | 615 | 508 | 3 | $43.31 | | 3893 | 930 | 75.6 | 11.5 |
| 1025 | TOP WISK | 1127 | 1002 | 40.2 | 15.2 | 142 | 109 | 3 | $69.72 | | 2004 | 1618 | 30.4 | 12.7 | 221 | 452 | 3 | $12.08 | | 2878 | 633 | 23.5 | 6.4 |

| | X | Y | Z | AA | AB | AC | AD | AE | AF | AG | AH | AI | AJ | AK | AL | AM | AN | AO | AP | AQ | AR | AS | AT | AU | AV | AW | AX | AY | AZ | BA | BB | BC |
|---|---|---|---|---|---|---|---|---|---|---|---|---|---|---|---|---|---|---|---|---|---|---|---|---|---|---|---|---|---|---|---|---|
| | CNT-REV | CNT-REV-F | CNT-PARM | CPF | CNT-F <300K | MNFR4 DPTH-H | MNFR4 FOOT-AGE | MNFR4 HOURS | MNFR4 ROP | CNT-REV | CNT-REV-F | CNT-PARM | CPF | CNT-F <300K | MNFR5 DPTH-H | MNFR5 FOOT-AGE | MNFR5 HOURS | MNFR5 ROP | CNT-REV | CNT-REV-F | CNT-PARM | CPF | CNT-F <300K | OTHER DPTH-H | OTHER FOOT-AGE | OTHER HOURS | OTHER ROP | CNT-REV | CNT-REV-F | CNT-PARM | CPF | CNT-F <300K |
| 1005 | | | | | | | | | | | | | | | | | | | | | | | | | | | | | | | | |
| 1006 | 75 | 25 | 75 | 75 | 6 | 110 | 110 | 110 | 110 | 110 | 17 | 110 | 110 | | | | | | 7 | 3 | 7 | 7 | | 3 | 3 | 3 | 3 | 3 | 1 | 3 | 3 | 0 |
| 1007 | 75 | 25 | 75 | 75 | | 110 | 110 | 110 | 110 | 110 | 17 | 110 | 110 | 1 | | | | | 7 | 3 | 7 | 7 | 0 | 3 | 3 | 3 | 3 | 3 | 1 | 3 | 3 | |
| 1008 | 552 | 537 | 40 | $16.27 | | 6048 | 1729 | 97.3 | 19.4 | 477 | 571 | 44 | $26.24 | | 1511 | 3463 | 110.0 | 33.8 | 515 | 390 | 44 | $13.60 | | 4176 | 1101 | 54.5 | 19.5 | 467 | 467 | 45 | $27.88 | |
| 1009 | 25 | 184 | 34 | $10.93 | | 675 | 86 | 9 | 9 | 42 | 246 | 32 | $10.12 | | 785 | 255 | 22 | 12 | 219 | 302 | 35 | $10.51 | | 3519 | 1063 | 51 | 18 | 276 | | 30 | $25.99 | |
| 1010 | 186 | 222 | 38 | $11.60 | | 794 | 383 | 23.1 | 12.6 | 136 | 306 | 35 | $12.07 | | 858 | 933 | 34.4 | 15.4 | 244 | 311 | 37 | $10.91 | | 3385 | 1067 | 51.6 | 18.2 | 295 | 467 | 32 | $26.18 | |
| 1011 | 377 | 428 | 40 | $13.01 | | 4485 | 1383 | 67.4 | 18.1 | 365 | 372 | 41 | $21.21 | | 1267 | 2567 | 68.4 | 25.6 | 346 | 346 | 41 | $12.56 | | 3848 | 1082 | 52.9 | 18.8 | 372 | 467 | 38 | $26.93 | |
| 1012 | 552 | 637 | 40 | $16.27 | | 6048 | 1729 | 97.3 | 19.4 | 477 | 571 | 44 | $26.24 | | 1511 | 3463 | 110.0 | 33.8 | 515 | 390 | 44 | $13.60 | | 4176 | 1101 | 54.5 | 19.5 | 467 | 467 | 45 | $27.88 | |
| 1013 | 660 | 665 | 44 | $28.18 | | 7073 | 2450 | 127.3 | 24.4 | 622 | 667 | 45 | $31.44 | | 2463 | 4663 | 127.4 | 39.5 | 594 | 453 | 45 | $18.14 | | 5093 | 1146 | 60.1 | 20.5 | 487 | 467 | 50 | $28.72 | |
| 1014 | 783 | 865 | 45 | $44.70 | | 9676 | 5608 | 161.1 | 38.3 | 785 | 918 | 55 | $48.14 | | 6221 | 5086 | 176.1 | 45.8 | 875 | 503 | 45 | $54.52 | | 5827 | 1181 | 64.6 | 21.3 | 503 | 467 | 54 | $29.39 | |
| 1015 | 1021 | 1021 | 45 | $89.63 | | 12370 | 5988 | ### | ### | 1193 | 1193 | 55 | $136.14 | | 7430 | 5209 | 190.75 | 48.21 | 973 | 515 | 45 | $69.31 | | 6010 | 1190 | 65.8 | 21.5 | 507 | 467 | 55 | $29.56 | |
| 1016 | 519 | 539 | 41 | $21.56 | | 5608 | 2195 | 95.8 | 21.8 | 484 | 564 | 44 | $29.11 | | 2455 | 3344 | 102.0 | 32.0 | 512 | 402 | 42 | $22.12 | | 4568 | 1118 | 57.2 | 19.7 | 417 | 467 | 43 | $27.81 | |
| 1017 | | | | | | | | | | | | | | | | | | | | | | | | | | | | | | | | |
| 1018 | KREVS | KREVS-F | WT | CPF | | DH | FT | HR | ROP | KERV | KERVS | WT | CPF | | DH | FT | HR | ROP | KERVS | KERVS | WT | CPF | | D-I | FT | HR | ROP | KREVS | KREVS-F | WT | CPF | |
| 1019 | 192 | 206 | 2 | $1.41 | | 3691 | 1000 | 44.3 | 3.5 | 230 | 66 | 5 | $9.14 | | 409 | 1634 | 34.0 | 10.1 | 102 | 35 | 5 | $1.66 | | 263 | 15 | 1.3 | 0.6 | 77 | 0 | 6 | $0.76 | |
| 1020 | 186 | 222 | 38 | $11.60 | | 794 | 383 | 23.1 | 12.6 | 136 | 306 | 35 | $12.07 | | 859 | 933 | 34.4 | 15.4 | 244 | 311 | 37 | $10.91 | | 3385 | 1067 | 51.6 | 18.2 | 295 | 467 | 32 | $26.18 | |
| 1021 | 192 | 206 | 2 | $1.41 | | 3691 | 1000 | 44.3 | 3.5 | 230 | 66 | 5 | $9.14 | | 409 | 1634 | 34.0 | 10.1 | 102 | 35 | 5 | $1.66 | | 263 | 15 | 1.3 | 0.6 | 77 | 0 | 6 | $0.76 | |
| 1022 | 175 | 109 | 0 | $3.26 | | 1563 | 346 | 29.8 | 3.3 | 111 | 199 | 4 | $5.04 | | 244 | 916 | 41.6 | 8.3 | 189 | 44 | 3 | $1.04 | | 329 | 19 | 1.6 | 0.7 | 96 | 0 | 8 | $0.95 | |
| 1023 | 108 | 128 | 4 | $11.91 | | 1025 | 722 | 30.1 | 5.0 | 145 | 96 | 1 | $5.20 | | 952 | 1180 | 17.4 | 5.7 | 79 | 63 | 1 | $4.54 | | 917 | 45 | 5.6 | 1.0 | 20 | 0 | 5 | $0.84 | |
| 1024 | 361 | 356 | 1 | $61.45 | | 5297 | 3538 | ### | ### | 571 | 526 | 10 | $104.71 | | 4968 | 546 | 63.39 | 8.67 | 379 | 63 | 0 | $51.17 | | 917 | 45 | 5.6 | 1.0 | 20 | 0 | 5 | $0.84 | |
| 1025 | 123 | 200 | 1 | $16.52 | | 2603 | 3155 | 33.8 | 13.9 | 183 | 251 | 10 | $16.70 | | 3759 | 422 | 48.7 | 6.2 | 281 | 50 | 0 | $36.38 | | 734 | 36 | 4.5 | 0.8 | 16 | 0 | 4 | $0.67 | |

DRILL BIT PERFORMANCE ANALYSIS TOOL

CROSS-REFERENCE TO RELATED APPLICATIONS

This application claims the benefit under 35 U.S.C. §120 of U.S. application Ser. No. 10/872,661, filed on Jun. 21, 2004, and titled "Drill Bit Performance Analysis Tool," now U.S. Pat. No. 7,286,959, which claims the benefit under 35 U.S.C. §119(e) of U.S. Provisional Application No. 60/480,007, filed Jun. 20, 2003, and titled "Performance Analysis Tool, Its Application for Evaluating Drill Bits and Methods for Using the Same," now expired. Both of the aforementioned applications are incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

STATEMENT REGARDING FEDERALLY SPONSORED RESEARCH OR DEVELOPMENT

Not applicable.

BACKGROUND OF INVENTION

1. Field of the Invention

The present invention generally relates to a performance analysis tool that may be used to automatically generate reliability curves as well as other performance analysis charts based on data obtained from a set of desired data records which may be randomly dispersed within a larger unsorted record set. The present invention also provides a method for automatically generating reliability curves as well as other performance analysis charts based on bit run records data.

2. Background Art

Oil and gas are typically obtained from subterranean earth formations by drilling bore holes from the surface to the subterranean earth formations. FIG. 1 shows one example of a conventional drilling system used to drill bore holes through earth formations. The drilling system includes a drilling rig 10 used to turn a drill string 12 that extends downward into a bore hole 14. Connected to the end of the drill string 12 is a drill bit 20. Drill bits used for drilling bore holes through earth formations typically include roller cone drill bits and fixed cutter drill bits. The drill bit shown in FIG. 1 is a roller cone drill bit. A more detailed example of a roller cone drill bit is shown in FIG. 2.

Referring to FIG. 2, the drill bit 20 includes a bit body 22 having an externally threaded connection at one end 24, and a plurality of roller cones 26 attached to the other end and able to rotate with respect to the bit body 22. Attached to the cones 26 are a plurality of cutting elements 28 typically arranged in rows about the surface of the cones 26. The cutting elements 28 may be inserts, such as tungsten carbide inserts or polycrystalline diamond compacts, or milled steel teeth. Hardfacing (not shown) may also be applied to the cutting elements 28 and other portions of the bit 20 to reduce wear on the bit 20 and to increase the life of the bit 20 as the bit 20 cuts through earth formations.

As shown in FIG. 2A, each roller cone 26 is mounted on a steel journal or pin 32 typically formed integral with the bit body 22. The roller cone 26 is held on the journal 32 by journal bearings 30 which allow the roller cone 26 to rotate with respect to the journal 32 when cutting elements 28 on the roller cone 26 contact earth formation at the bottom of the bore hole (16 in FIG. 1) during drilling.

One example of a fixed cutter drill bit is shown in FIG. 3. The fixed cutter drill bit 40 includes a bit body 42 having an externally threaded connection at one end 44, and a plurality of blades 46 extending from the other end of bit body 42 and forming the cutting surface of the bit 40. A plurality of cutters 48 are attached to each of the blades 46 and extend from the blades to cut through earth formations when the bit 40 is rotated during drilling. The cutters 48 deform the earth formation by scraping and shearing. The cutters 48 may be tungsten carbide inserts, polycrystalline diamond compacts, or any other cutting elements formed of materials hard and strong enough to cut through the formation.

When components of a drill bit wear out or fail as a bore hole is being drilled, the bit must be withdrawn from the bore hole and replaced with another bit. The time required to replace a bit is significant and is essential time lost during drilling operations. This time can become a significant portion of the total drilling time, and thus very costly, particularly as the bore hole depths become great. Therefore drill bits having reliably long service life are desired for drilling operations to maximize the effectiveness of the time spent drilling.

The need to replace a bit during a drilling operation is often indicated at the surface by a significant drop in the rate of penetration achieved by the bit. Replacement of a drill bit may be required for a number of reasons, such as severe wear or failure of one or more journal bearings (30 in FIG. 3) or seals. The bearings can be friction or roller-type bearings, which can be subject to high loads, high hydrostatic pressures in the hole being drilled, high temperatures due to drilling, as well as harmful abrasive particles originating from the formation being drilled. Bits may also be replaced because of excessive wear, breakage, or loss of cutting elements contacting and breaking up the formation, or the loss or failure of other components of the bit.

Drilling operators take great care in attempting to always pull bits and replace them just before or soon after a bearing failure or other failure of the bit occurs to avoid the risk of losing large portions of a bit in the bore hole. When portions of bits fail and break off in the bore hole, these portions must typically be retrieved before drilling can be resumed. Retrieving portions of a bit that have broken off in a bore hole is typically difficult, expensive, and time consuming. Therefore, being able to predict the performance or risk of failure of a bit used for drilling is desired so that bits can be pulled from a bore hole before catastrophic failure occurs.

To predict when a bit should be pulled from a well bore, drilling operators generally look at past performances of similar bits. To facilitate this analysis, drilling operators typically record all aspects associated with a drilling operation. When the bit being used for drilling is pulled to the surface, the condition of the bit is also carefully examined and other parameters characterizing the final condition of the bit are recorded, such as grades indicating the worn or failed condition of the cutting elements bearings/seals, etc., as well as the final depth and footage drilled by the bit. In this way, data characterizing each segment of drilling is obtained to capture a complete characterization of the drilling operation.

Data recorded for each drill bit used during a drilling operation may be stored in a database ("bit records database"). Each record in a bit records database typically corresponds to the use of a single drill bit used during a particular drilling operation. Bit records may be collected for drilling operations that occur all over the world at various times. Data from the records stored in a database can later be used for performance analysis studies, such as to analyze the performance of a particular style or group of bits, to develop performance verification techniques for bits, to perform comparisons of different bit products by different manufactures, and/or to calculate reliability curves which can be used to predict when a bit may need to be pulled during a drilling operation to avoid catastrophic failure. The data from these records may also be particularly useful to bit manufactures to identify areas of improvement needed in their bit designs to improve product performance and illuminate the longevity of components of their bits, such as the cutting elements, bearings and seals compared to their competitors.

To perform bit performance analysis studies, data is typically reviewed by an engineer or skilled practitioner who filters data from the bit runs and uses the filtered data to generate graphical representations summarizing the performance of various bits. These graphical representations typically include graphs, tables or charts showing performance parameters for different groups of bits. The data may also be used by skilled practitioners to calculate reliability curves for selected groups or types of bits.

Data from the bit records can be used to calculate the reliability of a family or group of bit based on the recorded condition of the bits, such as whether seals or bearings failed during drilling. To determine the reliability of a family of bits, the following reliability equation may be used is:

$$\hat{R}(t_i) = \frac{N+1-i}{N+2-i}\hat{R}(t_{i-1}) \quad \text{(Eq. 1)}$$

wherein N is the total number of bits being considered, i is the rank of a current bit that failed, $t_i$ is the time corresponding to the current failure, $t_{i-1}$ is the time corresponding to the previous failure, and $\hat{R}(\cdot)$ is the reliability of the functioning feature at the indicated time. Various equations for calculating a reliability or confidence level for a function of a member are known in the art. See for example, Lewis, E. E., *Introduction to Reliability Engineering*, N.Y., John Wiley & Sons, 1987. p. 121-211.

Reliability equations are commonly used to evaluate life-related performances, such as failure of components, such as bearings or light bulbs or the life expectancy of patients on various medications. These types of equations also may be used to predict the life and performance of bits used to drill bore holes in earth formations, such as to predict bearing/seal life. In the prior art, reliability curves for predicting effective bit life and bit performance were calculated one data point at a time with a hand calculator after spending a significant amount of time identifying and manipulating the data used to calculate the reliability curve.

Conventional methods used first required manually going through and examining data records to identify records containing "good" data for calculating the reliability. Records corresponding to a desired group or family of bits are then selected for use in calculations. Once the desired records are selected, data in the records corresponding to a time parameter (parameter to represent time) is selected from the records. Examples of time parameters include hours drilled, feet drilled, revolutions or total energy for a bit during drilling. Then the corresponding data in the records indicating the condition of the component for which the reliability is to be calculated is selected. Examples of functional conditions recorded for components in bit records include conditions such as failure of the bearing/seal or the wear condition of the cutting structure. For features that are graded using codes or numbers, the function condition may be considered failed if the grade is beyond a certain value, and the data for the function condition may be replaced by a Boolean indicator, such as a 0 or 1 to indicate whether the function will be considered effective or failed, respectively, for the given analysis. Once the time parameter data and the corresponding component condition data are collected, the data is ranked (reordered) in ascending order based on the value of the time parameter for each record. Then the data is indexed in ascending order to indicate the ranking of each record. After that, a hand calculator or computer programmed with the reliability function may be used to calculate, one by one, the reliability associated with each of the records having a failed function based on the time related index given to the record. Once the reliability values are calculated, they can then be plotted with respect to the corresponding time parameter values to generate the reliability curve for the selected feature of the selected group of bits.

Using the conventional method for calculating reliability described above, when the reliability based on a different time parameter or for an altered group of data is desired, the previously ordered and ranked data has to be discarded because data sorted and ranked based on the old time parameter is no longer useful. Then the group of desired records must be reselected (if the group is altered), new data corresponding to the newly selected time parameter and component parameter is selected from the group of records, reconditioned (to include Boolean function indications), and resorted based on the value of the newly selected time parameter. Then the data is re-ranked, and the reliability calculated for the functions indicated as failed in the data.

Calculating reliability values using the above conventional method can be laborious, especially when 20 or more bit records are considered, or when the reliability of several different groups of bits is desired for a comparison. Therefore, bit performance based on the reliability of bit life, while extremely useful, has not been widely practiced. Currently, reliability charts that are generated involve a very limited number of bit runs because of a lack of capability for the easy creation of reliability curves. Furthermore, most bit companies do not use reliability curves or other statistical data in an analysis of their bits because of the difficulty, skill level and experience involved in correctly calculating and generating these curves. Also because reliability curves in the past have been generated manually by various individuals, errors may frequently occur and no standard format or layout has been set for producing these types of curves or other performance charts desired from a performance analysis.

Other charts desired in a performance analysis study are also typically generated manually. This is typically done by first obtaining data records from a database. Then, depending on the type of chart desired, locating the data field containing the desired data and selecting the desired data from the records. Calculating performance analysis values as needed and then arranging and formatting the data as needed for input into a graphics generator to generate the performance chart desired. Titles, legends and other aspects of the charts must then be defined. This procedure is repeated to produce each performance chart desired, one at a time. As a result, the production of a complete set of performance charts can take hours or days.

To reduce the time and skill level required to generate quality reliability curves, and other performance charts, a tool providing the ability to more easily calculate values for generating these performance charts is greatly desired by both drilling operators, in selecting bits, and drill bit manufactures in identifying performance issues with their bits.

SUMMARY OF INVENTION

In one aspect, the present invention relates to a performance analysis tool for analyzing data in a set of performance records and generating a reliability curve based on the data. Each performance record includes component condition data relating to a functional condition of at least one component of a system. The performance analysis tool includes a filter adapted to select from the set of performance records a set of desired records based on filtering criteria provided as input; a calculator adapted to process selected data from the desired records to obtain performance analysis data including values for a reliability curve; and a graphics generator adapted to generate the reliability curve.

The present invention also provides a tool and method for generating a plurality of performance charts and a tool and method for predicting the life of a component based on a selected reliability or confidence level.

Other aspects and advantages of the invention will be apparent from the following description, figures, and the appended claims.

BRIEF DESCRIPTION OF DRAWINGS

FIGS. 12-13 shows an example of a bit run record that may be used to collect data for records to be stored in a bit records database.

FIG. 14 shows a filtering criteria sheet in accordance with one embodiment of the invention.

FIG. 15 shows the outcome of filtering functions applied to data records in an embodiment in accordance with the invention.

FIG. 16 shows one example of selected sets of records that are filtered and grouped based on filtering criteria for an embodiment in accordance with the present invention.

FIG. 20 shows one example of a calculations sheet showing calculations automatically performed in accordance with an embodiment of the present invention to generate performance charts.

DETAILED DESCRIPTION

The present invention provides a performance analysis tool adapted to automatically calculate reliability curves and/or a series of charts representing a performance analysis. In one or more embodiments, the performance analysis tool includes a filter adapted to select from a set of records a set of desired records based on selected criteria. The performance tool also includes a calculator adapted to calculate a reliability curve based on data in the set of desired records. In one or more embodiments, the filter is also adapted to accept user input as filtering criteria and use it to identify the desired records within the set of records. Also, in one or more embodiments, the filter is adapted to use filtering criteria to separate desired records into groups and the calculator is adapted to calculate a reliability curve for each of the groups.

The present invention also provides a method for generating a reliability curve and/or a plurality of charts and graphs for a performance analysis study. In one embodiment, the method includes inputting a set of data records and then filtering the data records based on selected criteria. The method also includes ranking the set of desired records and calculating a reliability curve based on data in the set of desired records. In one or more embodiments, after inputting the set of data records and selecting criteria, the ranking of the records and the calculating are carried out automatically by a calculator. Calculating a reliability curve includes calculating reliability values for a component at times when the failure of the component is indicated by data in the set of desired records.

The present invention also provides a method for calculating a predicted life or recommended run time for a component. In one embodiment, the method includes inputting a set of records and selecting from the set of records a set of desired records containing data relating to the performance of a component based on a criteria. The method also includes ranking the set of desired records in ascending order based on the value of a selected time parameter in each of the records and calculating a reliability value at each of the time parameters corresponding to an indicated failure of the component based on data in the set of desired records. The method further includes calculating a predicted life for a component based on a selected reliability limit, calculated reliability values for similar components, and corresponding time parameter values.

Figure 1:
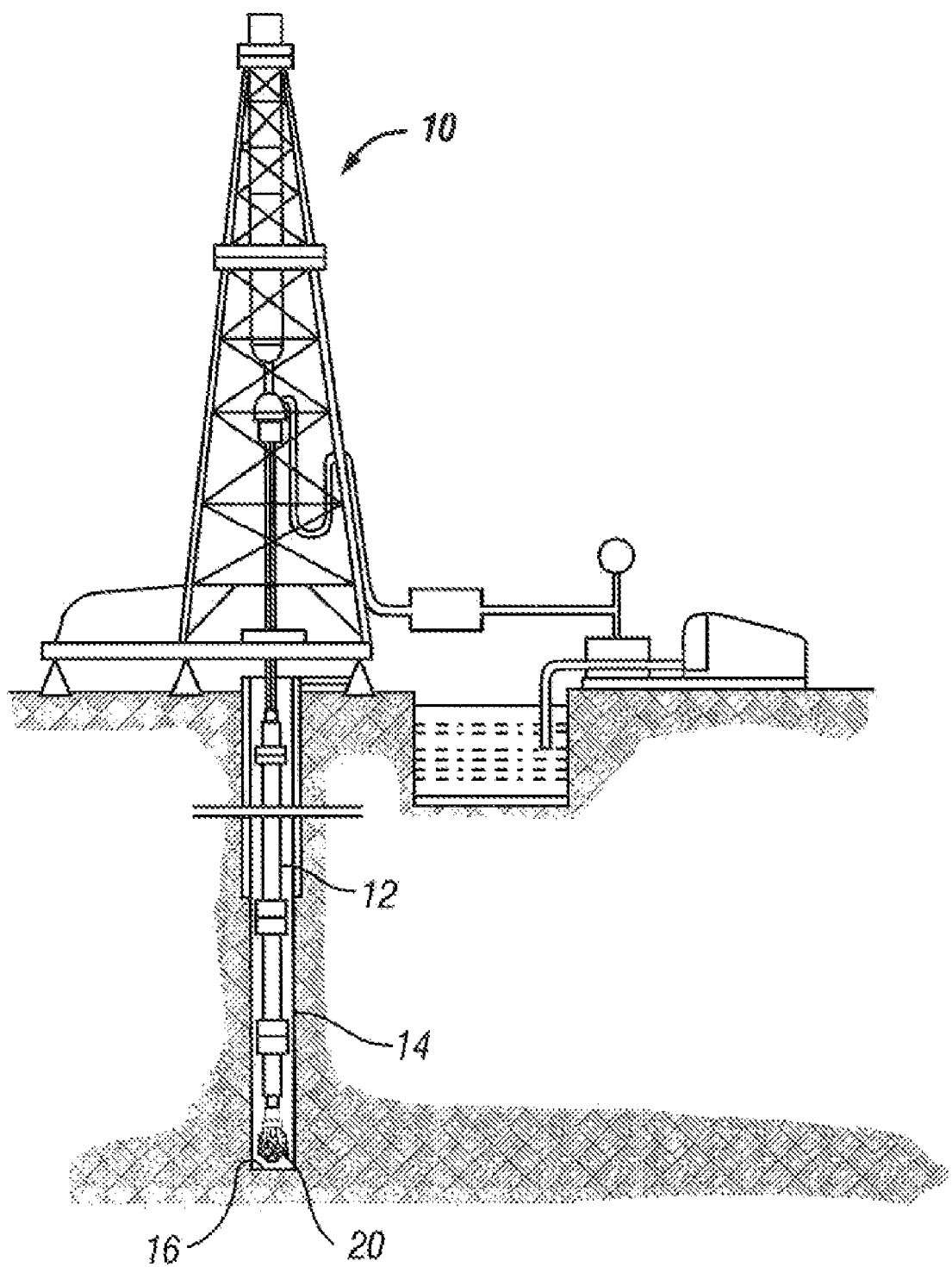
FIG. 1 shows a schematic diagram of one example of a system for drilling well bores in subterranean earth formations.
Figure 2:
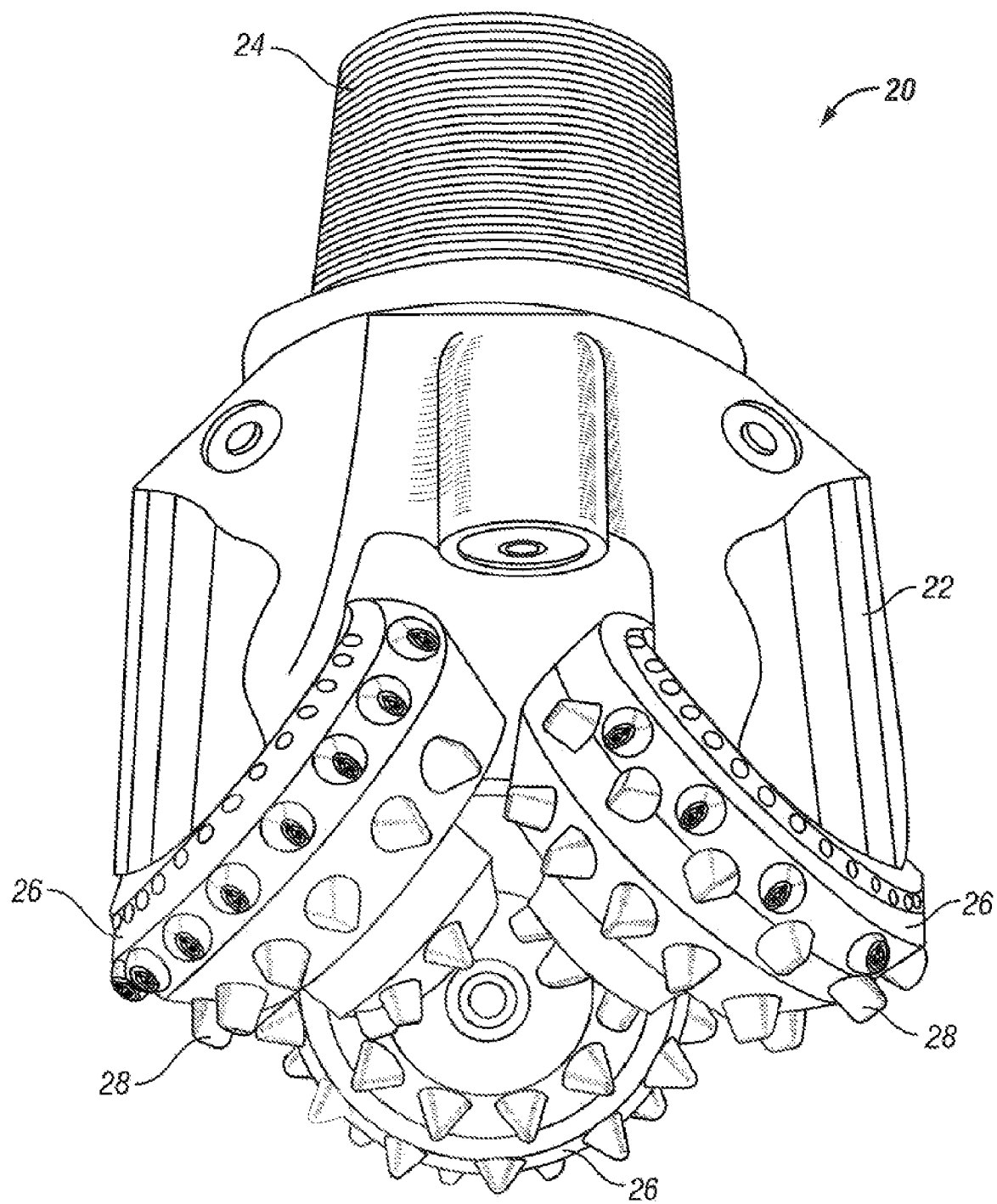
FIG. 2 shows a perspective view of a conventional roller conc drill bit.
Figure 2A:
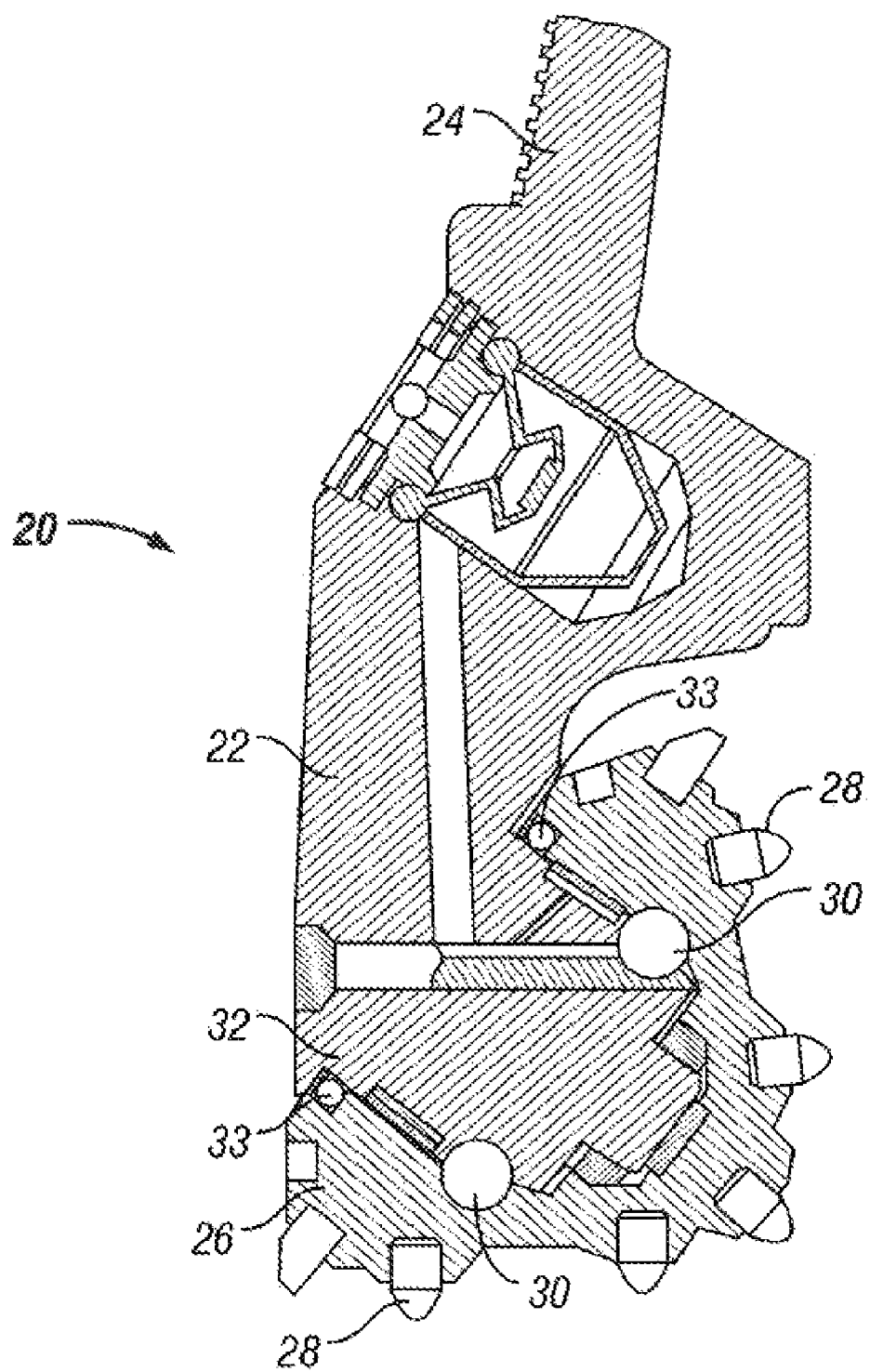
FIG. 2A shows a partial cross sectional view of one leg of a roller cone drill bit with a roller cone mounted thereon.
Figure 3:
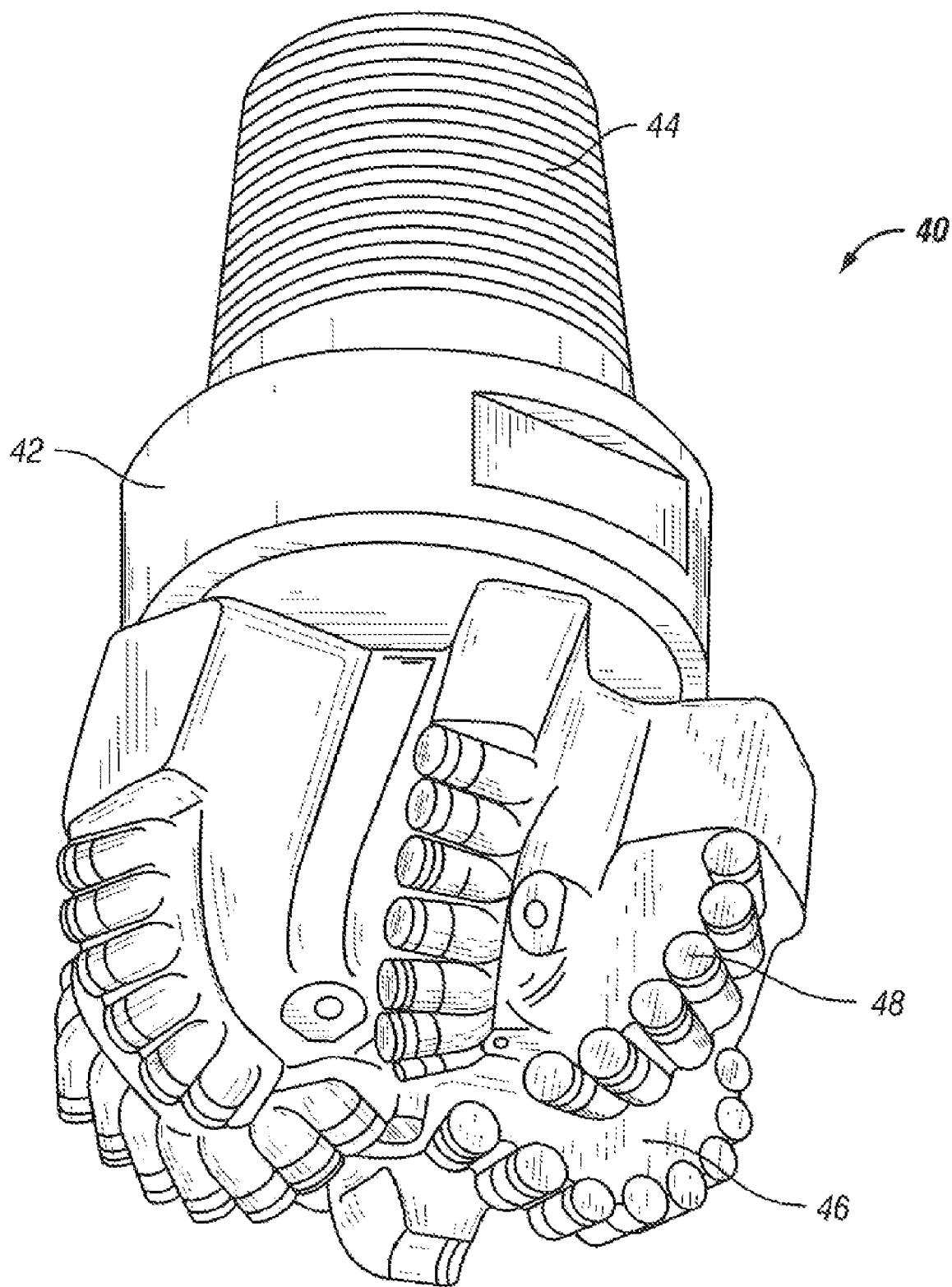
FIG. 3 shows a perspective view of a conventional fixed cutter drill bit.
Figure 4:
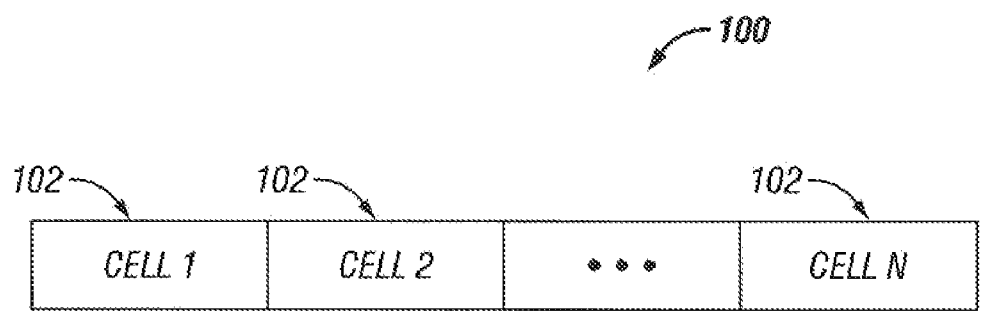
FIG. 4 shows an example of a data record.

In accordance embodiments of the invention, data characterizing the performance of a component during its operation is stored in a data record. One simplified example of a data record is shown in FIG. 4. The record 100 includes data arranged in a plurality of data fields 102 (shown in this example as data cells 1 through n). At least one of the data fields 102 contains data pertaining to a functional condition of a component ("component condition data"), and at least one of the data fields 102 contains data pertaining to a time parameter (related to how long a component was run). The component condition parameter may relate to any parameter recordable in a data record that can be used to characterize the functional condition of a component for which a reliability calculation is desired. The time parameter may be any parameter recordable in a data record that generally relates to time or a function of time on which a reliability calculation can be based. Data fields 102 in a record 100 are typically arranged in a particular order, such that the type of data contained in a particular data field 102 is known. In such case, desired data in the data record 100 can be retrieved from the data record 100 by knowing its data field 102.

One example of a data record 100 is a bit performance record (called a bit run record) which contains data that has been recorded for a drilling operation conducted using a particular drill bit. Data in a bit run record typically relates to various aspects associated with the drilling operation. Each segment of data is stored in a designated data field in the bit run record depending on the type of data, such that the type of data in each of the data fields is known and is the same for each bit run record stored in a bit run database. Data in a bit run record typically includes data characterizing the drilling parameters used during the drilling operation, data specifying the particular drill bit used (e.g., manufacturer's code, bit type, bit size, bit serial number, etc.), and data characterizing the condition of the bit at the end of the drilling (e.g., condition of seals, bearings, cutting elements, etc.). In this type of record, data pertaining to a component condition parameter may be data indicating the condition of the bearings, seals, cutting elements, or other component of the drill bit at the end of the drilling operation. This data may be in the form of a grade or Boolean value. For example, the data may be an "E" or an "F" to indicate whether the component is effective (E) or failed (F) at the end of drilling. Alternatively, the data may be Boolean value indicating the functional condition of the component or a grade value given to the component, such as a cutting element grade indicating the wear condition, such as a numerical grade between 0 (to indicate no wear) and 8 (to indicate completely worn or broken off). A bit run record may also include data pertaining to a time related parameter, such as footage drilled, hours drilled, total energy, or bit revolutions achieved by the bit during drilling.

Figure 5:
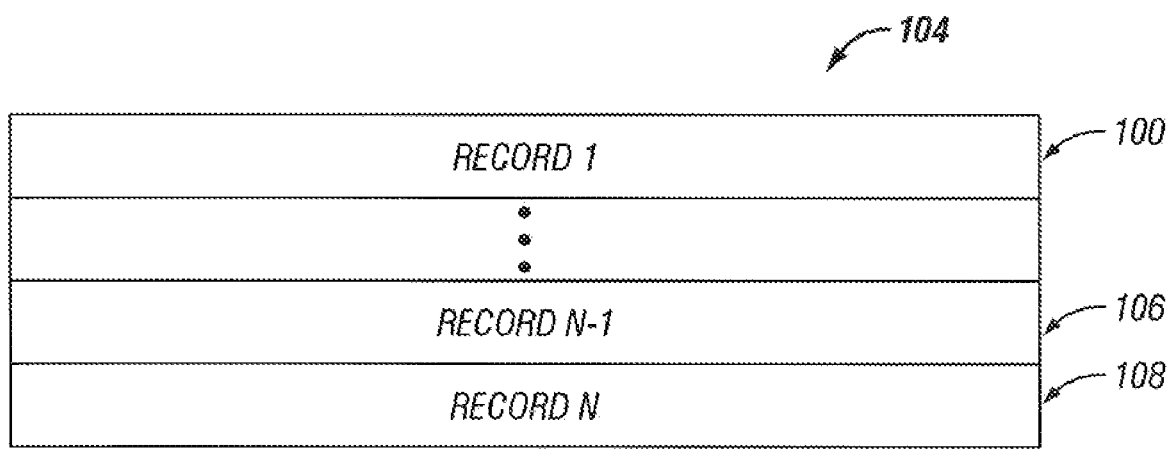
FIG. 5 shows an example of a set of records.

A plurality of data records characterizing the performance of a component may be stored in a database for later retrieval and analysis. A set of data records is illustrated, for example, in FIG. 5. The set of records 104 (or data set) includes a plurality of records (100, 106, and 108). The set of records 104 may be stored in a database and retrievable as input for an analysis. A set of records may contain any number of records, such as hundreds or thousands of records. In accordance with an embodiment of the invention described below, the set of records are several bit run records obtained from a bit records database.

Figure 6:
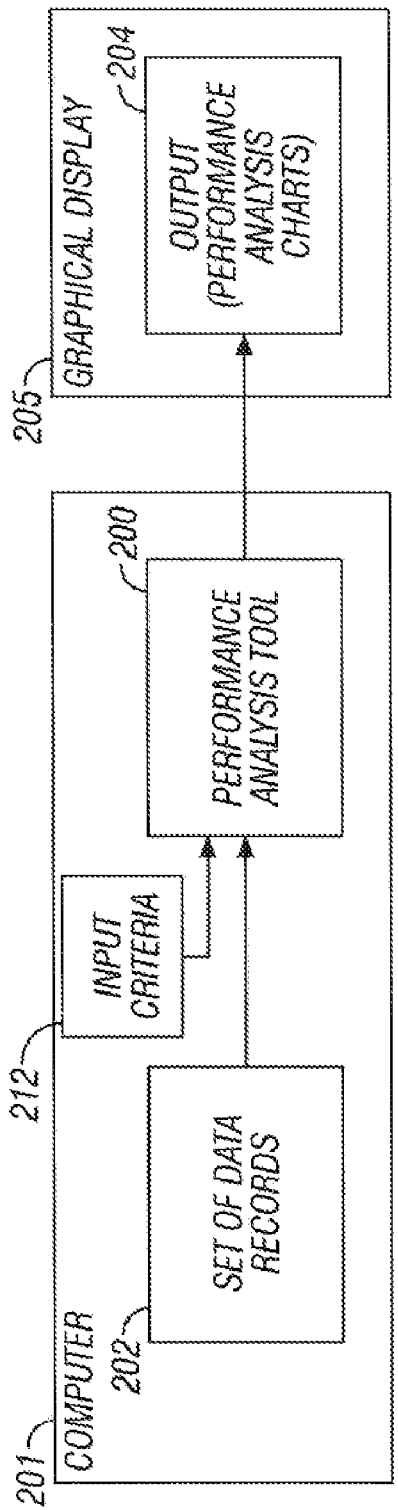
FIG. 6 shows a performance analysis tool in accordance with an aspect of the present invention.
Figure 7:
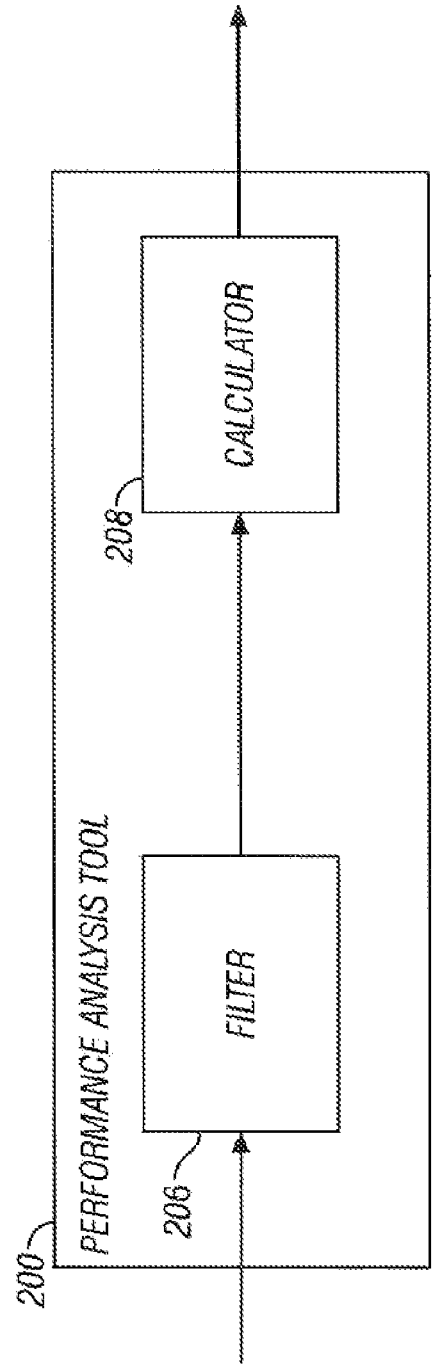
FIG. 7 shows one embodiment of a performance analysis tool which includes a filter and a calculator.

Referring now to FIG. 6, in one embodiment a performance analysis tool 200 is embodied as computer-implemented process run on a computer 201. The performance analysis tool is adapted to accept a set of data records 202 as input and generate output 204 summarizing a performance analysis. The output generated may include at least one reliability curve calculated and generated by the performance analysis tool 200. In one or more embodiments, the output 204 includes a plurality of performance charts automatically generated by the performance analysis tool based on input criteria 212. As shown in FIG. 7, the performance analysis tool 200 includes a filter 206 and a calculator 208.

Figure 8:
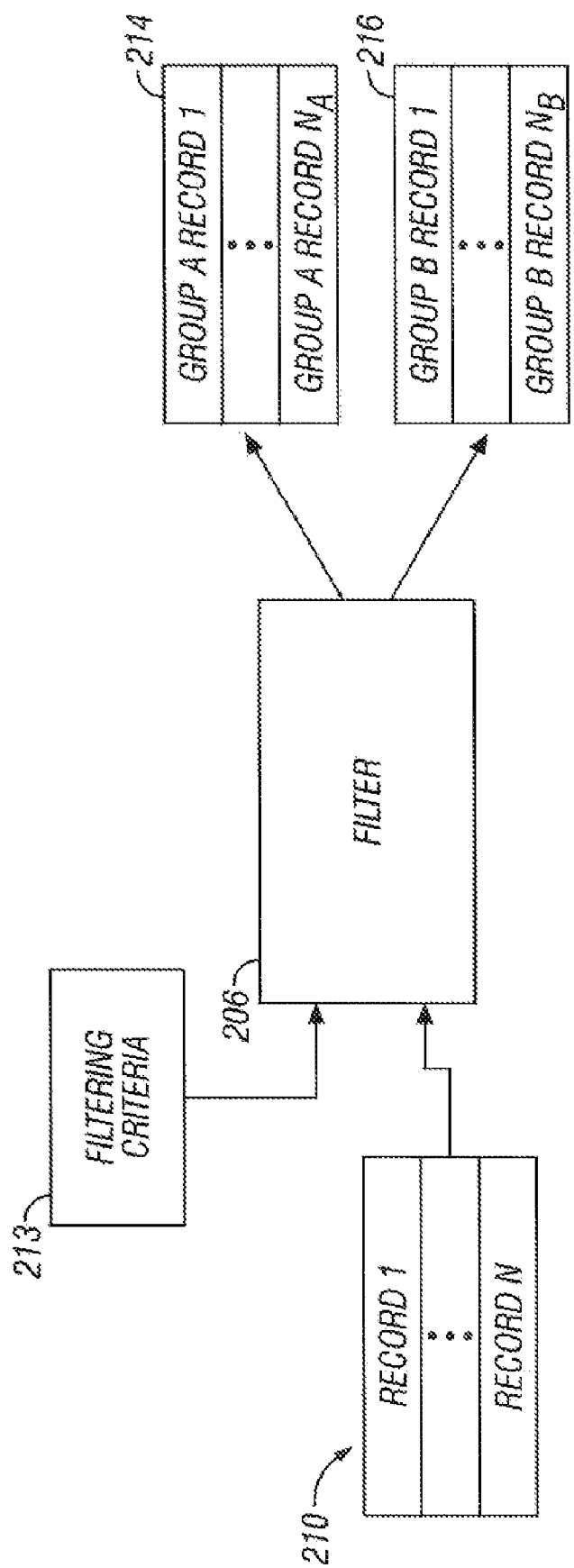
FIG. 8 shows one example of a filter in accordance with an embodiment of the present invention.

In one embodiment as shown in FIG. 8, the filter 206 is adapted to accept a set of records 210 and filtering criteria 213 as input. The filtering criteria 213 may be provided by a user, programmed or hard coded as part of the filter. The filter 206 is also adapted to qualify (or filter) records based on the filtering criteria 213 and output a desired set of records which pass the filtering criteria 213. For example, if the filtering criteria 213 include a selected date range, the filter 206 compares this filtering criterion 213 to data in the data field corresponding to a date and determine whether the date falls within the selected date range. In this way the filter 206 selectively filters the set of records and passes only the records that satisfy the selected filtering criteria 213 as output.

The filter 213 may also be adapted to separate filtered records into desired groups 214, 216 based on filtering criteria 213. For example, the filtering criteria may include different manufacturer codes or other group indicators, and the filter may be adapted to separate the filtered data records into groups depending on whether the data record contains data matching the group indicator. Filtering criteria 213 may also include data indicating which time parameter and/or which component condition parameter is desired as the basis for calculating a reliability curve.

Figure 9:
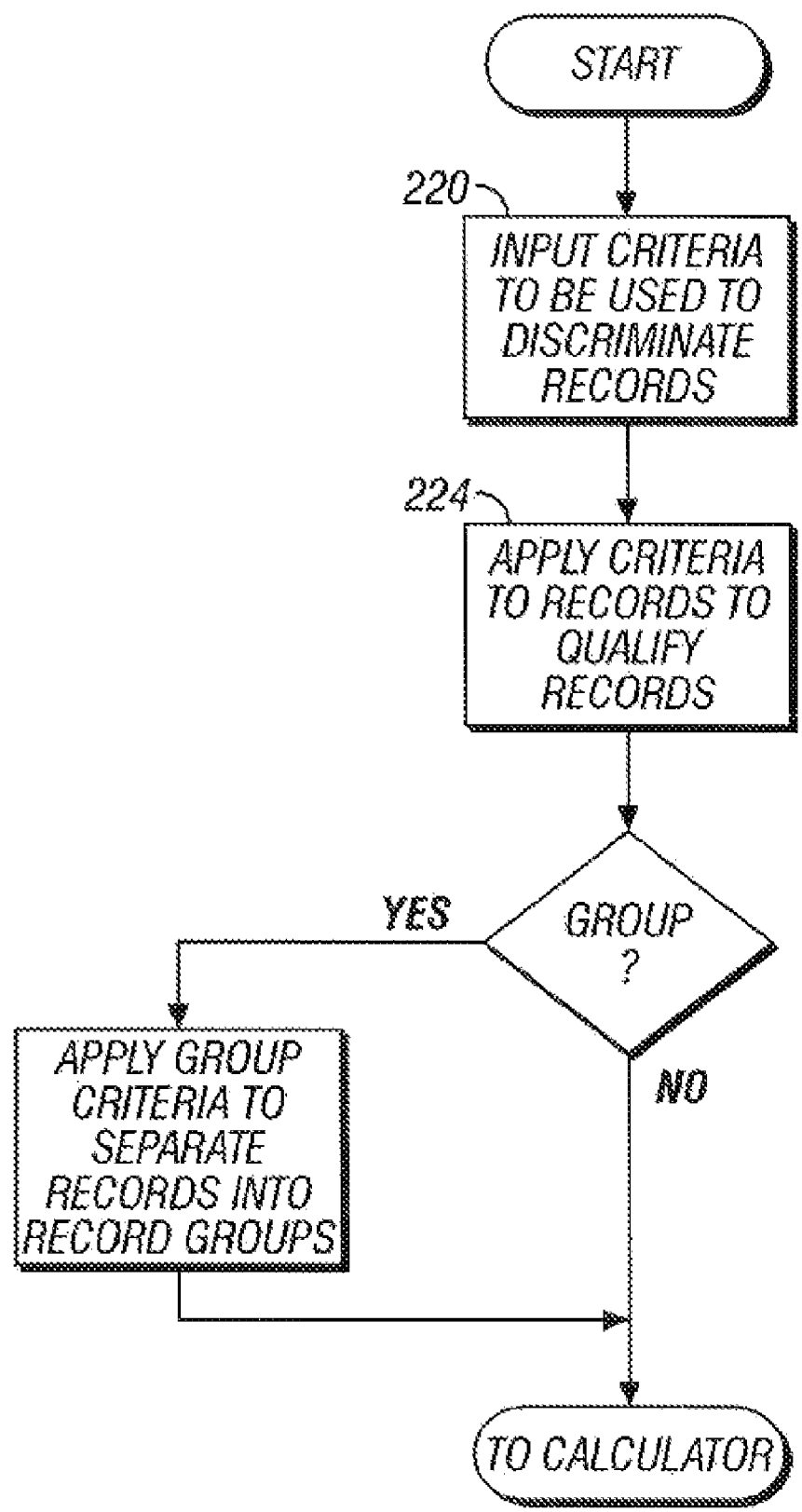
FIG. 9 shows a flowchart of the method performed by a filter in accordance with an embodiment of the present invention.

As shown in FIG. 9, the method for filtering records carried out using a performance analysis tool may include: selecting a filtering criteria that can be used to discriminate or identify desired records in the set of records provided as input to the performance analysis tool 220; and then applying the selected criteria to each of the records to qualify the records to obtain a set of desired records 224 for analysis. The qualifying records may also be separated into groups based on the filtering criteria. A filter may be adapted to provide automatic filtering of the set of records given filtering criteria for identifying desired records for the performance analysis.

Figure 10:
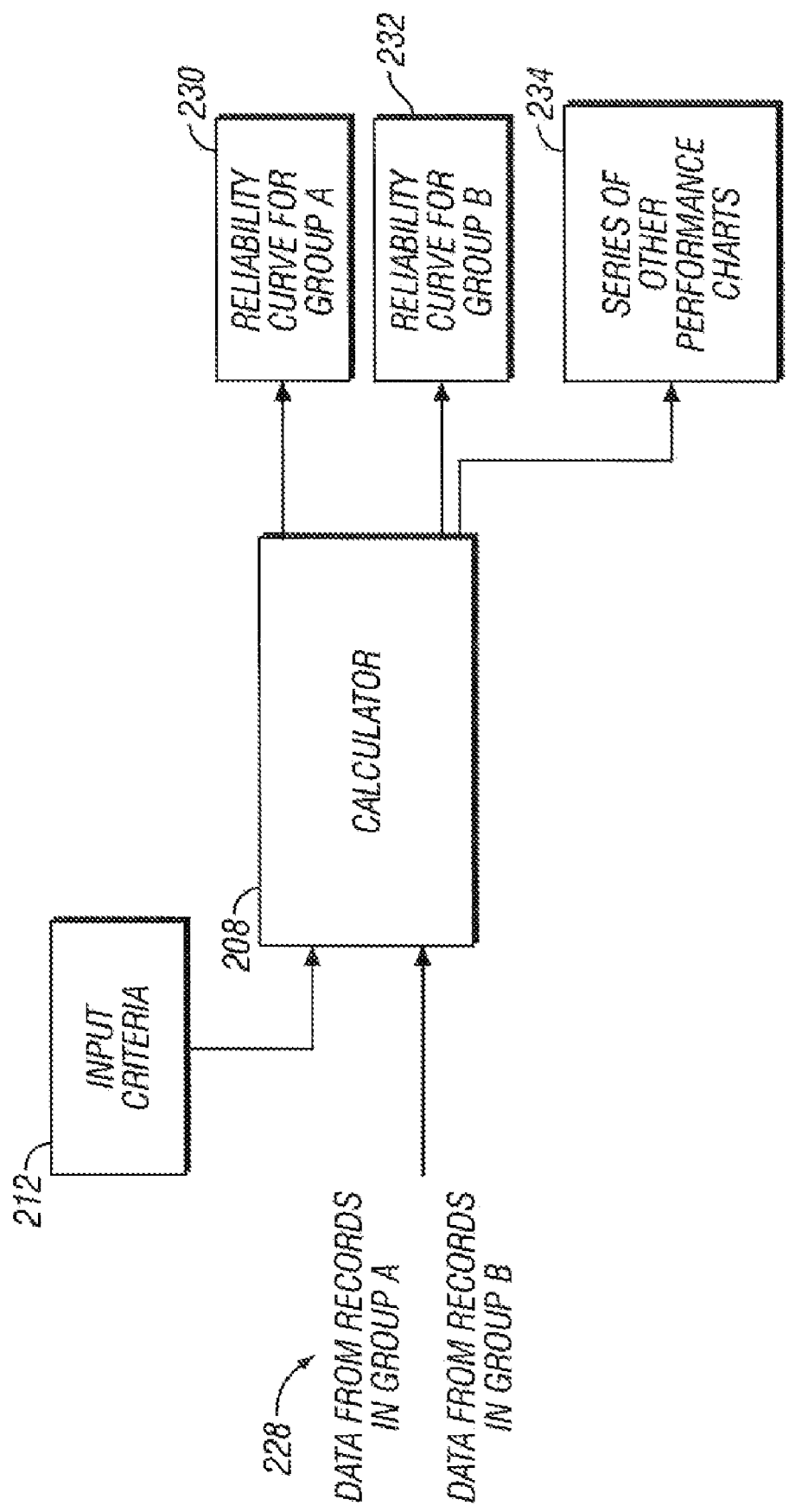
FIG. 10 shows one example of a calculator in accordance with an embodiment of the present invention.

Referring to FIG. 10, the calculator 208 is adapted to accept as input data from records output by the filter (206 in FIG. 8). The calculator is also adapted to accept selected input criteria 212 needed for processing data. The calculator 208 is further adapted to obtain and calculate values necessary to output desired performance analysis data including values calculated for at least one reliability curve 230. In a case where data from the filter is separated into groups of records, the calculator 208 is adapted to calculate and output values for a reliability curve 230, 232 for each of the groups. In one or more embodiments, the calculator is also adapted to output data for a series of other performance charts 234. The other performance charts may include box and whisker plots, bar charts, pie charts, scatter plots, Pareto charts, and line graphs, summarizing the performance data recorded in the qualified records. Examples of such charts are shown in FIGS. 18A-18Z, 19, and 21.

Figure 11:
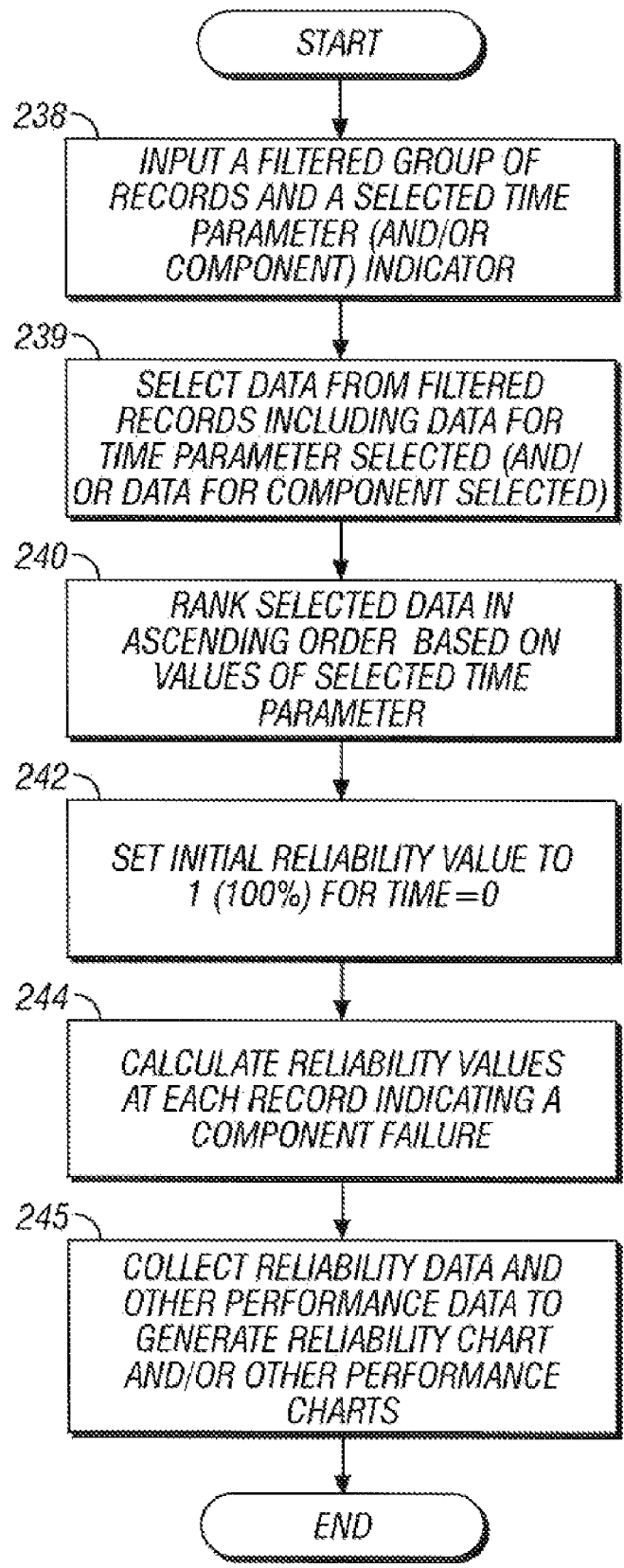
FIG. 11 shows a flowchart of the functions performed by a calculator in accordance with an embodiment of the present invention.
Figure 17:
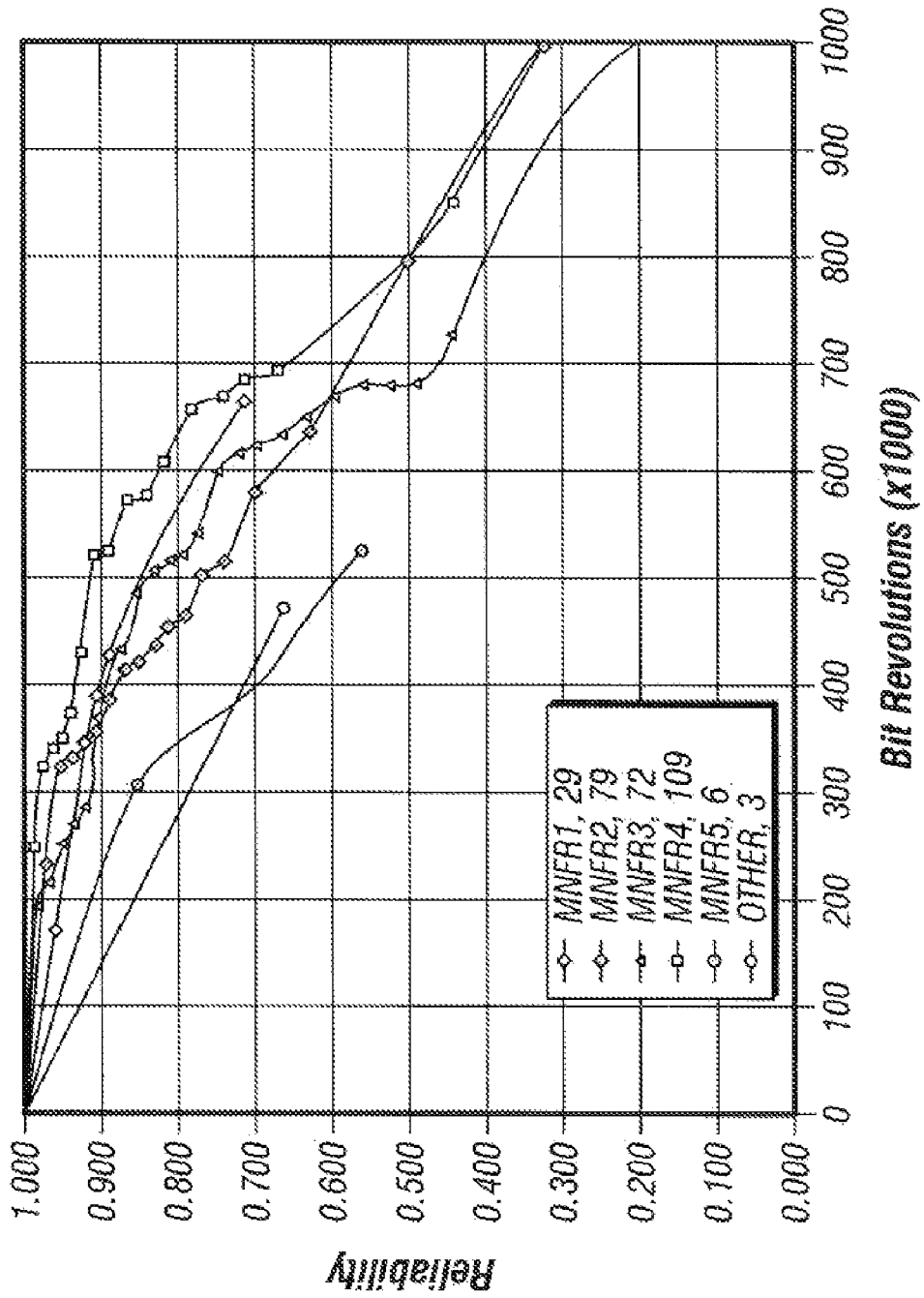
FIG. 17 shows one example of a set of reliability curves generated by one embodiment of a performance analysis tool in accordance with an aspect of the present invention.

As shown in FIG. 11, in one embodiment the calculator 208 is adapted to calculate values for a reliability curve and to generate a corresponding reliability curve for one or more groups of records. The calculating includes accepting as input the one or more filtered groups of records and a selected time parameter indicator 238. The selected time parameter indicator indicates which time parameter the reliability curve is to be calculated based on. The reliability curve based on different time parameters will typically be different. Therefore, the calculator accepts the time parameter indicator as input and uses it to determine which time parameter data reliability calculations will be based on and to select the desired data 239. The calculator may also be adapted to accept a component indicator as input 238 to indicate which component the reliability is to be calculated for. The calculator may also be adapted to use the component indicator to determine which data field component data will be selected from 239.

The calculator is also adapted to rank the qualifying records in each group in ascending order based on the recorded values for the selected time parameter in each of the records 240. Then, starting with an initial reliability value equal to 1 (i.e., 100% reliability at a time value equal to zero) 242 and using a reliability equation, such as the one shown as Equation 1, the calculator calculates a reliability value at each of the times where the component condition parameter is indicated as failed based on data in the set of desired records 244. The calculator is further adapted to provide calculated data in the proper form to generate one or more performance charts 245. In one or more embodiments, the performance charts include at least one reliability curve. The calculator may be further adapted such that when the set of desired data is provided to the calculator in separated groups, the calculator performs the above functions for each of the groups to calculate reliability curves for each and other performance data to be included on performance charts.

In one or more embodiments, data passed through the filter is automatically passed to the calculator, and data calculated or passed through the calculator is automatically passed to a graphics generator which automatically generates performance charts. In such case, if a user changes the time parameter selected as the basis for calculating reliability, the change will be automatically passed to the calculator, and the calculator will automatically re-rank the records 240 based on values for the newly selected time parameter, recalculate the reliability curve based on the newly selected time parameter 242, 244 and collect data to generate new performance charts showing the reliability curve for the newly selected time parameter 245.

To generate charts showing calculated reliability curves, the calculator may be adapted to rearrange and format data into the correct sequences for generating final charts. In one or more embodiments, the calculator includes or is linked to a graphics generator. Reliability values and their corresponding time parameter values are input into the graphics generator which is preformatted to accept the data and generate the desired graphs. In one or more embodiments, the graphics generator is adapted to automatically generate reliability curves based on data calculated by the calculator.

In one or more embodiments, the calculator is also adapted to obtain and calculate other values typically considered during a performance analysis study, such as median, average, minimum, maximum, fifth percentile, $1^{st}$ quartile, $2^{nd}$ quartile, third quartile, and ninety-fifth percentile values for each of various performance parameters recorded in or derived from data in the set of desired records. In the case of a bit performance analysis as further described herein, the performance parameters may include parameters such as the starting depth (depth-in) for drilling, footage drilled, hours run, rate of penetration, number of revolutions, cost per foot, etc.

A graphics generator in accordance with embodiments of the invention can be adapted to generate any type of chart desired from a performance analysis study, such as box and whisker charts, bar charts, line charts, pie charts, histograms, and/or scatter plots showing various performance data calculated or obtained from data in the filtered records. These charts may be graphically generated on a computer screen (monitor) or provided as printed charts. In one or more embodiments, when the desired data from the filter is passed in groups, values are calculated for each of the different groups and then charts showing the comparative performance of each of the groups may be automatically generated by passing the performance data to the graphics generator. One example of different types of performance charts that may be generated by a performance analysis tool in accordance with an embodiment of the present invention is shown in FIGS. 18A-18Z, 19 and 21.

Figure 22:
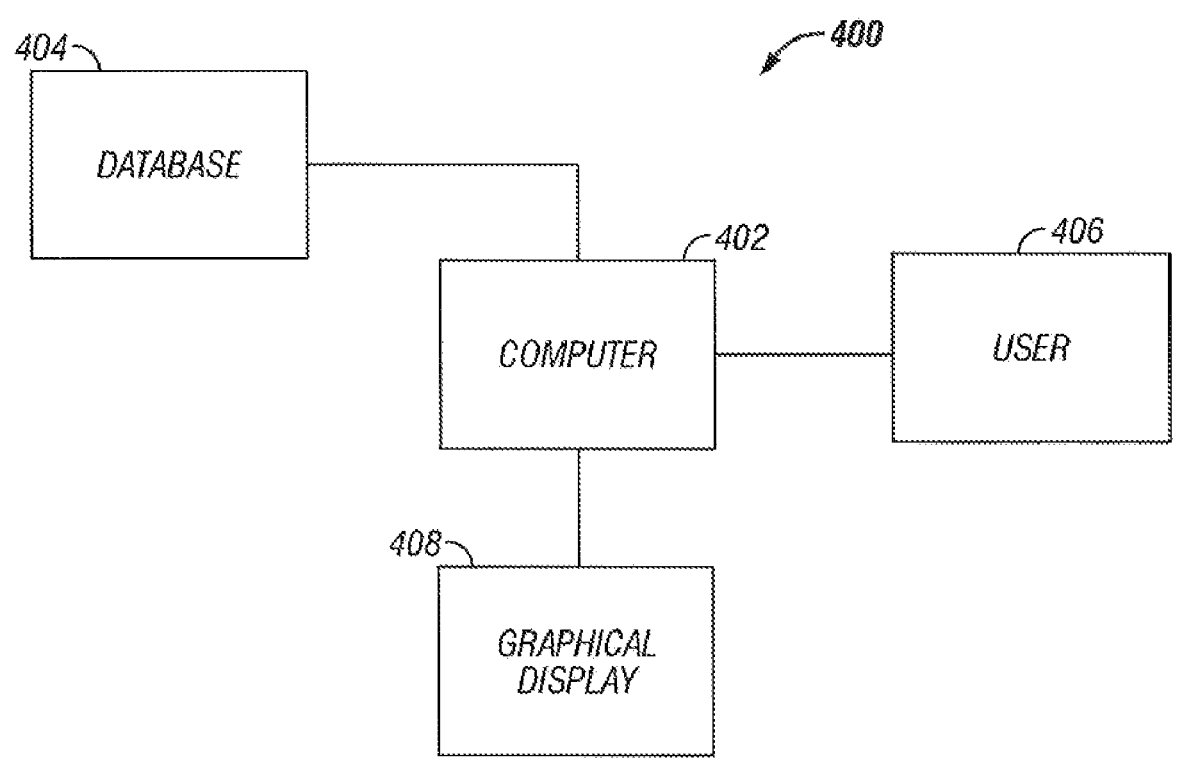
FIG. 22 shows one example of apparatus used for embodiments of the invention.

Apparatus for embodiments of the invention is shown in FIG. 22. In this embodiment the system 400 includes a computer 402 and a graphical display 408. The performance analysis tool is carried out in a program on the computer which accepts input from a user 406 and uses it as input criteria and accepts records from a database 404. The computer 404 may be operatively coupled to the database 402.

Example

Bit Performance Analysis Tool

One example of a performance analysis tool in accordance with an embodiment of the present invention will now be described. In this example, the performance analysis tool is a bit performance tool implemented as a workbook program on a computer created using a Microsoft® Excel® workbook. The bit performance tool includes a plurality of spreadsheets programmed with data cells linked by functions to provide the automatic functionality desired in the bit performance tool. In this example, the bit performance tool is specifically adapted to accept drill bit performance records ("bit run records") and filtering criteria as input. The tool is also adapted to filter the records to identify desired records for the performance analysis based on the filtering criteria. The tool is further adapted to calculate performance data characterizing the collective performance of drill bits and to automatically generate a series of performance charts based on the calculated data.

The spreadsheets in the workbook program include thousands of linked formulas tied together with a page of filtering criteria which provide the ability to automatically filter records provided as input, calculate performance analysis data, and generate the performance charts. The performance charts automatically generated by the bit analysis tool includes a reliability curve as well as a plurality of other performance charts desired from the performance analysis. Because formulas in the workbook program are linked to the filtering criteria, calculations and charts are automatically updated when a change is made to the filtering criteria. The calculator may be adapted to perform calculations once filtering criteria is entered based on user input, such as pressing a function key.

Input Data

The bit performance tool in this example includes a datasheet which is a spreadsheet adapted to accept bit run records as input. Each of the bit run records input into the datasheet is arranged in a row, with data for different data fields in the record arranged in different columns on the row. The tool may be adapted to accept any number of bit performance records in the datasheet. In one software program, the data sheet was adapted to accept up to 1,000 bit run records, each having up to 171 different data fields. In another software program, the datasheet was adapted to accept up to 3,600 rows of data. The number of records accepted by a datasheet and the number of data fields in each record are not limitations on the invention.

Bit run records input into the datasheet may be obtained from a bit records database. A bit records database typically contains bit run records having data fields in each record arranged in a known order. For example, the first data field may be known to contain country code data, the second data field may contain state code data, the third data field may contain county code, etc. The bit performance tool is adapted to access data from records in the datasheet based on the known location (known column) for each type of data. Having a bit performance tool adapted to automatically access data from a datasheet based on its known location in each record permits an automatic analysis of the data records by the bit performance tool.

One example of the type of data that may be included in a bit run record is illustrated on the bit record form shown in FIGS. 12-13. Bit record forms are typically filled out by a driller for each drill bit used during a drilling operation to record the operating conditions used for the drill bit and the final condition of the drill bit after the operation. Information recorded on the bit record form is later entered and stored into a bit records database. Data that may be recorded on a bit record form includes operation data, such as information about the well (e.g., name of the operator, drilling contractor, rig, lease, well number, rig equipment, rig elevation, rig type, etc.), operation location (e.g. the country, state, county, block, subblock, district, section, township, range, oil field, latitude, longitude, UTM coordinates, etc.), drill bit information (e.g., bit number, bit size, bit manufacture, bit type, jet information, etc.), other operation and performance information (e.g., start date, end date, depth-in, depth out, footage drilled, hours drilled, rate of penetration (ROP), weight on bit (WOB), motor speed, total speed, drilling pressure, mud properties), and component condition information (e.g., final cutting element conditions, cutting structure conditions, bearings/seals conditions, nozzles condition, etc., and reason pulled, etc.). The type of information provided in a data record is not a limitation on the invention.

Data input into the datasheet of the bit performance tool may be imported from a bit records database, linked directly to a database to query the database, or cut and pasted into the datasheet. A row of headings may be included at the top of the datasheet, above each column for data to indicate the type of data contained in the column.

In some cases, records input into the datasheet may be conditioned by adding columns of calculated data to the records, such as calculated parameters that can be easily derived or calculated from the data provided in the bit run record. This conditioning may be performed automatically in the datasheet by embedding formulas in the data sheet to calculate desired values from data inserted into the datasheet, or may be performed prior to providing the data into the datasheet. For example, additional columns of data calculated for records based on data in the record include; work rate (WR=WOB*RPM/bit size), total energy (TE=revolutions*weight/bit size), the weight on bit value to be used for analysis (e.g., this could be selected as value for the high weight or low weight contained in the record, or a calculated average weight), the RPM value to be used for analysis (e.g., this may be the recorded high RPM, low RPM, or an average RPM value), the "krevs" (thousands of bit revolutions, KREV=RPM*Hrs*conversion), a calculated bottomhole pressure, drillability factor (Kf), data indicating the type of RPM ("HI" if motor, etc. used, otherwise "LO"), bearing grade conversions (converted Boolean value based on whether hearing/seals are effective=0 or failed=1), bearing failure indicator (if failed value=1, otherwise insert "xx"), revolutions for seals if failed (e.g., if seals failed, insert KREVS value, otherwise insert "xx"), revolutions for scals if effective, RPM checker (e.g., if RPM within acceptable conditions insert value=OK, otherwise insert "xx"), bit group criteria (If [selected data found in record], then value=[a group indicator]), etc. Other columns of data may also be added to bit run records in the datasheet as determined by the system designer. Whether or not a record is conditioned is not considered a limitation on the invention.

Filter

The bit performance tool also includes a filter. The filter is adapted to automatically identify bit run records to be included in the performance analysis based on filtering criteria. Filtering criteria may be input into the filter by a user to define a customized performance analysis to be carried out by the tool. In this example, the filter includes a filtering criteria sheet and filtering functions linked to cells in the filtering criteria sheet.

An example of a filtering criteria sheet 302 is shown in FIG. 14. The filtering criteria sheet 302 includes a plurality of data cells in a spreadsheet that are adapted to accept filtering criteria as input for filtering out unwanted bit run records that may be included in the datasheet. Filtering criteria input into the filtering criteria sheet 302 is used to filter records so that only desired bit run records will be considered in calculations performed by the tool to allow for customized performance analysis studies using the tool. The filtering criteria sheet 302 is configured such that the primary filtering criteria used to filter the records can be entered in input cells generally provided in the top section 303 of the filtering criteria sheet 302.

The filtering criteria sheet 302 also includes a plurality of "title cells" or "prompting cells" adjacent to corresponding input data cells (typically left of the input cell) which contain text indicating the type of filtering criteria data that may be entered in the input cell. For example, the title cells shown in column A, rows 1-37 have corresponding input cells shown in column B, rows 1-37. The title cells may be shaded a first color and the input cells shaded a second color to more clearly distinguish the two for users. The filtering criteria sheet 302 may also include additional information displayed adjacent to input cells (generally shown to the right in parenthesis) that provide additional information for the user, such as examples of or instructions for the type of data appropriate in the adjacent input cell. The filtering criteria sheet 302 may also contain validation criteria, or drop down boxes, or selection pick lists to facilitate rapid and accurate entry of criteria. Additional help may also be accessed by hidden comment boxes or activated through a help function.

Figure 18A:
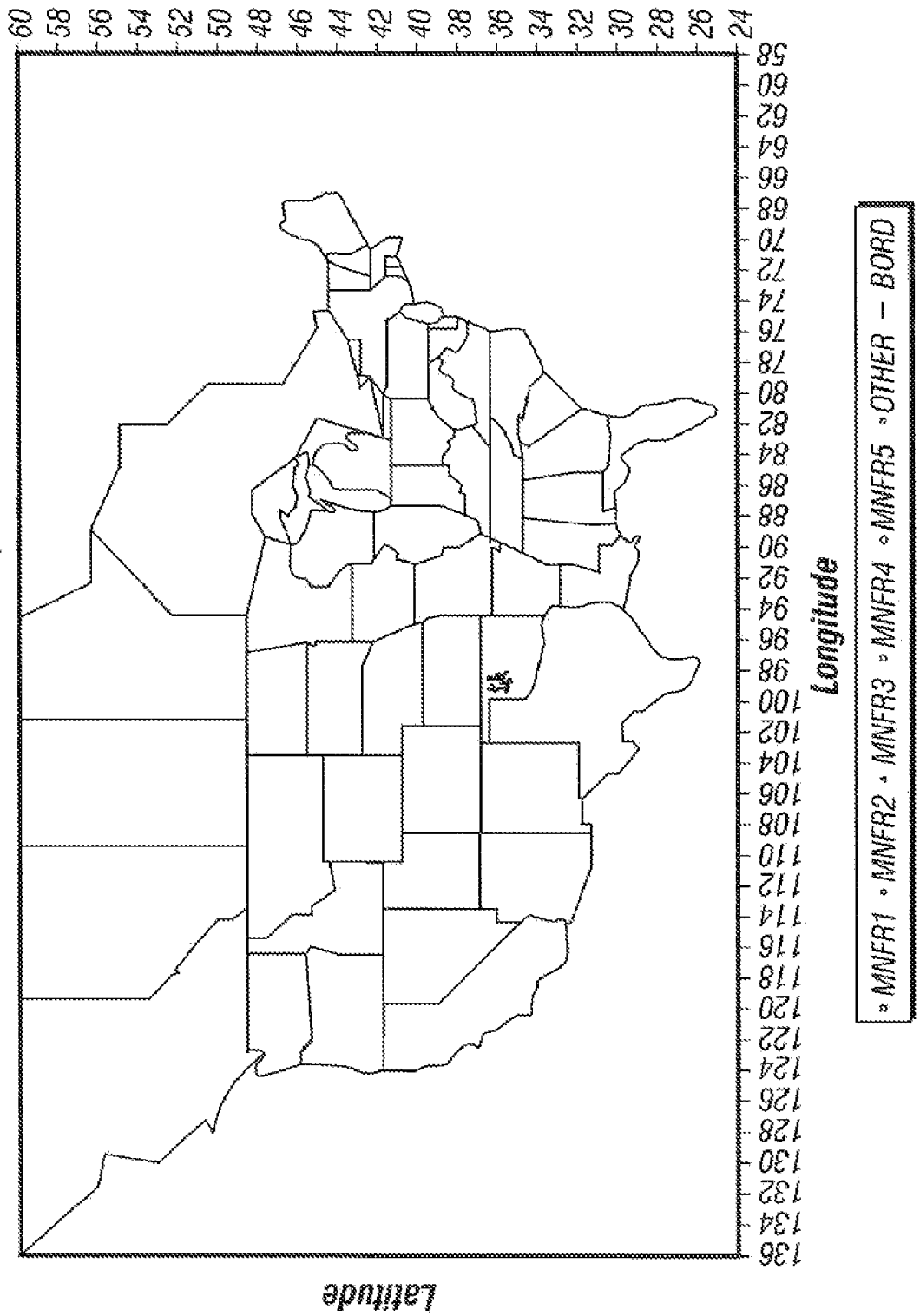
FIGS. 18A-18Z show examples of other charts, maps, and graphs that generated using a performance analysis tool in accordance with an embodiment of the present invention.

As shown in FIG. 14, the filtering criteria sheet 302 is adapted to accept different types of filtering criteria from as input to selectively limit or control which bit run records will be considered in the performance analysis. The filtering criteria sheet 302 is specifically configured to accept filtering criteria related to data contained in hit run records. In the example shown, filtering criteria that may be provided as input includes data related to most of the data noted above as included in a bit run record, including location data (country, state, county, latitude and longitude coordinates, miles search radius from latitude and longitude coordinates) for limiting bits considered to bits run in a defined location or region; other operation information (including rerun codes, IADC code, product code, start date (SPUD-date) range 304, end date (TD-date) range, depth-in range, depth-out range, weight on bit range, highest and lowest RPMs to consider, deviation out range, and mud weight range). Filtering criteria that may be provided as input also include operation indicators, such as an "OK" indicator for RPM to filter out records where the RPM value is outside of an acceptable range, a "HI"

or "LO" indicator for RPM to indicate whether only high speed (e.g., with a down hole motor, turbine, etc.) or only low speed (e.g., without a down hole motor, turbine, etc.) drilling operations should be considered, and several "Yes/No" indicators for whether only bits with failed seals should be considered, whether bits pulled green (drilled for short hours) should be filtered out, whether only bits with seals graded or teeth graded should be considered, and whether the longest bit run should be assumed "failed" for calculating reliability curves. Filtering criteria that may also be provided as input includes a number of revolutions to filter out as an early failure and a number of different depth-in ranges 305 for grouping performance data by depth ranges and generating particular depth plots, such as shown in FIG. 18G.

In the example shown, the filtering criteria sheet 302 is also adapted to accept a user select the time parameter indicator, 308, to indicate which time parameter to use for calculating reliability curves. The time parameter choices includes thousands of bit revolutions (KREV), feet drilled (FEET), hours drilled (HRS), or the total energy during drilling (TE). In other embodiments, the worksheet is also adapted to accept a user selected component indicator for indicating which component reliability will be calculated for. Component parameter choices may include bearings/seals, cutting elements, cutting structure, nozzles, all (to indicate failure of any component), etc. The filtering criteria sheet 302 is also adapted to accept user input defining a calculated reliability (or confidence level) 310 at which a user would like to pull a bit. This selected reliability value is used to calculate a bit life prediction for a bit of a bit group (at 312) indicating when a bit should be pulled for a selected reliability value based on the analysis conducted for similar bits. This value is rendered based on the time parameter selected as the basis for reliability curves and may be indicated, if desired, on performance charts.

Filtering criteria that may entered in the filtering criteria sheet 302 also includes one or more bit group indicators (or criterion) 306 to separate bit run records into groups. Bit group criteria 306 is entered at the top of the filtering criteria sheet adjacent cells containing the text "BIT GROUP #" (wherein # represents the numbers 1 through 6). Providing a tool adapted to separate data records into groups based on selected criteria allows for the automatically analysis and generation of performance charts for up to six different groups of bit records simultaneously and the automatic comparison of the groups of bits provided on charts. In other embodiments, the performance analysis tool may be adapted to allow for the comparative analysis of any number of bit groups. In the example shown, the filtering criteria sheet 302 accepts manufacture's codes data as a bit group criteria. Manufacture's codes or other group identifying data may be included in each of the records or added in by conditioning.

The filtering criteria sheet 302 is also adapted to accept data used to selectively control calculations performed by, and features of the output generated by the bit performance tool. For example, the filtering criteria sheet 302 is adapted to accept as input a selection of the units of measure, at 311, desired for the output generated by the bit performance tool, such as metric or English units. Unit conversions are carried out in a calculator included the tool depending on the units of measure data as input at 311. The filtering criteria sheet 302 is also adapted to accept as input economics data used in calculations performed by the calculator, including an estimated rig rate per hour, an average or estimated bit price for each bit groups, average motor and/or tool costs per hour for operations for each group, indicated at 309. The filtering criteria sheet 302 additionally includes cells having functions imbedded therein to retrieve and display desired numerical performance results, generally shown at 314.

In other embodiments, filtering criteria may include data related to a rock formation type, age, name, lithology, mud properties, etc. Those skilled in the art will appreciate that in other embodiments, a filter may be adapted to accept any filtering criteria related to data contained in records in the datasheet to filter the records. Thus, the type of filtering criteria accepted by the filter is not considered a limitation on the invention.

In the example shown in FIG. 14, the filtering criteria entered into the filtering criteria sheet 302 includes manufacturing codes "Mnfr1," "Mnfr2," "Mnfr3," "Mnfr4," "Mnfr5," and "Other" as bit group criteria at 306. The filtering criteria entered also includes a SPUD date range (from Jul. 1, 2000 to Dec. 31, 2004), "N" for "NO" to indicate that records should not be limited to only bits with graded seals, and "N" for "NO" to indicate that the longest run bit in each group should not be considered failed when calculating reliability curves. A short bit run limitation of 300 KREVS (300,000 revolutions) is also included to filter out short bit runs that may not contain good data, and a bit pull reliability value of 0.750 (or at 75% reliability). An estimated rig rate per hour of $400, average bit price of $6000 for each group, and the desired units of measure (feet, pounds, and pounds per gallon) are also included. The time parameter selected for reliability calculations KREVS (thousands of bit revolutions) at 308.

Filtering Functions

Figure 15B:
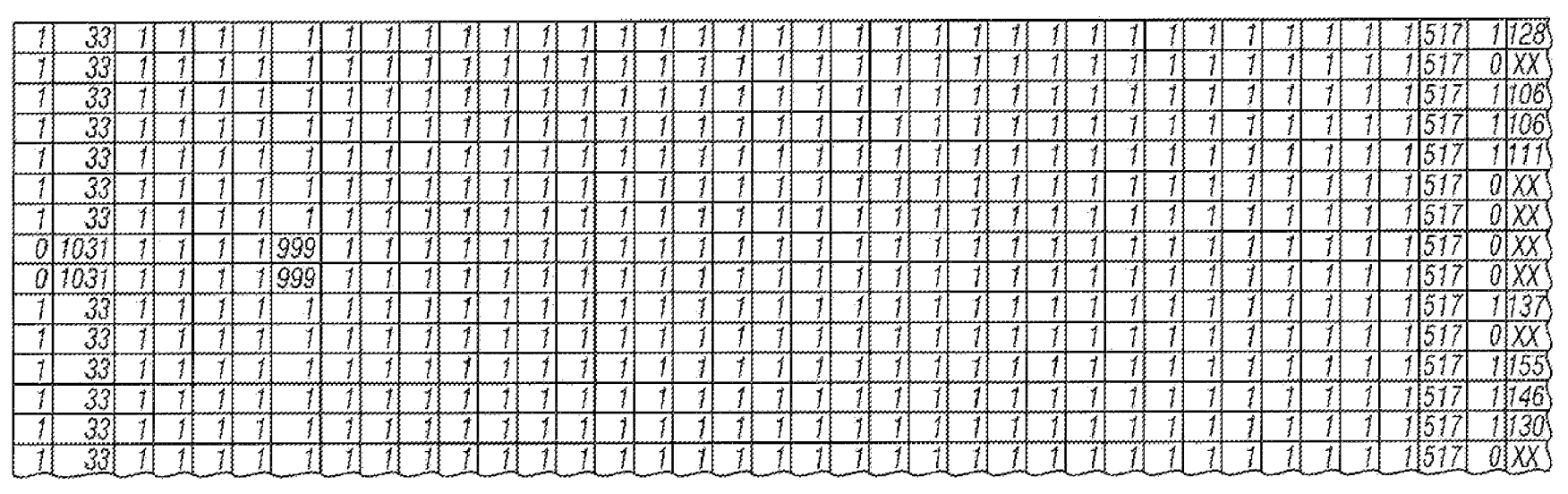

Referring to FIG. 15, the filter also includes a filtering functions worksheet containing filtering functions (e.g., 321, 323) embedded in cells. Each filtering function includes a conditional statement, such as an "if-then-else" function, which is specifically developed to apply a filtering criteria to the related data in a hit run record and determine whether the data in the record satisfied the filtering criteria. A filtering function is developed for each of the filtering criteria accepted on the filtering page. Each filtering function is developed to access a specified filtering criterion (based on its known address) from the filtering criteria sheet and comparing it (through a conditional statement) to the corresponding cell of data in a record on the datasheet.

In the filtering functions worksheet, a filtering function applying (or comparing) each of the filtering criteria to corresponding data in a bit run record is provided. The filtering functions applied to a record may be arranged in a row, with the filtering function for each filtering criteria being applied arranged in a different column of the row. For a datasheet designed to accept up to 1,000 data records, there are 1,000 rows of filtering functions wherein each row includes the filtering functions applying each filtering criteria to related data in one of the records. In the example shown in FIG. 14, up to 33 different filtering criteria can be entered in the filtering criteria sheet 302; therefore, the filtering criteria sheet includes 33 columns of filtering functions, with 1,000 filtering functions in each column applying filtering criteria to each of the records that may be input into the datasheet.

Each of the filtering functions in the filtering functions worksheet is adapted to generate a value representing the outcome of the application of the filtering criteria to data in the corresponding bit run record. For the example shown in FIG. 15, the top row of values show example filter function values and do not relate to any record in the datasheet. The first column of functions have been developed to correspond to country code data that may be entered in the filtering criteria sheet 302. The filtering functions in the first column are developed to apply the country code filtering criteria (based on its known location on the filtering worksheet) to the corresponding country data (based on its known location in the datasheet), using an if-then-else type statement, such as:

"if ([datasheet, column A, row i]=[filtering criteria sheet, column B, row 4]) or ([datasheet, column A, row i]= [filtering criteria sheet, column D, row 4]) or ([filtering criteria sheet, column B, row 4]=[null] and [filtering criteria sheet, column D, row 4]=[null]}, then Value=1, otherwise, value=999]"

wherein [null] is a non value (such as spaces or an empty cell), and i varies from 1 to 1,000, for example, depending on which row of records in the datasheet the filtering function is being applied to. Considering the above pseudo code, if one of the filtering function statements is true (i.e., one of the filtering criteria conditions are met), the filtering function will render a value of 1, which indicates that the cell of data from the bit run record corresponding to the specified filtering condition is met. Otherwise, the filtering function renders a value of 999 to indicate that the data in the bit run record did not satisfy the specified filtering criteria. Similar functions are written to apply each of the filtering criteria to the data in each of the records on the datasheet. A failed filtering outcome can be seen for example when considering the SPUD-DT filtering criteria applied to the third record on the datasheet, at 323. Because its SPUD date is out side of the range indicated on the filtering criteria sheet, the filtering function renders the value of 999, indicating that the SPUD date data failed the filtering criteria.

The matrix of filtering functions can be derived by developing a filtering function for each filtering criteria applying each filtering criteria to corresponding data in a first record. Then with the filtering criteria address fixed and the column address for the datasheet fixed, copying and pasting the row of filtering functions to automatically generate the other rows needed for the filter. From the example pseudo code provided above and the description above, the other filtering functions and calculator functions (described below) can be derived as desired by a system designer.

The filter shown in FIG. 15 also includes a filtering results column 325 which summarizes the outcome of applying filtering criterion to each of the data records (shown under column heading "##"). Functions are embedded in the filtering results column 325 to sum the values rendered by the filtering functions for each record. As stated above, in this example 33 filtering criteria were applied to data in each record. Therefore a cell in the filtering result column 325 having a value of 33 indicates that the corresponding record passed all of the filtering criteria applied. A cell having a value in excess of 1000 indicates that the corresponding record failed the criteria. An outcome column 327 (having the heading "MAX") adjacent the filtering results column 325 contains functions developed to render a Boolean value depending on whether the data in the filtering results column indicates that the corresponding record passed the filter. If the record is indicated as passed, a "true" value of 1 is returned to the outcome column 327. If the record is indicated as failed, the outcome function generates a 0.

Based on values rendered for each record in the filter outcome column 327, the records are then separated into groups based on the bit group criteria provided in the filtering criterion page 302. In the example in FIG. 14, the bit group criteria 306 provided as input to the filtering criteria work sheet 302 are "Mnfr1," "Mnfr2," "Mnfr3," "Mnfr4," "Mnfr5," and "Other." Referring to FIG. 16, the filter includes a group filter 329 for each of the groups (partially shown). Each group filter 329 includes a matrix of grouping functions linked to the corresponding bit group criteria (306 in FIG. 14) provided in the filtering criteria sheet (302 in FIG. 14). The grouping functions are provided to separate records passing other filtering criteria into groups based on data in the bit group data field (column) of each record. Each group filter 329 contains functions embedded in columns to render parameter values desired from each record if the record is determined to belong to the group. A row of functions in each group filter 329 corresponds to a single record in the datasheet. The grouping functions are developed such that if the record passed the filter criteria (indicated by an outcome column value of 1) and the corresponding group indicator from the filtering criteria sheet matches data in the record, the desired data values from that bit run record are returned in the data cell containing the function. If the record failed the filtering criteria or the group indicator does not match, an "xx" is returned for all of the functions in that group. In this way, only records that belong to the group are mapped to each group area.

In this example, desired data from records qualifying for each group are returned to the "group datasheet", shown in FIG. 16. The data mapped to the group datasheet includes data corresponding to the depth-in (DPTH-I), footage drilled (FOOTAGE), hours drilled (HOURS), rate of penetration (ROP), number of revolutions (in thousands of revolutions, KREVs), number of revolutions to bearing/seal failure (KREV-F) (KREV value rendered only if bearing/seals were indicated as failed), calculated cost per foot (CPF), and a count value (CNT) (value of 1 rendered if data record belongs to the group, value of 0 rendered if data record docs not belong to the group). The data mapped in this case also includes weight on bit (WOB), however this parameter will change to one of several operating parameters based on the parameter selected on the filtering criteria sheet 302 at 307 for plotting customized box and whiskers plots (see FIG. 18Z). Count values are summed for each group to determine the total number of records n in each group. The data is placed in each group based on embedded functions, such as:

"If {group indicator} = {bit group data from data record}, then {CNT} = 1, otherwise {CNT} = 0;" or
"If {CNT} = 1, then {DPTH-I} = {DPTH-IN from data record}, otherwise {DPTH-I} = xx"

Using functions similar to the example above, values desired front records belonging in a group will be obtained in the group datasheet, and records that do not belong to the group will be filtered out. Once all of the data for each group is mapped to the corresponding group datasheet, the collected data for each group is used as input for a calculator.

Calculator

For this example, the calculator of the bit performance tool is adapted to take data collected for each group on the group datasheet and use it to calculate a reliability curve for the group based on data from the records in each group. The calculator in this example includes a plurality of functions embedded in data cells in a calculation sheet. Similar to the filter described above, the calculator carried out in EXCEL® collects data and performs calculations in phases.

The calculator is adapted such that based on the time parameter entered (at 308 in FIG. 14) and on the filtering criteria sheet (302 in FIG. 14), the calculator retrieves as input data needed for calculating the reliability curve for each group of records. With linking functions, the calculator then sorts the grouped data in ascending order based on the values of the selected time parameter and adds a "starting data set" to each group corresponding to a time parameter of zero when reliability is equal to 1 (100%). Using linking functions, the calculator 208 then numbers (ranks) the sorted data from 1 to N (N=total number of group records+1), with the first data set being the starting data set (with a reliability value of 1). Then starting with the reliability value of 1, the calculator 208, calculates the reliability associated with failed components based on the ranking assigned to the failed data set and the total number of records considered for the group (N).

Somewhat similar to the filters group datasheets (in FIG. 16), the calculator is adapted such that the first calculation sheet is divided into six group calculation areas (one for each group) which are each adapted with embedded functions to collect data from the corresponding group datasheet that can be used for calculating reliability. In this example, data that may used for calculating reliability includes component condition data for a selected component and the corresponding values for the selected time parameter to form the basis for reliability calculations (indicated at 308 in FIG. 14). Each row of collected data in a group calculation area corresponds to a record from the datasheet.

Each group calculation area of the first calculation sheet includes six sets of columns, one set for each group. Each set of columns includes a first column for retrieving and storing values for the selected time parameter to be used for calculating reliability. The second column is for retrieving component condition data indicating the effective or failed condition of the component for which reliability is to be calculated. In the example shown, the component indicated on the filtering criteria sheet is the bearings/seals of the bit. However, in another embodiment the filtering criteria sheet is adapted such that any component of a bit may be selected as the component for which reliability is desired, such as the cutting elements, nozzles, cones, seals, etc. In the case of cutting elements, a grade value may also be input to determine which grade of the cutting element will be considered as "failed" for the analysis. Functions embedded in the second column are developed to render a Boolean value for each record, depending on whether the component was effective (effective=0) or failed (failed=1) after the drilling. For rows of data indicated in the group datasheet as not a member of the group, embedded functions for retrieving the selected time parameter and the component condition parameter are set to a value of "xx", so that those records will be filtered out or ignored by subsequent calculation functions.

The data values for each group mapped to the first calculation sheet are passed to a second calculation sheet through linking functions embedded in the second calculation sheet. Within each group, data for each record in the group are retrieved and sorted by the time parameter values in ascending order.

Group calculation areas, include several columns of data generated using embedded linking functions, wherein each row contains data for a different record in the group. A first column contains a sequential counter of 1 to n, where n is the number of records in the group. A second column has functions embedded therein to retrieve the time parameter values in ascending order. A third column has error functions embedded therein to generate an error indicator having a value of "true" for a row having no corresponding data values (records) transferred thereto. In this case, this is done because the calculation sheet is preconfigured to accept up to a particular number of records for each group. When the number of records in a group is less than the number of rows configured for calculations in the calculation sheet (typically the case), an error indicator value of "true" is used to indicate for other functions that no calculations for that rows is required. A fourth column has functions embedded therein to retrieve the effective/failed indicator, wherein the number 1 indicates a failure. A fifth column in each group includes embedded functions adapted to calculate the reliability for the record if the effective/failed indicator indicates that the condition as failed based on data values provided in the fourth column. The reliability formula used in the function is similar to that shown in Equation 1. Beyond the row for the last record in the group, functions in subsequent rows will generate error values or other values that will be ignored in subsequent calculations. This may be done as a function of data provided in the third column.

In a third area, the calculator is also adapted collect data pairs for reliability curves from each group for generating the reliability curve. Generating a reliability chart requires the elimination of data sets from each group wherein the component condition data indicates that the component was "effective", i.e., wherein no reliability value was calculated. Although all records have an influence on the reliability curve (based on total number of records), only those indicating "failed" components have a calculated reliability value for plotting on reliability charts. Collecting data pairs having calculated reliability values and corresponding time parameter values is also done in a second area on the second calculation sheet. In this area embedded functions are provided to retrieve values for the time parameter and the reliability only if a reliability value is provided in the reliability calculation column.

Generating Charts

As noted above, the calculator is adapted to collect the reliability curve data from each record group into two columns in a third area, wherein the time parameter values are in ascending order in one column and have corresponding reliability values in a second column. The performance analysis tool is adapted such that this third area is an area designated for X and Y datasets for plotting curves on a scatter plot with connected lines. The data is collected by the calculator in a format and order ready for plotting. The graphics generator comprises a scatter plot function used in EXCEL®. The scatter plot function is pre-defined to accept the time parameter values and the calculated reliability values from each group as X and Y coordinates for different curves. Using this set up, the bit performance tool can be used to automatically generate desired plots with title, coordinate labels, legends, and line colors, as desired.

Other Performance Charts

In this implementation of a performance analysis tool, the calculator is also adapted to calculate and obtain other values for performance analysis charts. In view of the detailed discussion above and the charts described below, the functions provided by the calculator and the configuration of the graphics generator will be readily apparent. Parameters obtained or calculated from records in each of the groups and for all records considered in the performance analysis including median, average, minimum, maximum, fifth percentile, $1^{st}$ quartile, $2^{nd}$ quartile, third quartile, and ninety-fifth percentile values for various parameters, including the depth-in, footage drilled, hours run, rate of penetration, number of revolutions, cost per foot, etc. Examples of performance charts generated by the program used as the performance analysis tool are shown in FIGS. 18A-18Z. These charts include maps, scatter plots, line graphs, bar charts, box and whisker charts, and pie charts, showing various performance parameters considered.

Calculations for parameters shown in these charts are automatically carried out in the calculator based on data passed by the filter, and these charts are automatically generated using selected plotting functions in Excel®. The charts are automatically generated with consistent formatting and colors used to represent groups of bits being compared. The title on the charts is a title provided as input by the user. In view of the above description for filtering, calculating and generating reliability curves, how to configure the calculator to generate these additional plots is understood and could be readily reproduced by one of ordinary skill in the art.

Figure 18B:
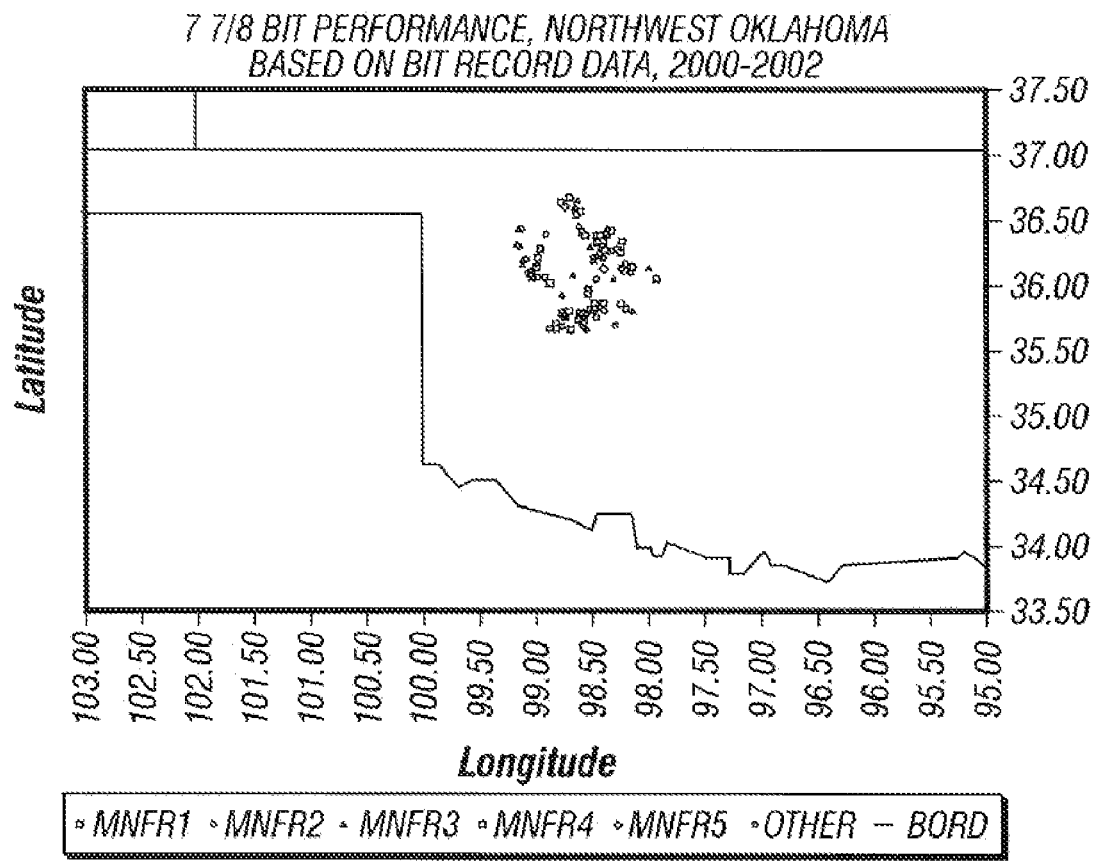

Referring to FIGS. 18A-18B, the performance analysis tool in the example described above was also adapted to generate a map showing locations of operation for the bits considered in the analysis. In view of the maps generated, those skilled in the art will appreciate that location maps may be generated by providing an area in the calculator adapted to collect latitude and longitude datasets from each of the records in each bit group and provide the data as X and Y coordinate data to the graphics generator (in this case, a designated location referenced by the scatter plot function) for generating the scatter plot shown. The graphics generator may be adapted such that the state and country boundaries are automatically generated on the map as shown. Coordinates needed for displaying such boundaries as connected lines may be obtained from several sources, such as from an almanac. Zoom features in EXCELS may be used to zoom in and out of location areas as illustrated in FIG. 18B. In other embodiments, the tool may be adapted to produce any type of location chart desired for a performance analysis. In other embodiments, the location data may be collected by the calculator and output to a mapping program which is used to generate performance maps.

Figure 18C:
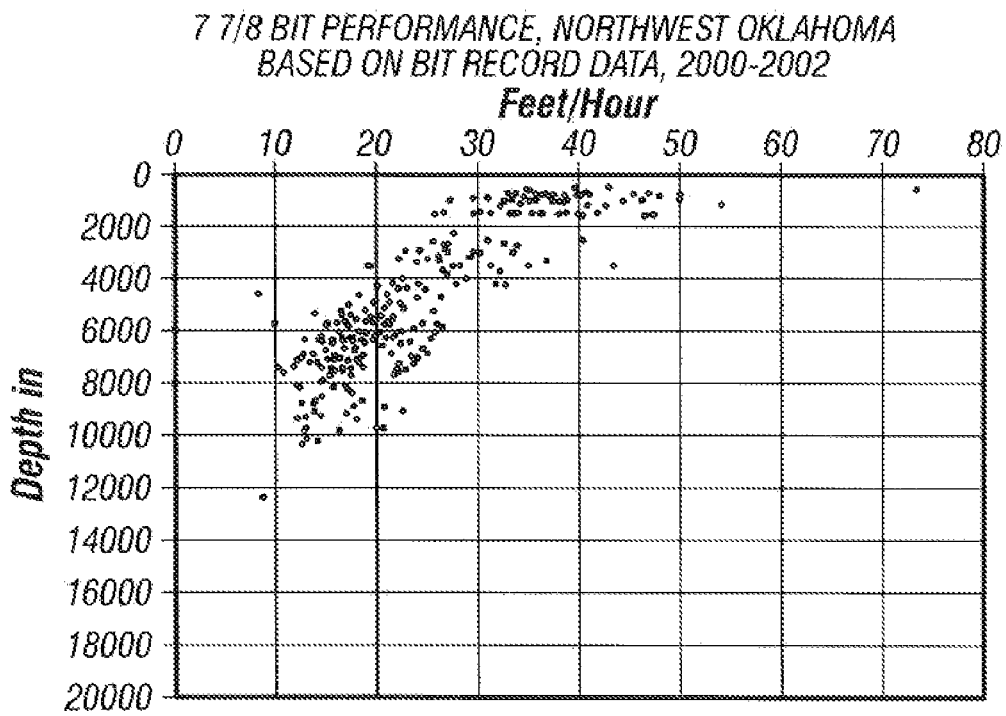
Figure 18D:
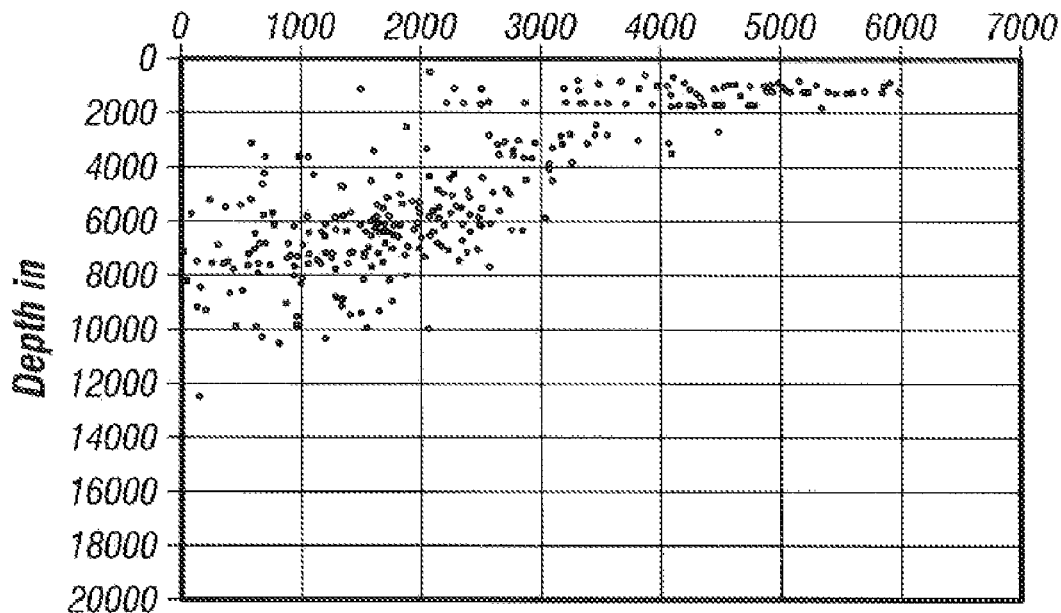
Figure 18E:
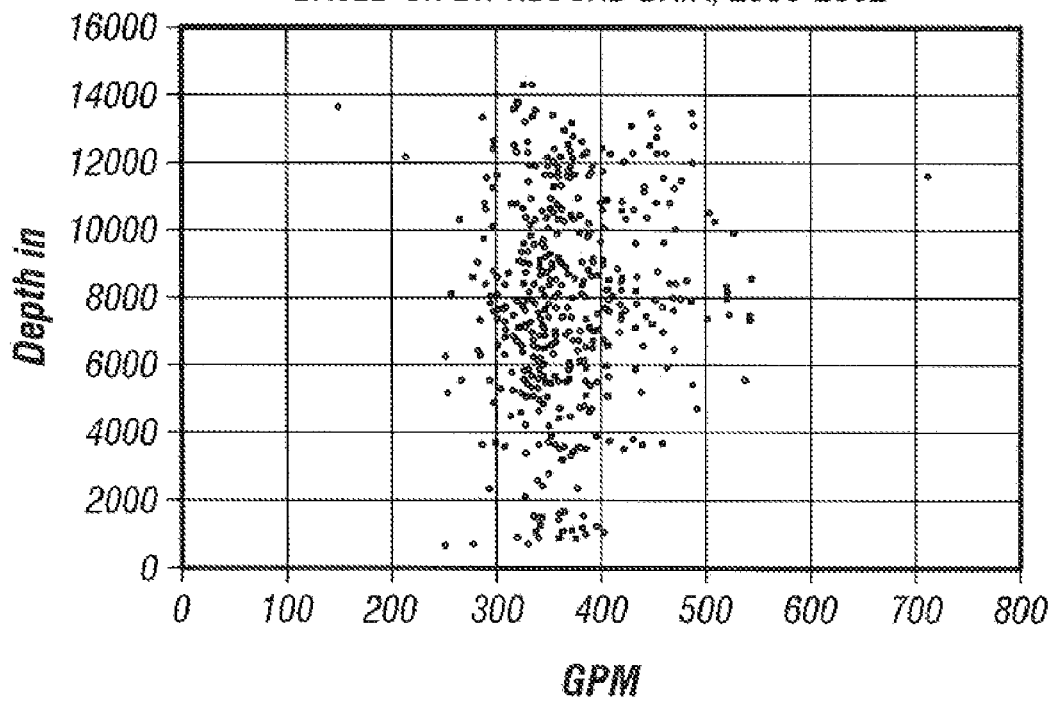

Referring to FIGS. 18C-18E, the performance analysis tool is also adapted to generate scatter plots showing various bit performance parameters for each of the bits considered in the analysis. Data from different bit groups can be differentiated by varying the graphing properties such a color, markers, size and font which are general graphing functions provided in EXCEL®. FIG. 18C-18E show depth-in versus feet per hour, footage drilled, and mud flow rate (GPM), respectively. Based on descriptions above, those skilled in the art will readily appreciate that numerous other scatter plots may be automatically generated by adapted the calculator to retrieve the desired data from the filtered dataset and passing the data as X and Y coordinate values to the graphics generator.

Figure 18F:
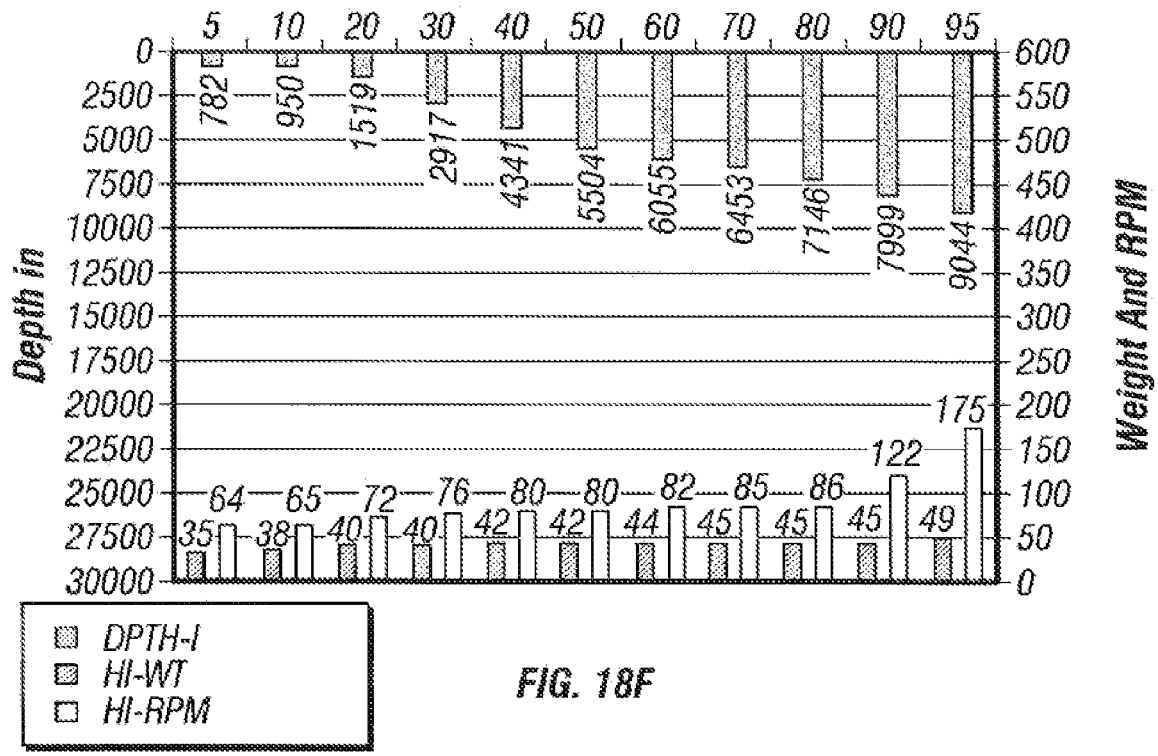
Figure 18H:
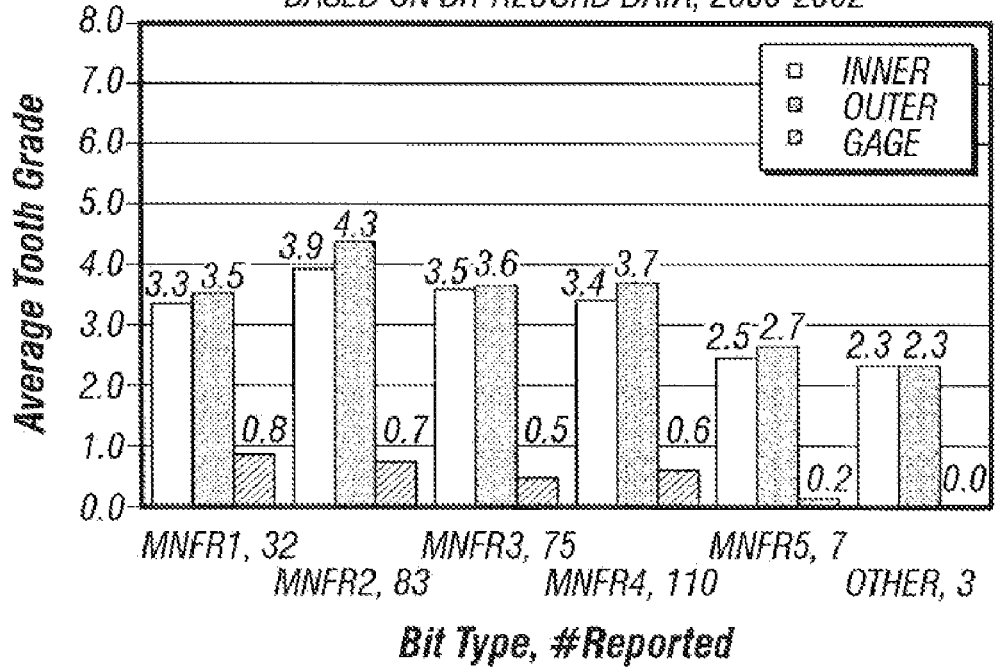
Figure 18G:
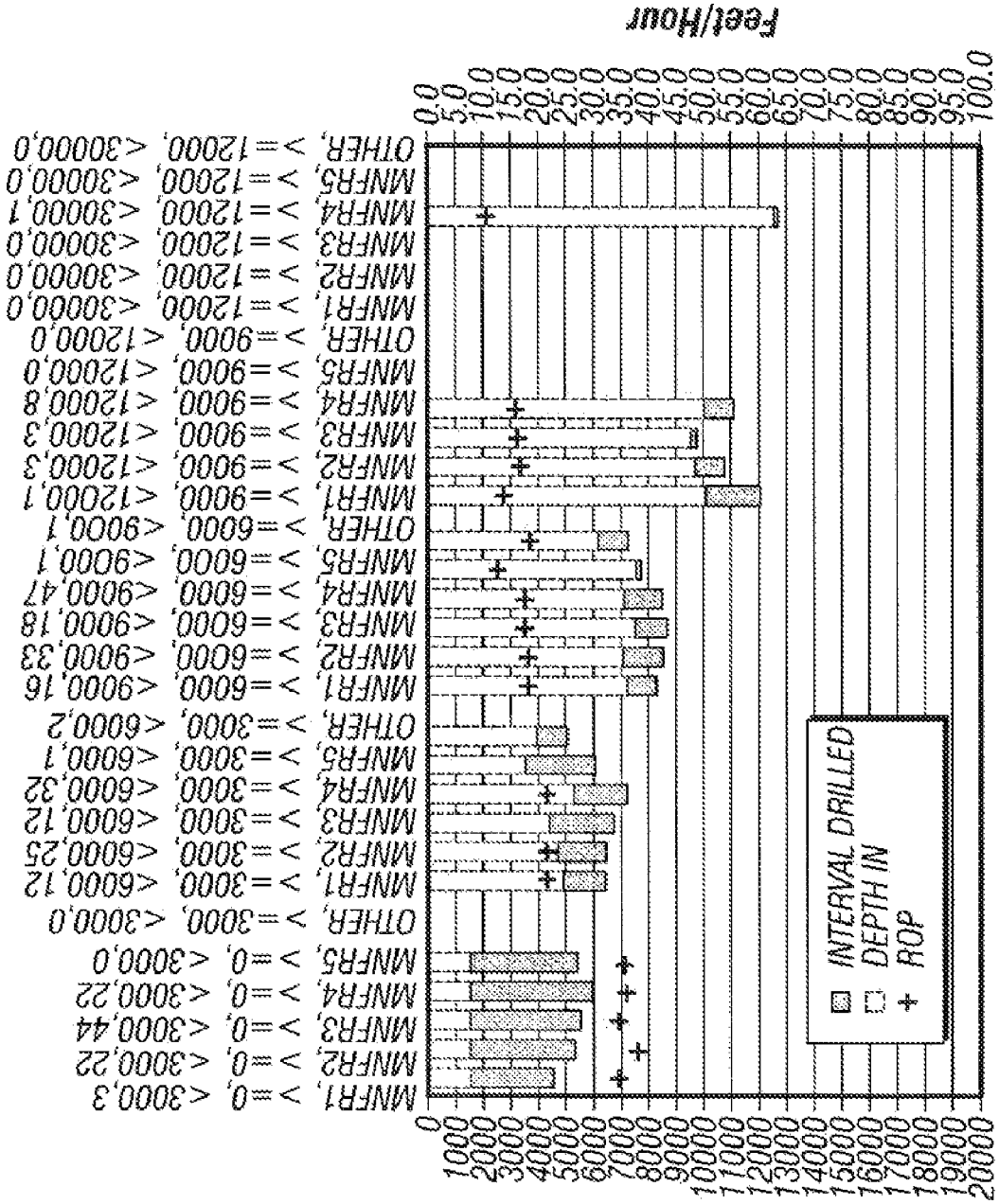
Figure 18I:
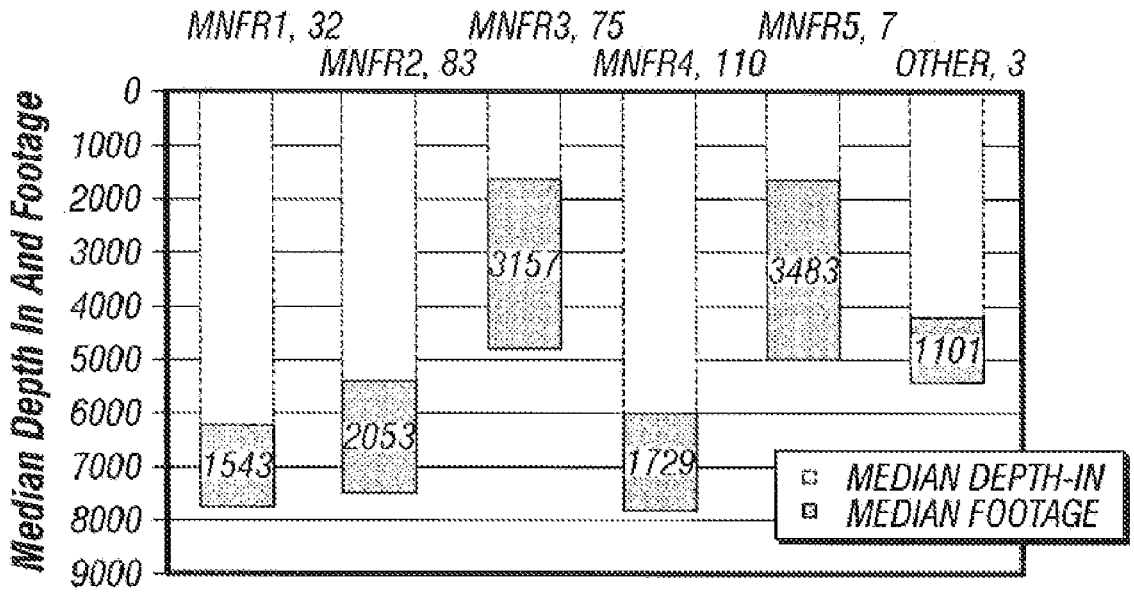
Figure 18J:
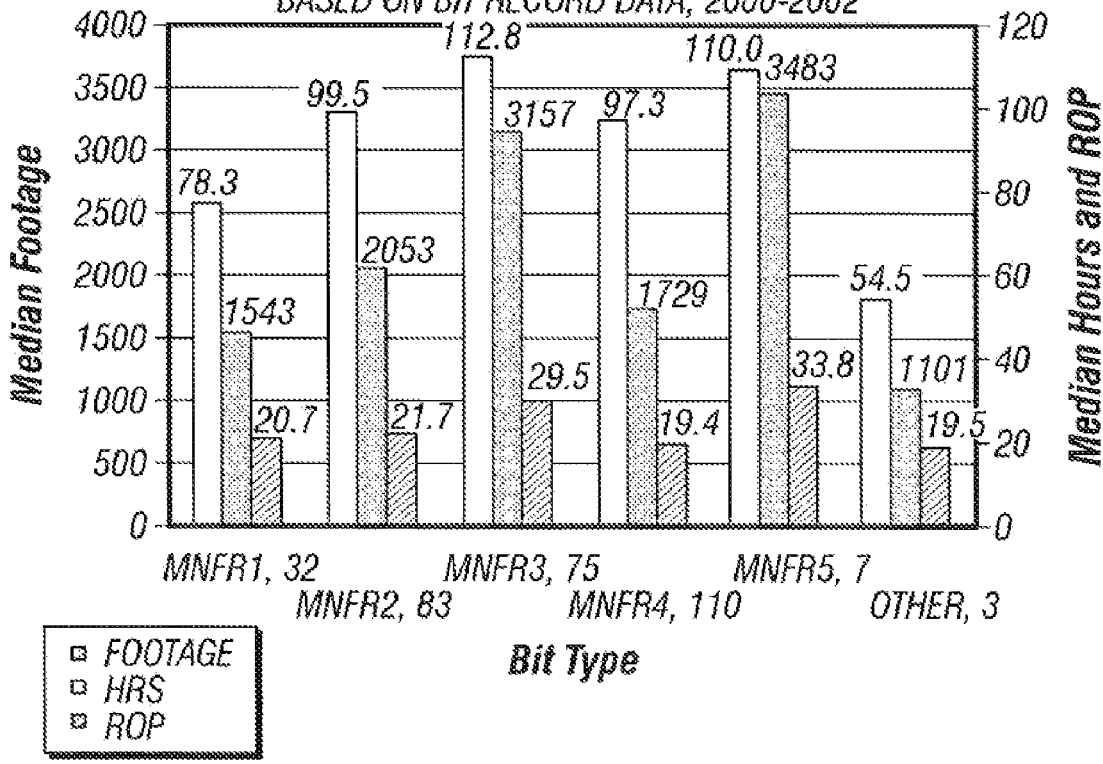
Figure 18K:
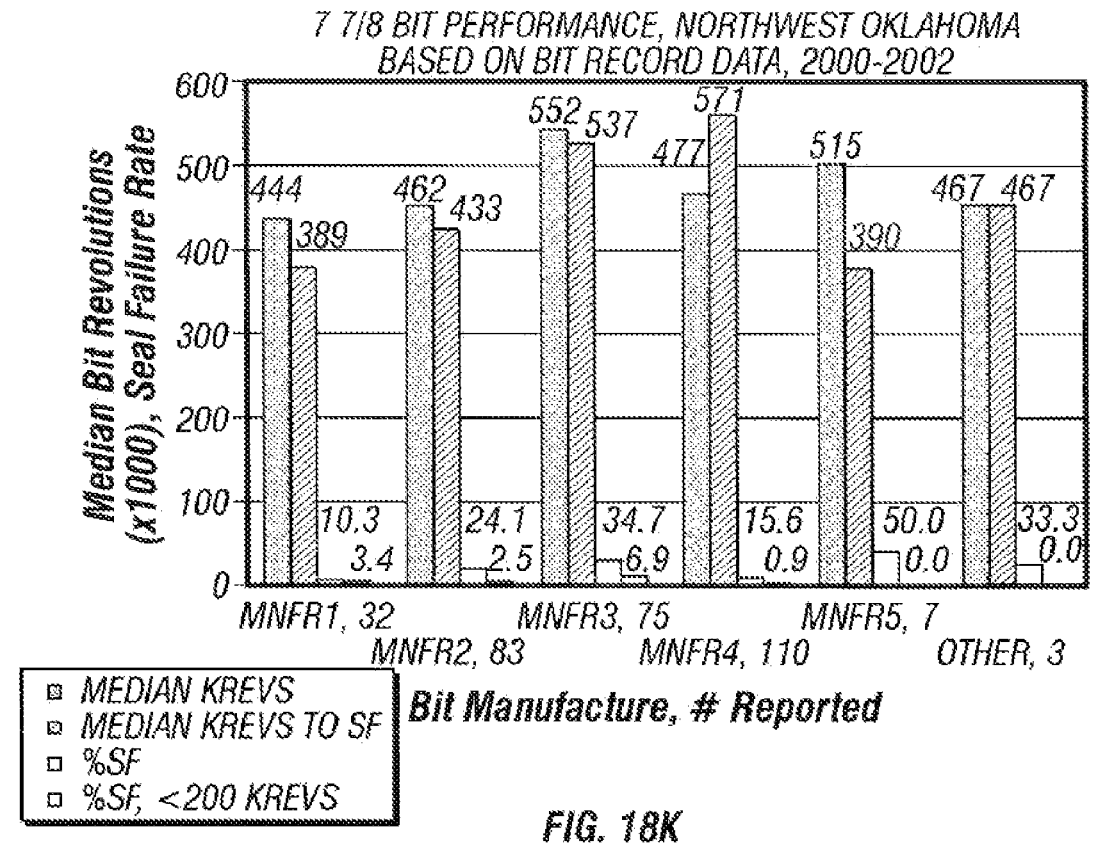
Figure 18L:
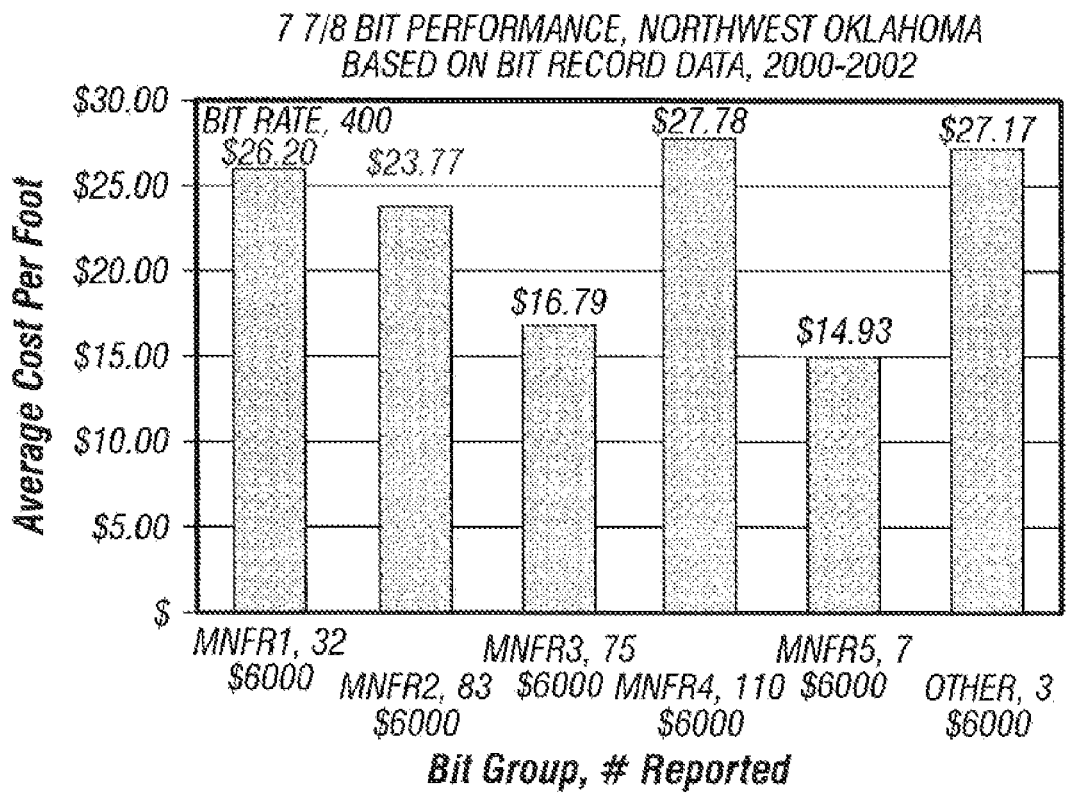
Figure 18M:
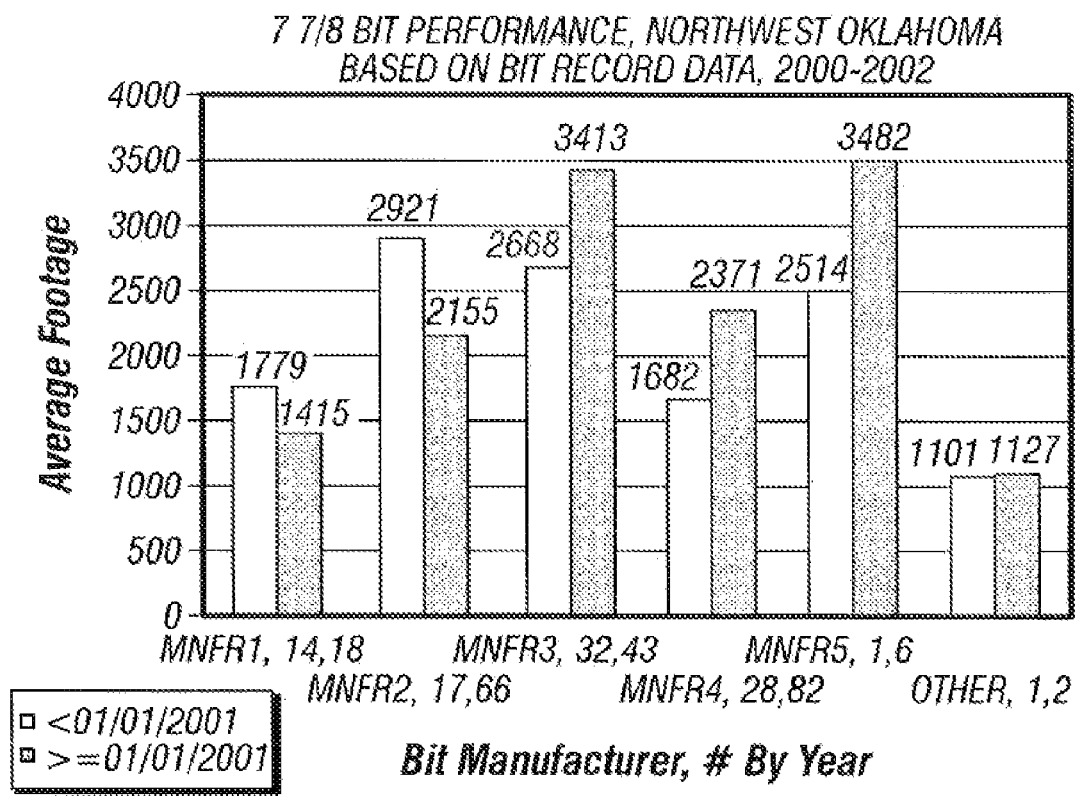
Figure 18N:
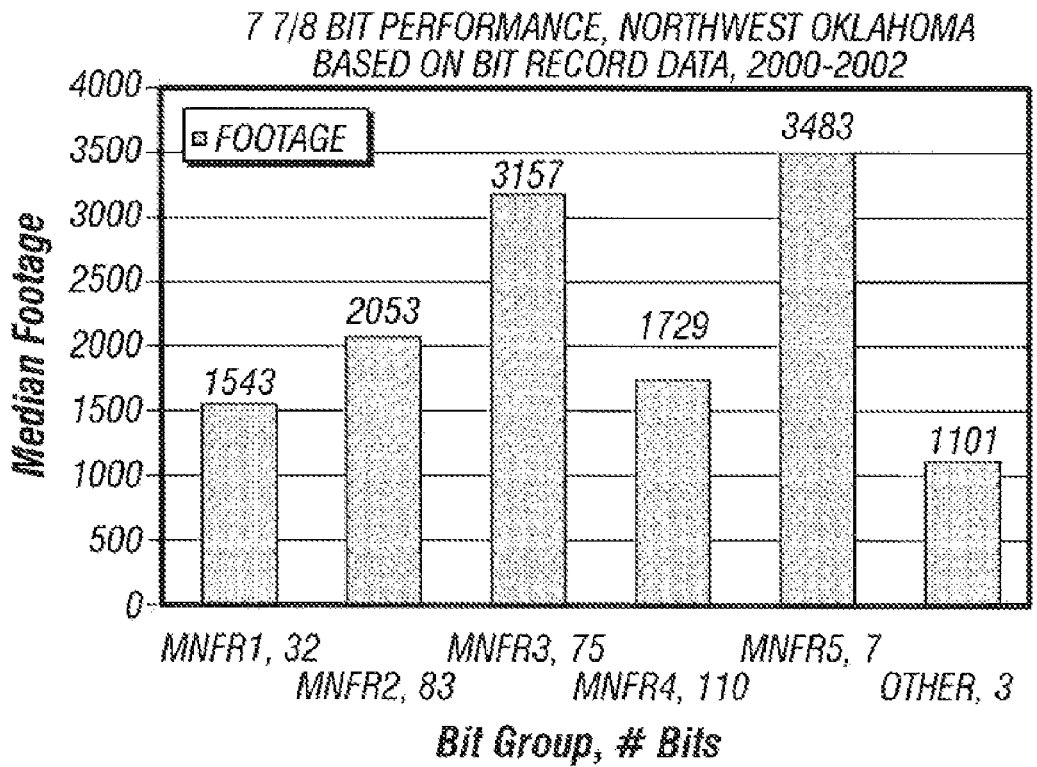
Figure 18O:
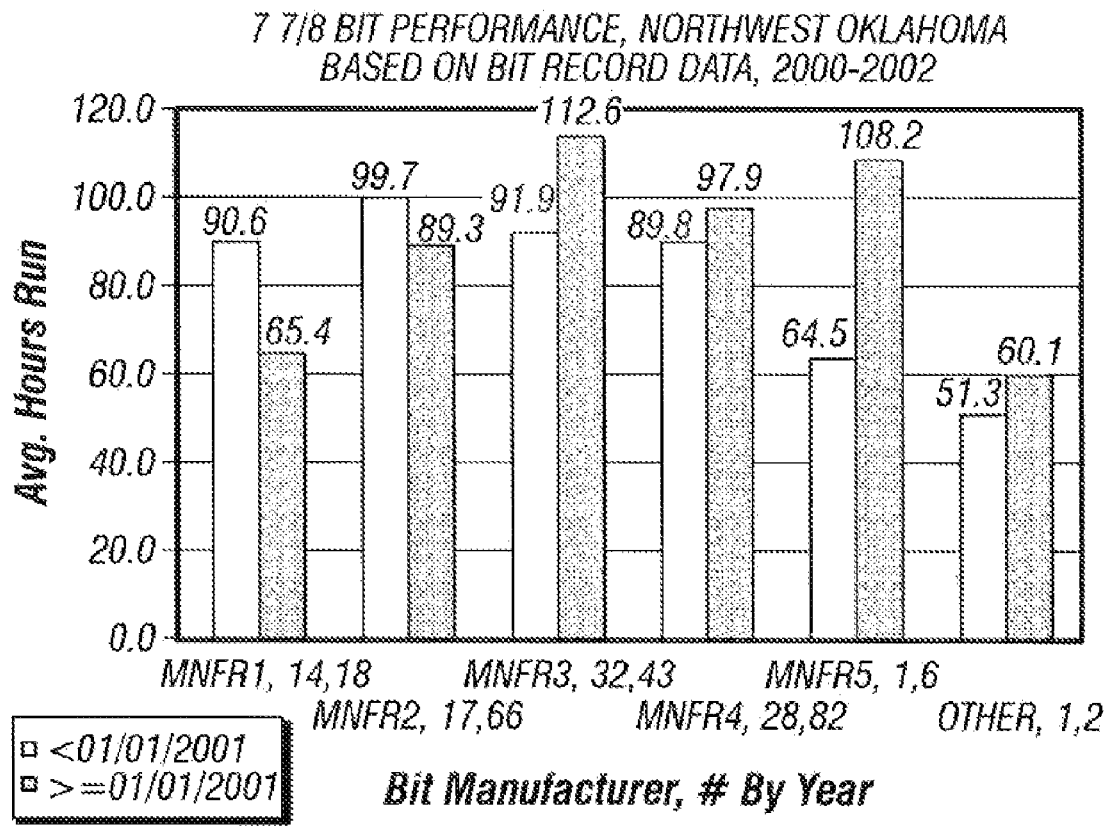
Figure 18P:
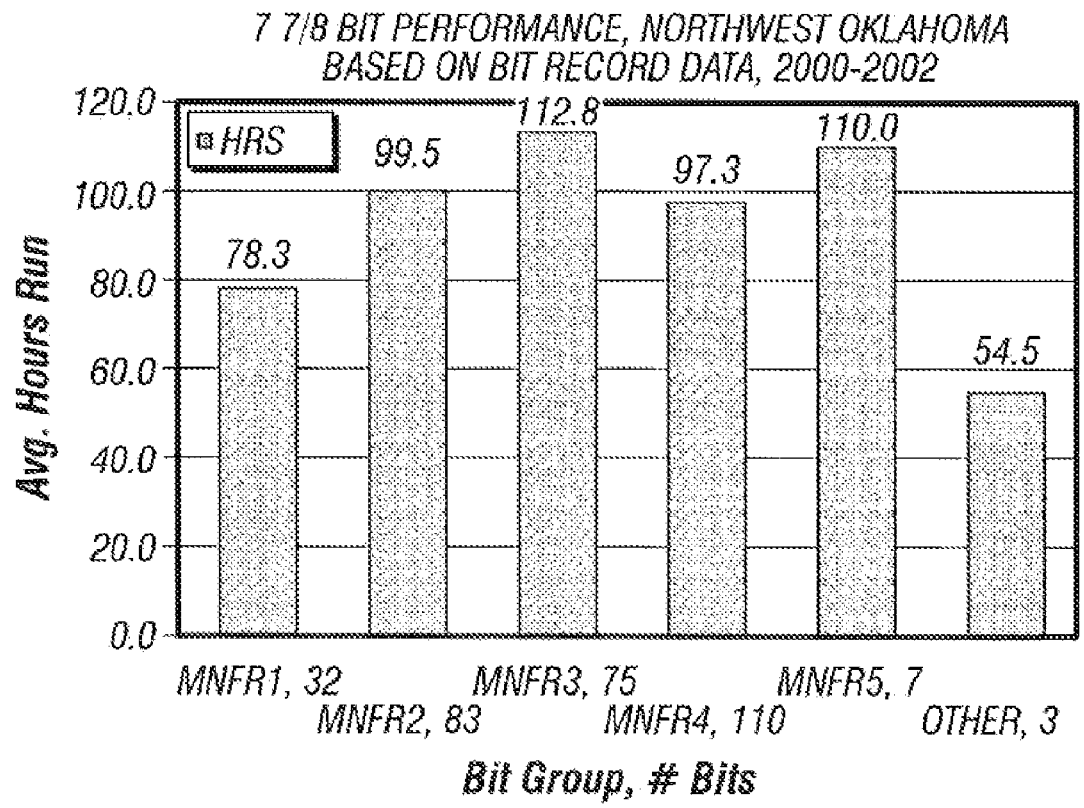
Figure 18Q:
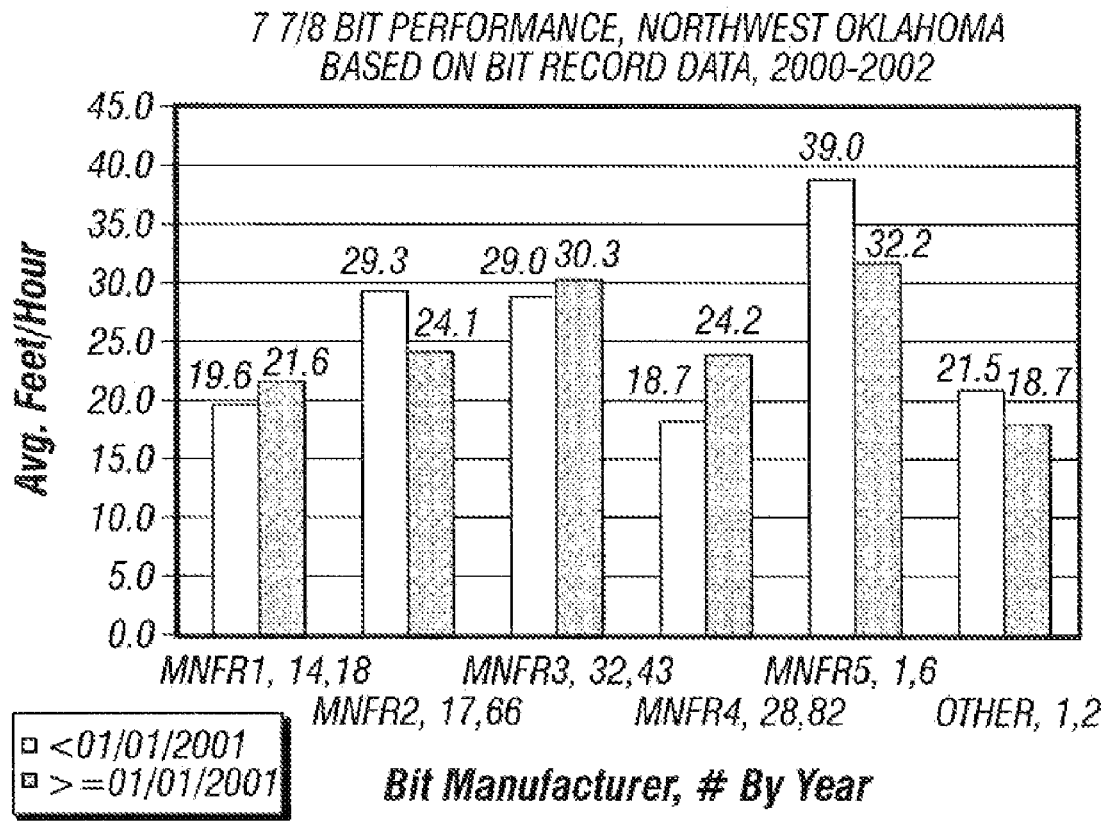
Figure 18R:
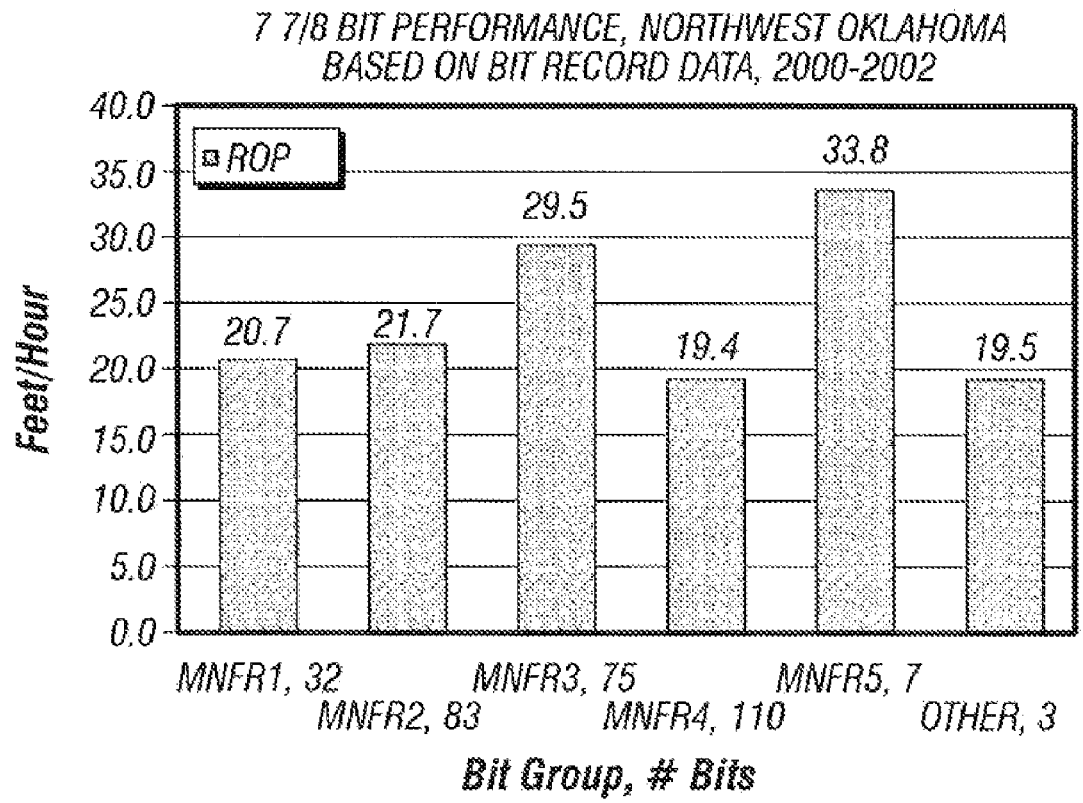
Figure 18S:
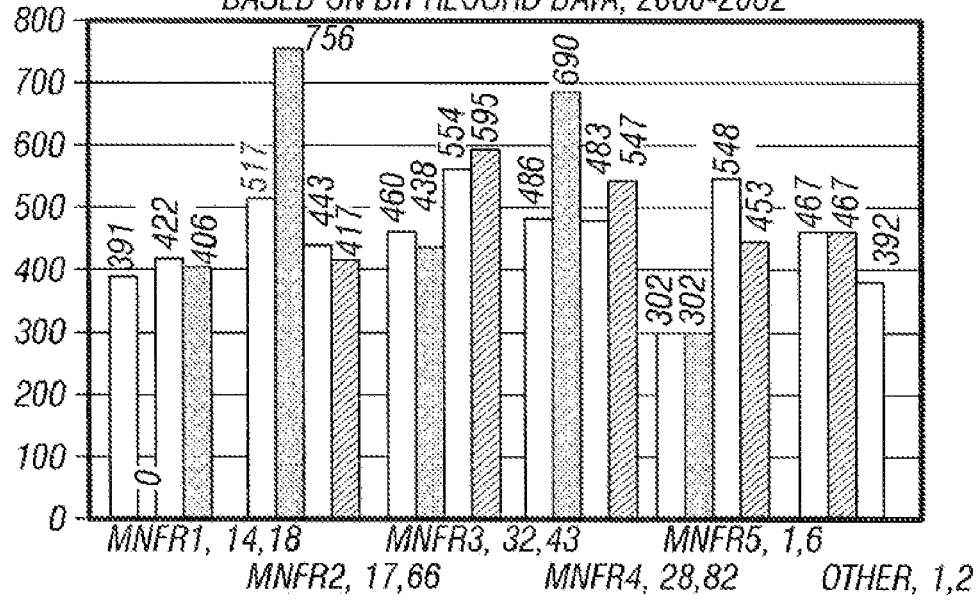
Figure 18T:
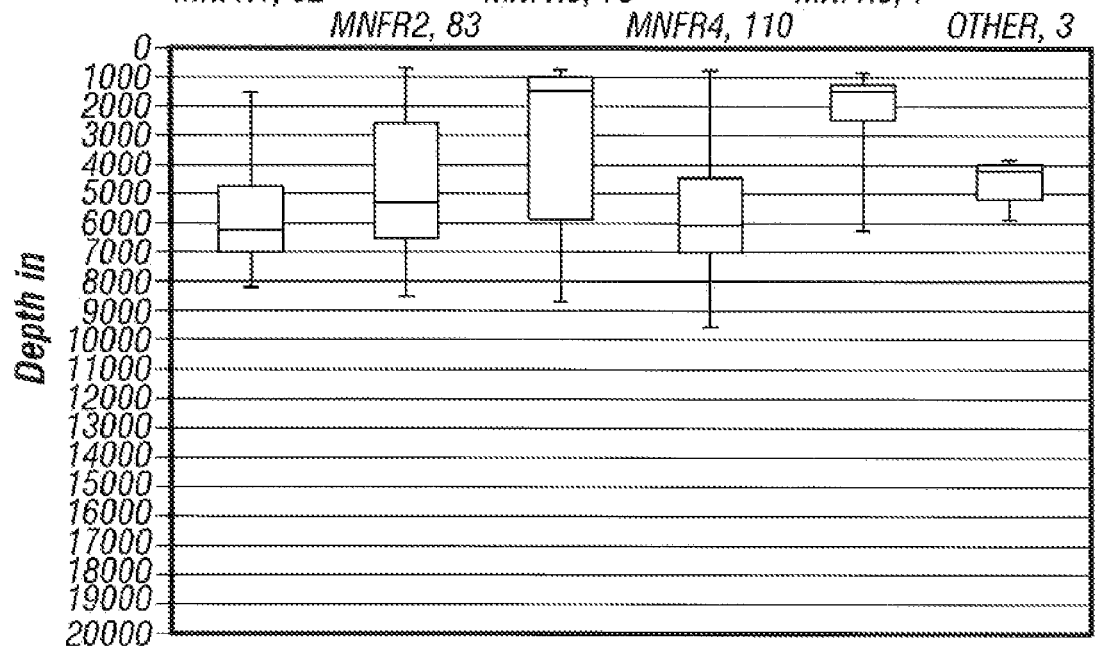
Figure 18U:
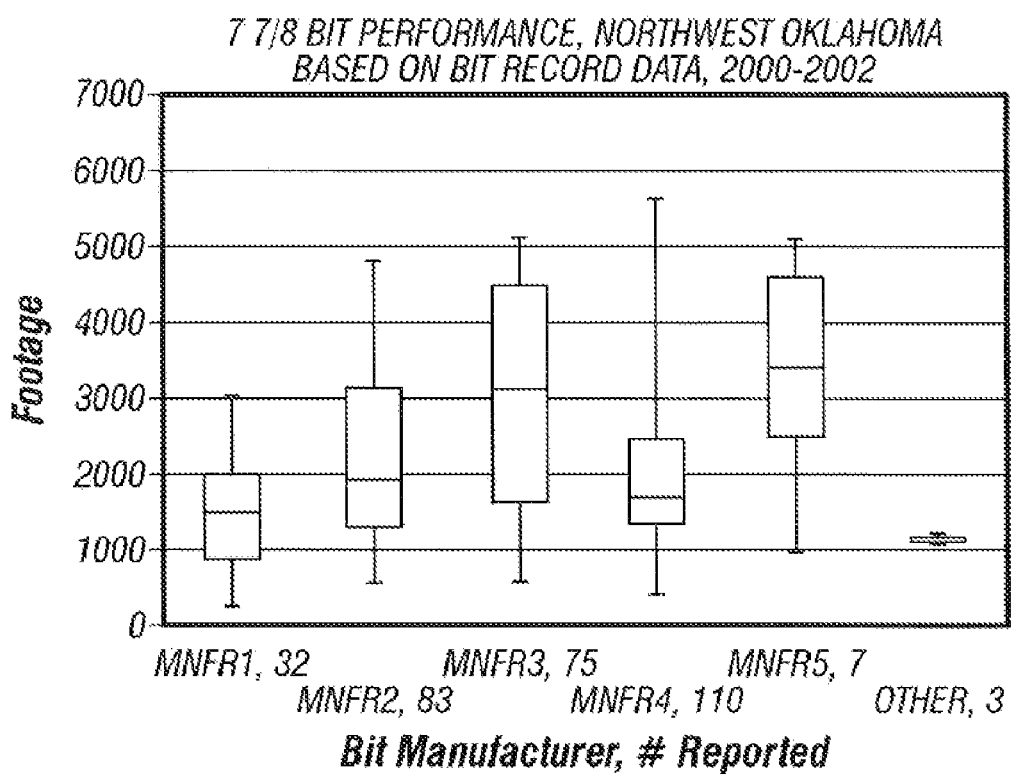
Figure 18V:
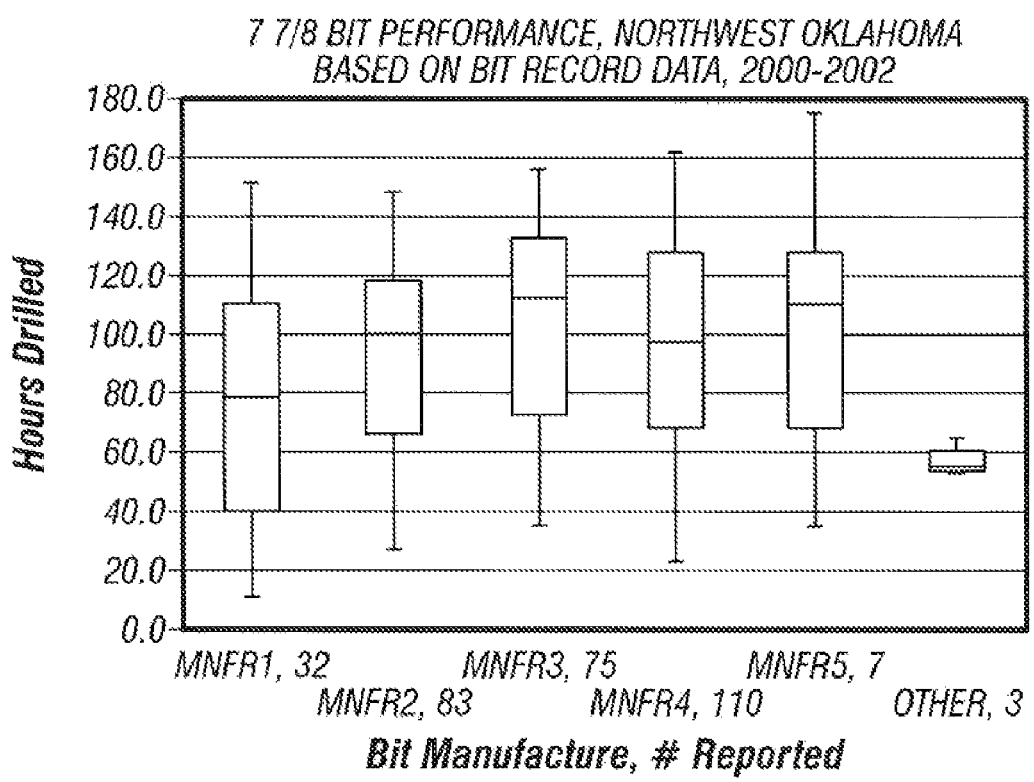
Figure 18W:
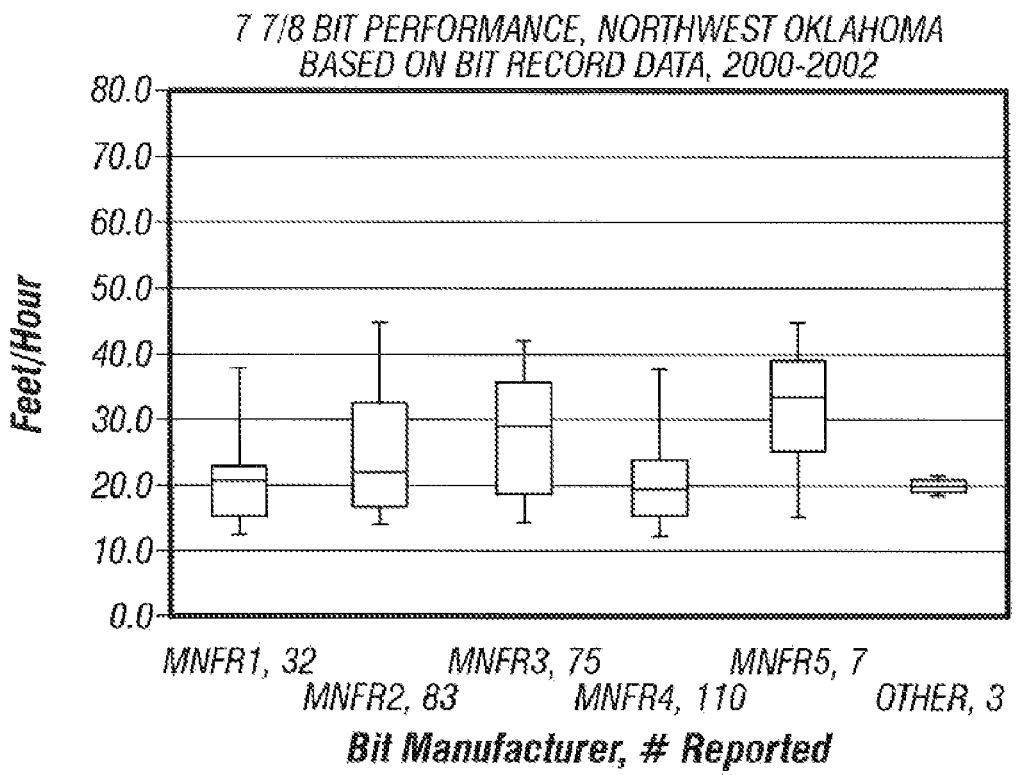
Figure 18X:
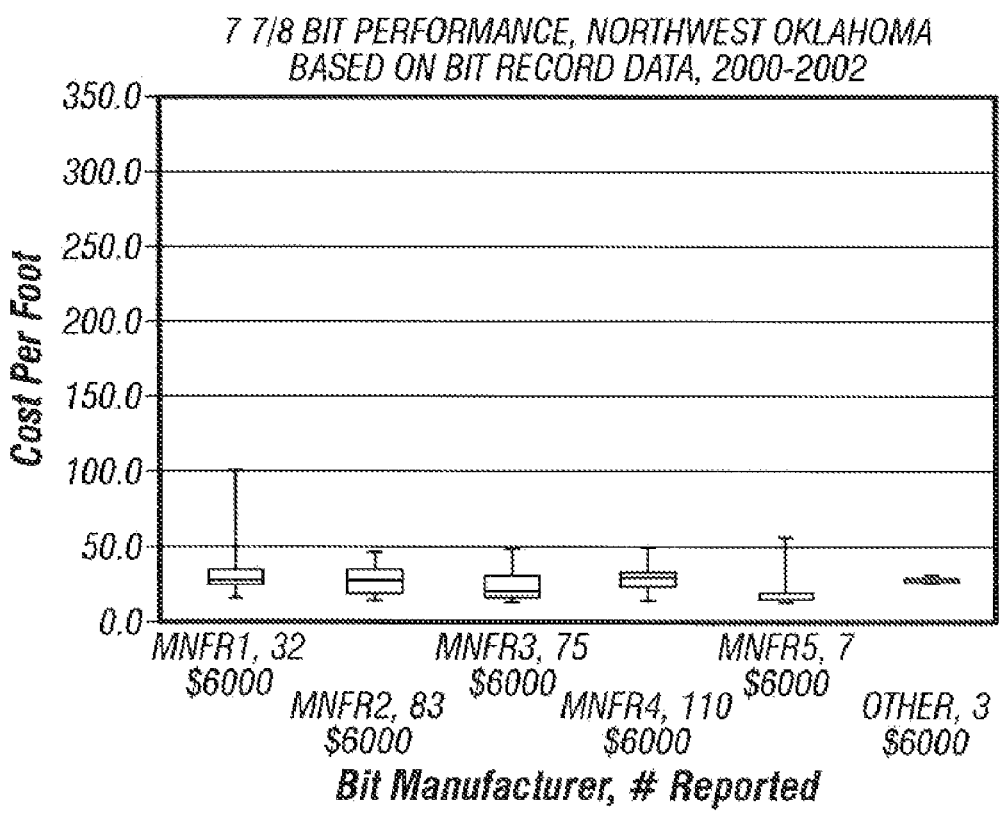
Figure 18Y:
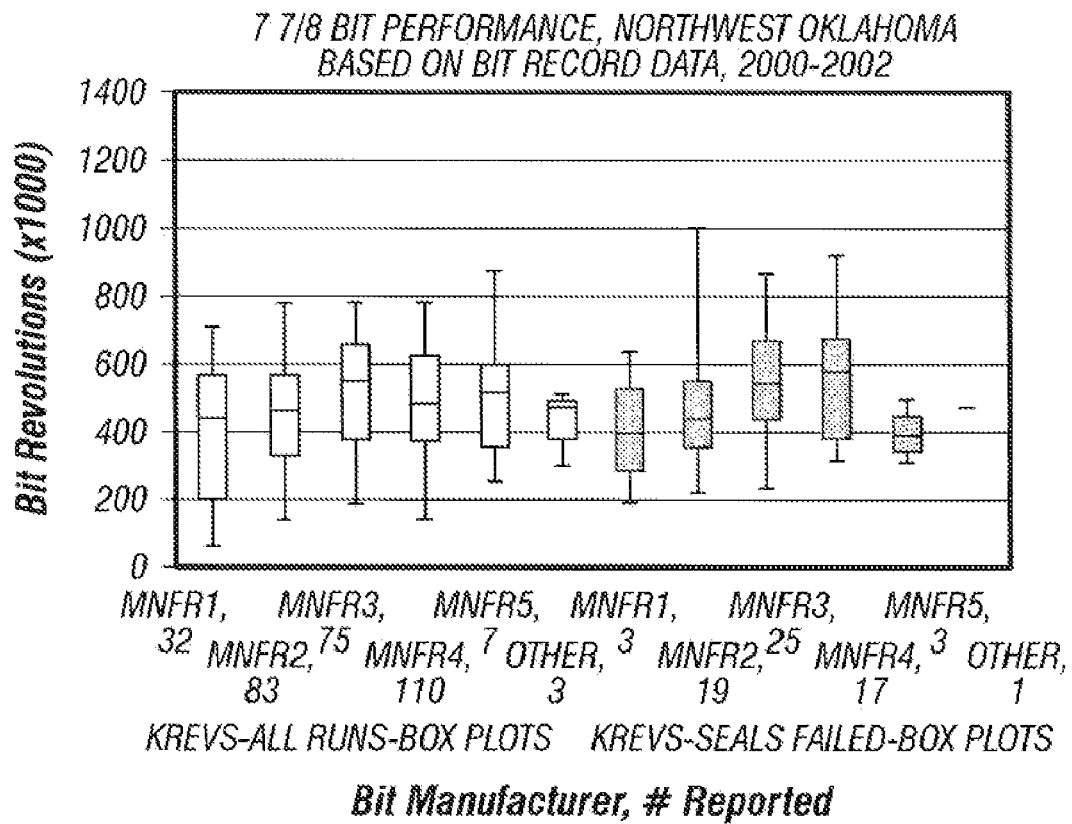
Figure 18Z:
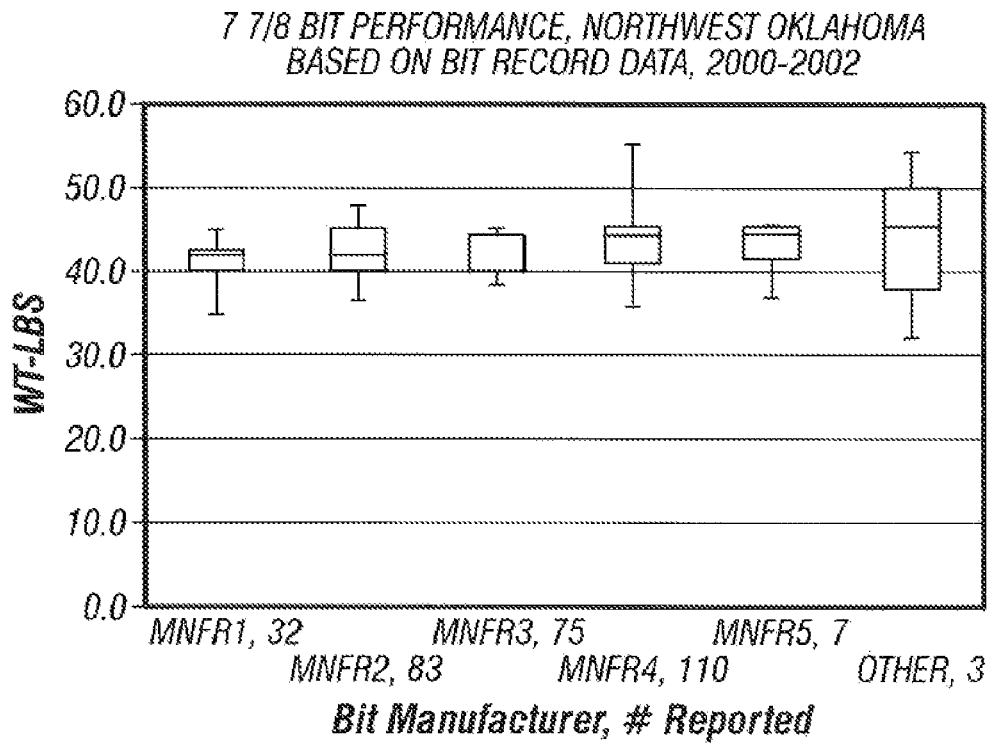

FIGS. 18F-18S shows bar charts of performance analysis processed by the calculator for filtered datasets and provided to the graphics generator to generate the plots. The calculator is adapted to retrieve and calculate the data required to generate these plots. The calculations required involve conventional equations known in the art. The graphics generated is adapted using the bar chart command provided in EXCEL® to graphically generate these plots automatically with titles and formatting shown based on data passed by the calculator. For example, FIG. 18F shows population percentage bar charts for depth-in (corresponding to FIG. 18C). This chart shows that 5% of the bits considered went in at 782 feet or less, and 95% of the bits when in at 9044 feet or less. The performance chart is also adapted to show the corresponding percentage population bar chart for WOB and RPM, illustrating that 5% had WOB/RPM values of 35 and 64 respectively. FIG. 18G shows interval drilled from depth-in to depth out with starting depth ranges and average ROP for bits considered grouped by manufacture based on data provided at 306 in FIG. 14 and at depth intervals based on data provided at 305 in FIG. 14. FIG. 18H shows a bar chart of inner, outer, and gage average tooth grades for each bit group considered. Also generated are FIGS. 18I-18S, which show performance data provided by the calculator such as median or average depth in, footage, hours run, feet per hour, ROP, revolutions, and cost per foot.

Figure 19:
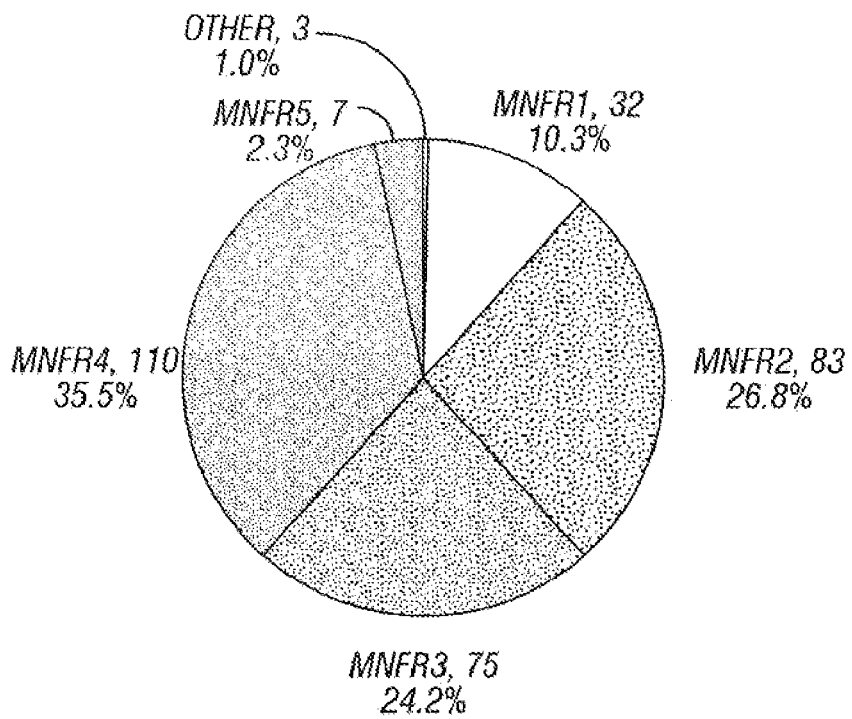
FIG. 19 show a pie chart generated using a performance analysis tool in accordance with an embodiment of the present invention.

FIGS. 18T-18Z shows box and whiskers charts of performance analysis data processed by the calculator from data selected in the filtered datasets and provided to the graphics generator to generate the charts. Parameters values calculated and passed to the generator include fifth percentile, $1^{st}$ quartile, $2^{nd}$ quartile, third quartile, and ninety-fifth percentile values for the following parameters collected for each bit group and set to the designated graphic generator area to generate these charts in EXCEL®: depth-in, footage drilled, hours drilled, rate of penetration (feet per hour), cost per foot, number of revolutions, and weight on bit for each group. The calculator and graphics generator are also arranged to automatically generate a pie chart as illustrated in FIG. 19 which shows the percentage distribution between the groups of the bits considered in the analysis.

Advantageously, the above described implementation, partially illustrated in FIGS. 12-17, 18A-18Z, 19, and 21, provides a performance tool that can be used by a wide audience of users having varying skill levels to produce performance charts automatically in a standard format for use, comparison, and analysis of bit performance.

Pareto Chart

Figure 21:
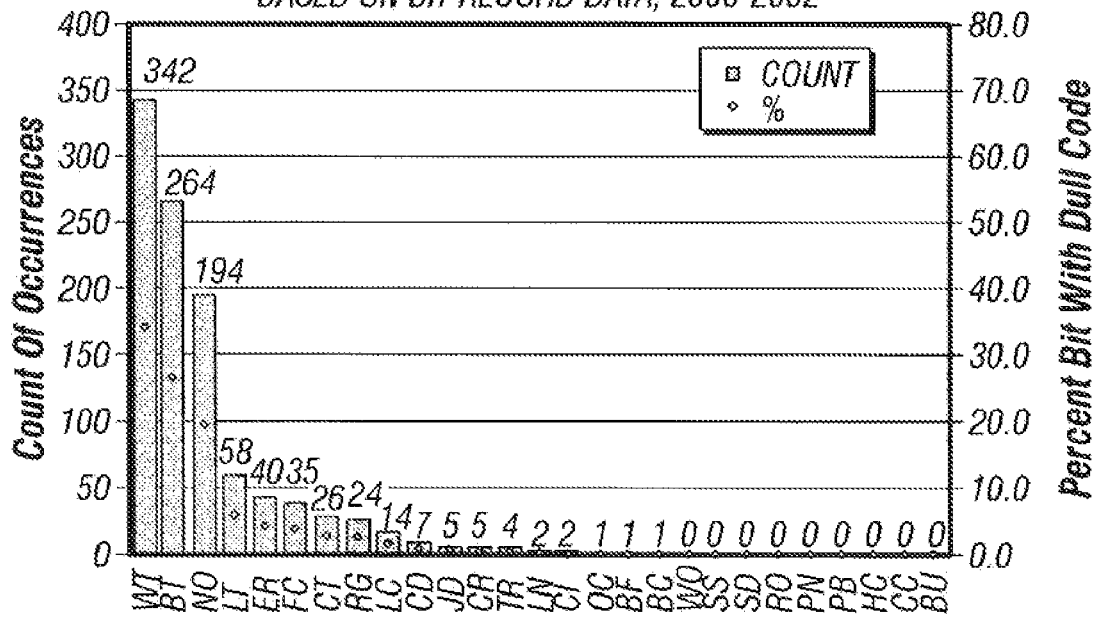
FIG. 21 shows one example of a Pareto chart of dull conditions generated using performance analysis tool in accordance with an embodiment of the present invention.

In particular, it should be noted that in one embodiment, the calculator is also adapted to calculate performance data for generating at least one Pareto chart. A Pareto chart is a chart showing the count and frequency of failure modes for a set of apparatus considered. As shown in FIG. 21, in the performance tool discussed above the calculator includes a dull condition calculator adapted to calculate a count of occurrences and percentage of the occurrences of bits recorded as having various dull conditions at the end of their operation. In particular, for each record identified as passing the filter, the calculator is adapted with a set of calculation functions developed to access data from each of the dull condition data fields in the record. If the data in the record indicates that the bit had the corresponding dull condition, a value of "true" or 1 is returned. If the data in the record indicates that the bit did not have the corresponding dull condition, a value of "false" or 0, is returned. A function is provided in the calculator corresponding to each dull condition data field for each record. For a calculator employed using EXCEL®, these functions may be arranged in a matrix of cells such that the functions for each record are arranged in different rows and the functions for the dull condition data fields are arranged in different columns. Summing functions may then be used to sum the "true" dull condition occurrences for each dull condition data field. Calculation functions may also be used to calculate the percent of the bits (i.e., records) which were graded to have each of the noted dull conditions.

The graphics generator may then be adapted to generate a performance chart summarizing the count of dull occurrences and the percentage of dull occurrences for each type of dull condition recordable in the record. One example of this type of chart is shown in FIG. 21. The graphics generator is adapted such that the x-axis of the bar chart lists all of the IADC dull condition codes that may be recorded in records obtained from the records database. The dull conditions corresponding to each IADC code is known in the art. Example dull conditions recorded include: wt-worn teeth; bt-broken teeth; no-no dull condition, ct-chipped teeth, rg-rounded gage, lc-lost cone, ln-lost nozzle, oc-off center wear, pn-plugged nozzle, bu-balled up. This type of chart is considered extremely useful in examining overall bit performance and determining which components of a particular type of bit need to be studied and reengineered to increase bit life. In the past, such charts were not typically produced in performance analysis carried out manually due to the time and manipulation required to produce it. Advantageously, embodiments of the present invention allow such charts to be generated in seconds for much larger families of records than previously considered.

Customized Plots

In should also be noted that in the example discussed herein, the filtering criteria sheet (302 in FIG. 14) is also adapted to accept to accept user input to define which data is desired for generating one or more customized performance charts. Based on the parameters indicated for the X and Y axis of the charts in the filtering criteria page 302, the calculator is adapted to collect or calculate the data needed from each of the records that passed the filter for plotting on the X and Y axis. The graphics generate is adapted to accept the data collected by the calculator as X and Y data input and use it to generate the chart. In one embodiment, the filter is adapted to separate the records into groups and the calculator is adapted to collect the sets of data needed to generate a customized plot for each of the groups as well as the data needed to generate a customized plot for all records passing the filter. Then, the graphics generator is adapted to accept each set of data calculated by the calculator and to generate corresponding charts.

One example of a customized plot generated in accordance with an embodiment of the invention is shown in FIG. 18E. In this case the parameter selected for the X-axis was the mud flow rate and the parameter selected for the Y-axis was the depth-in. Based on the parameters selected, the calculator was adapted to collect data from the corresponding data fields (for passing records) and this data was made available to the graphics generator (using preformatted graphics commands) to generate a scatter plot of the data provided by the calculator. In accordance with this aspect of the invention, a performance analysis tool may be provided which allows a user to generate customized (user defined) plots automatically based on input provided by the user. Other examples are show in FIGS. 18C and 18D.

FIG. 20 shows an example of calculations performed by the tool in the exemplary embodiment and used to generate additional charts related to a performance analysis, as shown in FIGS. 18A-18Z, 19, and 21. The calculator includes embedded functions similar to those discussed above, but wherein the value rendered is calculated using conventional formulas.

Numerical Summary

In the embodiment shown in FIG. 14, the bit performance tool is also adapted to include a calculations summary area 314 on the filtering criteria sheet 302 in FIG. 14. The calculations summary area 314 contains a collection of some of the results calculated during the performance analysis by the bit performance tool. Results presented in the calculations summary area 314 include bit group results such as the total sample size (number of records) contained in each group, the number of records in each group that had the bearings graded (and thus were used to calculate reliability), the number of records in each group wherein the graded bearings were indicated as failed, the percentage of seal failures, and the percentage of early seal failures (as defined by the parameter in cell B39, "short krevs"), the median revolutions (in krevs) for each group, the median revolutions to seal failure, the median depth-in for each bit group, and the median depth drilled, the cost per foot (CPF) calculated based on the bit price and the total depth (feet or meters) drilled (e.g., CPF=(bit cost+(drilling hours+trip time)*rig rate)/footage drilled, trip time=depth out/1000). The calculation summary area 314 also includes the number of unfiltered samples considered and the number of those samples that passed the filtering criteria. Formulas for obtaining these parameters are known in the art and the corresponding linking functions for retrieving the data needed to calculate these values can be derived based on the descriptions above.

The calculation summary area 314 additionally includes a calculated time (corresponding to the time parameter selected at 308) to a pull bit based on the reliability selected at 310 and the reliability curve calculated for the group. A calculated time to pull a bit is a very important and useful feature of the program because this value can be used by a drilling operator as the estimated time to pull a bit. Because this value is calculated based on the performance of similar groups of bits (such as the same type of bit if manufacturer product codes are used to filter or group records) and a selected risk or confidence level desired (acceptable as input at 310), the resulting value is a very useful value that can be used. Based on this value, a driller may decide to pull a bit after the time period as passed (e.g., after drilling 525,000 revolutions for a bit similar to those in group 1) or may decide to watch drilling parameters more closely as this time period approaches so that he is sure to pull the bit at the moment of failure. Therefore, embodiments including this aspect of the invention may be very useful in the design of drilling operations and in estimating or predicting bit life. When the time parameter at 308, is changed to hours, feet, or total energy, the predicted time to pull the bit changes to hours, feet, or total energy, accordingly.

Component Life Predictor

In the implementation shown, the calculator is also adapted to calculate a predicted component life based on a calculated reliability curve and a selected confidence level. The predicted component life may be used to predict the effective life of a component or system. In the example embodiment shown, the predictor includes a collection of interlinking cells linked to data in the filtering criteria sheet and including cells which contain functions that are used to predict bit life. For a group of bits, the estimated bit life (calculated time to pull bit) is calculated based on the reliability values calculated for the group, the corresponding time parameter values, and the selected confidence level entered at 310. In this implementation, the estimated bit life is calculated by comparing the selected reliability value (at 310) to each reliability values and then taking the calculated reliability values immediately above and below the selected reliability and using the corresponding time parameter values to linearly approximate an estimated time parameter value (time to pull the bit) corresponding to the selected reliability value.

Other Aspects

In view of the descriptions above, advantageously, in one or more embodiments of the invention a performance analysis tool may be used to automatically generate reliability curves as well as other charts and maps, which may allows a user to create a set of performance analysis charts in minutes or seconds comparing the performance of a plurality of different record groups. In one or more embodiments, a performance analysis program may be to automatically generate reliability curves based on the data without having to manually filter the data or sort the data by the parameter desired as the basis for calculating reliability curves. Instead a filter is used which filters the data, separates the records into the appropriate bit groups, sorts the filtered data, calculates reliability and generates a finished reliability chart, all in a matter of a few seconds.

In one or more embodiments of the invention adapted for processing bit run records, the cutting elements may be selected as the parameter for which reliability is to be calculated. In which case, if grades are given to the cutting elements to indicate the state of the cutting structure, such as a grade between 0 (no wear) and 8 (completely worn or broken off) as discussed above, this data in the record may be converted to a Boolean indicator by setting a value at which a cutting element will be considered to have failed, like a value of 5 or 6. The selected "failure" value may be defined by user input. Then a method or tool in accordance with the discussion above may be used to obtain the reliability of the cutting structure for bits or to predict the effective life of a cutting structure. In other embodiments, records filtered for a performance analysis may be filtered by any of the data fields stored in a bit record or calculated from data in a bit record.

Advantageously, embodiments of the present invention may provide a technology jump in the creation of reliability charts and other performance charts and graphs desired from a performance analysis. One or more embodiments of the invention also provides a program which selects, sorts, calculates, organizes, filters, and then posts once-random data into finished charts, saving hours of repetitive labor in comparison to some prior art methods. One or more embodiments of the invention may also provide a user a tremendous advantage in the ability to quickly and accurately create quality charts that are consistent in appearance, giving the user the ability to respond to customer requests, in a fraction of the time previously required. Advantageously, one or more embodiments of the invention also provide a tool such that the programming skills required to create professional-looking charts is much lower than that required for prior art methods, making the tool available to many more users and providing a time saving advantage over prior art methods. Advantageously, using one or more embodiments of the invention, detailed performance studies that previously required many days of chart preparation can be done in a couple of hours, permitting engineers to spend more time analyzing the data before and after the charts are created and in front of a customer or drilling engineer.

Advantageously, the performance analysis tool may also include a filtering criteria page or other user input interface that gives the user the unique ability to try different scenarios substantially instantly by changing one or more filtering criteria such as depth, geographic location, or bit weight. This allows a user to obtain a fresh set of performance charts in seconds instead of a couple of days. In one embodiment, the user is able to generate reliability curves as well as numerous other performance charts from a set of 1000 or more records in minutes, and in less than 1 minute for subsequent charts generated by changing the time parameter for reliability. In one of the implementations described above, a set of records can be pasted into a master datasheet and the tool automatically resorts data and filters out unwanted bit runs based on selected criteria. In one or more embodiments, a method in accordance with the invention may be used to eliminate errors and problems with chart inconsistencies to produce charts that are professional in appearance and consistent with regard to colors, margins, fonts, patterns, etc. Embodiments of the invention may also provide a tool that can be easily used by a wide range of users.

Advantageously, in one or more embodiments of the invention a bit-life predictor is also provided, wherein the reliability value desired for pulling a bit can be entered (such as a 70% likelihood that the seals are effective), and the tool used to calculate reliability charts and determine the time parameter value at which reliability crosses over the desired reliability value (such as over the 70% mark) to provides a value, such as in hours, krevs, feet, or total energy, at which the bit should be pulled. Advantageously a bit-life predictor in accordance with these embodiments allow a driller to quickly determine the expected performance of a product based on accurate data and use it as a means of determining when to pull a bit rather than relying on the past history of various products. Thus, a driller may be able to more accurately predict when to pull a particular bit. Thus, one or more embodiments of the invention may be used by a driller to drill a well bore more efficiently.

Advantageously, one or more embodiments of the invention may be adapted and used to generate a reliability curve without requiring manual filtering and sorting of data records obtained from a database. In one or more embodiments, the bit performance tool may be linked directly to an existing database eliminating the need to input records into the tool.

In one or more embodiments, the statistical analysis tool may be used to automatically generate a plurality of statistical charts, tables, and maps useful in analyzing and/or comparing the drilling performance of different groups of bits from unsorted records obtained from a bit records database. In other embodiments, the filter may comprise a data file which contains filtering criteria that is automatically programmed into the performance analysis tool or accepted as input into the performance analysis tool by a user. Also, in other embodiments, the filter may be adapted to also accept component indicator data to designate which component reliability will be calculated on (e.g., the bearings, the cutting elements, etc.).

Advantageously, embodiments of the invention may be adapted and used to analyze the performance of any type of bit (roller cone, PDC (e.g., cutting elements), etc.), various drilling tools & equipment (e.g., whipstocks, blowout preventors, pumps, compressors, motors, etc.) or any other type of component that may be prone to failures (e.g., cars, people, etc.).

Those skilled in the art will appreciate that in other embodiments the performance analysis tool may comprise a different program format. For example, the performance analysis tool may be implemented using a programming language, such as C programming language, etc. In other embodiments, the filtering criteria may be fixed information programmed into the filter.

While the invention has been described with reference to a limited number of exemplary embodiments, those skilled in the art, having the benefit of this disclosure, will appreciate that various modifications may be made and equivalents may be substituted for elements thereof without departing from the scope of the invention. In addition, many modifications may be made to adapt a particular performance parameter application without departing from the essential scope thereof. Therefore, it is intended that the invention not be limited to the particular embodiments disclosed or to the type of bits described, but that the scope of the invention should be limited only by the attached claims.

What is claimed is:

1. A computer-implemented method for selecting a drill bit, comprising:
  entering, using an input device of a computing device, filtering criteria into a filtering criteria worksheet, wherein the filtering criteria comprises a selected time parameter and a component condition parameter;
  filtering, using a processor of the computing device, bit run records to identify desired drill bit records based on the filtering criteria;
  calculating, using the processor, a predicted effective life for a plurality of drill bits based on data from the desired records,
    wherein the predicted effective life is calculated by determining a reliability value at each of a plurality of time values in which the component condition parameter is indicated as failed based on data in the desired records, and
    wherein the reliability values at each of the plurality of time values is used to plot a reliability curve for each of the plurality of drill bits; and
  graphically displaying, on a display associated with the computing device, the reliability curve to determine the predicted effective life for the drill bits.

2. The method of claim 1, further comprising selecting a drill bit based on the calculated predicted effective life.

3. The method of claim 1, further comprising:
  grouping the desired drill bit records into a plurality of groups based on the filtering criteria;
  ranking the desired drill bit records in each of the plurality of groups in ascending order based on recorded values for the selected time parameter; and
  calculating a reliability value for each of the plurality of groups of desired drill bit records based on the selected time parameter.

4. The method of claim 1, wherein filtering further comprises:
  obtaining a filtering functions worksheet comprising filtering functions, wherein each filtering function is associated with at least one of the filtering criteria and comprises a conditional statement; and
  executing the filtering functions by executing each conditional statement.

5. A computer-implemented method for determining when to pull a drill bit, comprising:
  filtering, using a processor of a computing device, bit run records for a plurality of drill bits based on filtering criteria provided as input, wherein the filtering criteria comprises a selected time parameter and a component condition parameter;
  calculating, using the processor, at least one reliability curve for the drill bit of the plurality of drill bits based on data from the filtered records; and
  graphically displaying, on a display associated with the computing device, the at least one reliability curve,
  wherein the at least one reliability curve is used to predict when to pull the drill bit during a drilling operation.

6. The method of claim 5, further comprising:
  grouping the desired drill bit records into a plurality of groups based on the filtering criteria;
  ranking the desired drill bit records in each of the plurality of groups in ascending order based on recorded values for the selected time parameter; and
  calculating a reliability value for each of the plurality of groups of desired drill bit records based on the selected time parameter.

7. The method of claim 5, wherein filtering further comprises:
  obtaining a filtering functions worksheet comprising filtering functions, wherein each filtering function is associated with at least one of the filtering criteria and comprises a conditional statement; and
  executing the filtering functions by executing each conditional statement.

* * * * *

UNITED STATES PATENT AND TRADEMARK OFFICE
CERTIFICATE OF CORRECTION

| | | |
|---|---|---|
| PATENT NO. | : 7,707,009 B2 | Page 1 of 1 |
| APPLICATION NO. | : 11/877430 | |
| DATED | : April 27, 2010 | |
| INVENTOR(S) | : Stephen C. Steinke | |

It is certified that error appears in the above-identified patent and that said Letters Patent is hereby corrected as shown below:

On the Cover Page, item [60] should read — the Related U.S. Application Data of 10/872,661 filed on June 21, 2004 now Patent No. 7,286,959 and Provisional Application 60/480,007 filed on June 20, 2003.

Signed and Sealed this

Sixth Day of July, 2010

David J. Kappos
*Director of the United States Patent and Trademark Office*